(12) United States Patent
Shinohara et al.

(10) Patent No.: US 7,014,349 B2
(45) Date of Patent: Mar. 21, 2006

(54) SURFACE LIGHT SOURCE, METHOD FOR MANUFACTURING THE SAME AND APPARATUS USING IT

(75) Inventors: Masayuki Shinohara, Kyoto (JP); Junichi Takagi, Kyoto (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 69 days.

(21) Appl. No.: 10/220,209

(22) PCT Filed: Feb. 27, 2001

(86) PCT No.: PCT/JP01/01474

§ 371 (c)(1),
(2), (4) Date: Nov. 12, 2002

(87) PCT Pub. No.: WO01/63347

PCT Pub. Date: Aug. 30, 2001

(65) Prior Publication Data

US 2003/0128538 A1    Jul. 10, 2003

(30) Foreign Application Priority Data

Feb. 28, 2000   (JP) .............................. 2000-051554

(51) Int. Cl.
*F21V 7/04* (2006.01)
(52) U.S. Cl. ...................... 362/600; 362/561
(58) Field of Classification Search .............. 362/26, 362/31, 330, 339, 555, 561, 600, 603, 608, 362/610; 349/65
See application file for complete search history.

(56) References Cited

U.S. PATENT DOCUMENTS 6,132,053 A * 10/2000 Sendova ...................... 362/31

6,592,233 B1 * 7/2003 Parikka ........................ 362/31

FOREIGN PATENT DOCUMENTS

| JP | 07-270708 | 10/1995 |
|----|-----------|---------|
| JP | 9-81048 | 3/1997 |
| JP | 10-311915 | 11/1998 |
| JP | 11-2730 | 1/1999 |
| JP | 11-120810 | 4/1999 |
| JP | 2950219 | 7/1999 |
| JP | 11-231315 | 8/1999 |
| JP | 11-258602 | 9/1999 |

(Continued)

OTHER PUBLICATIONS

Patent Abstracts of Japan, Publication No. 11-231315, published Aug. 27, 1999.

(Continued)

*Primary Examiner*—Y. My Quach-Lee
(74) *Attorney, Agent, or Firm*—Osha Liang LLP

(57) ABSTRACT

The light emitted from a spot light source (45) is emitted at a linearly extending region by a wedge-like light conductor (47) and deflected by a prism sheet (50). This light is emitted in a direction perpendicular to a light incident surface (44a) of the light conductor plate (44) and has a directivity narrow in a widthwise direction of the light conductor plate (44). The light conductor plate (44) is formed, at its bottom surface, with a multiplicity of diffusion patterns (46) in a rectangular triangular form. The light reflected upon the diffusion pattern (46) is emitted perpendicularly to a light emitting surface (44b) of the light conductor plate (44). At this time, part of the light incident on the diffusion pattern (46) transmits through the diffusion pattern (46) whereby the directivity of emission light is narrowed in a lengthwise direction of the light conductor plate.

22 Claims, 56 Drawing Sheets

DIRECTIVITY CHARACTERISTIC OF EMISSION LIGHT

FOREIGN PATENT DOCUMENTS

JP    11-306831    11/1999
JP    11-329039    11/1999

OTHER PUBLICATIONS

Patent Abstracts of Japan, Publication No. 11-258602, published Sep. 24, 1999
Patent Abstracts of Japan, Publication No. 11-120810, publication date Apr. 30, 1999.
Patent Abstracts of Japan, Publication No. 07-270708, publication date Oct. 20, 1995.
Patent Abstracts of Japan, publication No. 11-306831, publication date Nov. 5, 1999.
Patent Abstracts of Japan, publication No. 11-2730, publication date Jan. 6, 1999.
Patent Abstracts of Japan, publication No. 11-329039, publication date Nov. 30, 1999.
Patent Abstracts of Japan, publication No. 2950219, publication date Jul. 9, 1999.
Patent Abstracts of Japan, publication No. 9-81048, publication date Mar. 28, 1997.
Patent Abstracts of Japan, publication No. 10-311915, publication date Nov. 24, 1998.

* cited by examiner

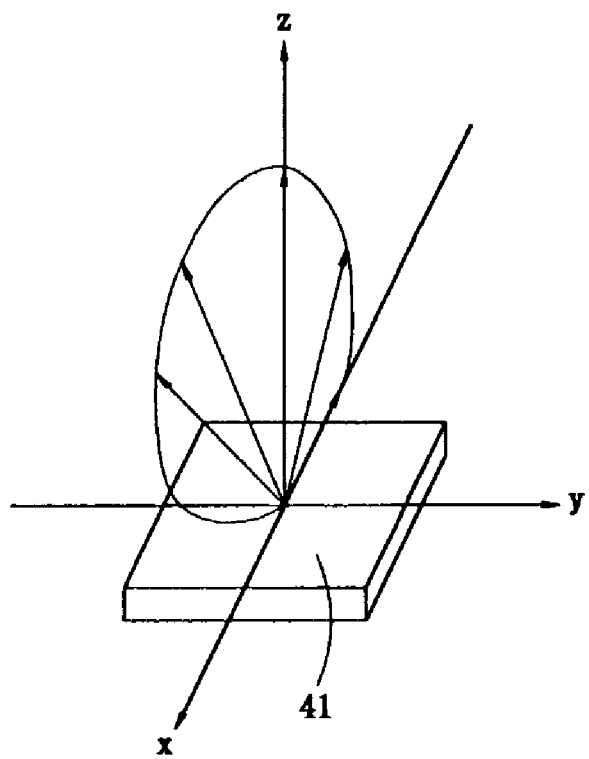
fig. 11
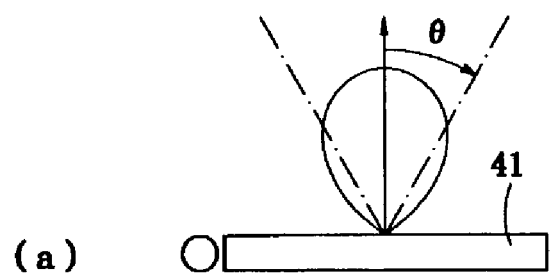
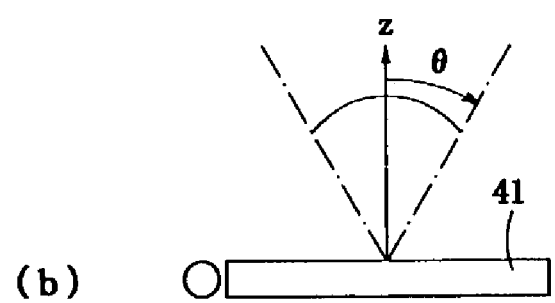
fig. 12

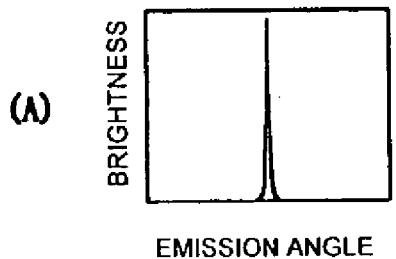
(A)
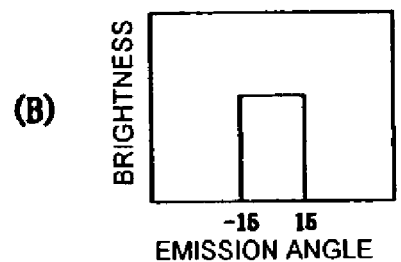
(B)
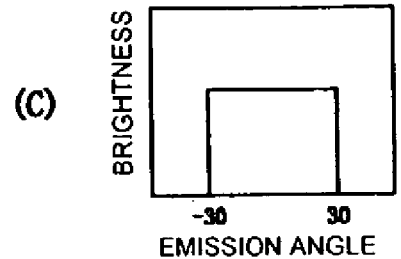
(C)
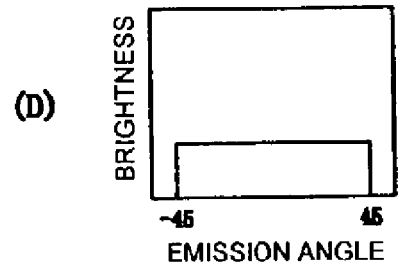
(D)
DIRECTIVITY CHARACTERISTIC
OF SURFACE LIGHT SOURCE DEVICE
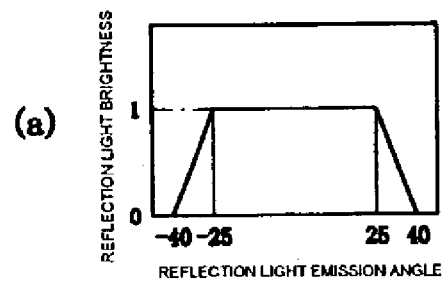
(a)
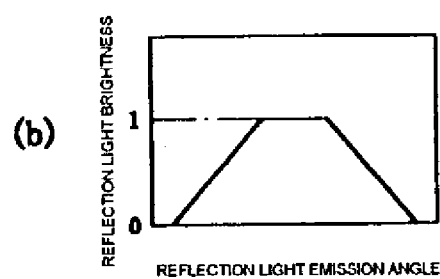
(b)
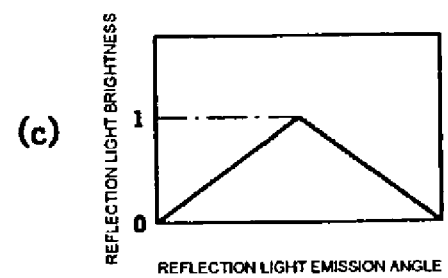
(c)
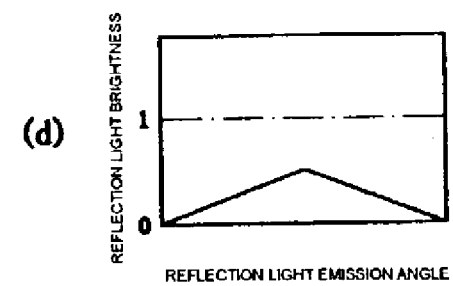
(d)
REFLECTION LIGHT ANGULAR CHARACTERISTIC
OF REFLECTIVE-TYPE LIQUID CRYSTAL DISPLAY PANEL
f i g. 1 6

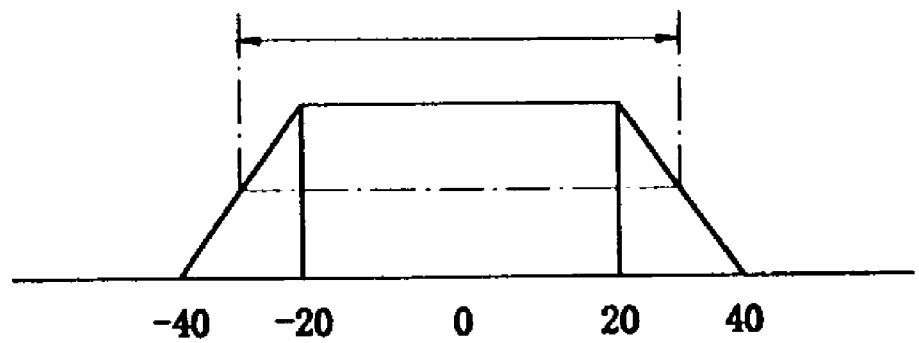
(a)
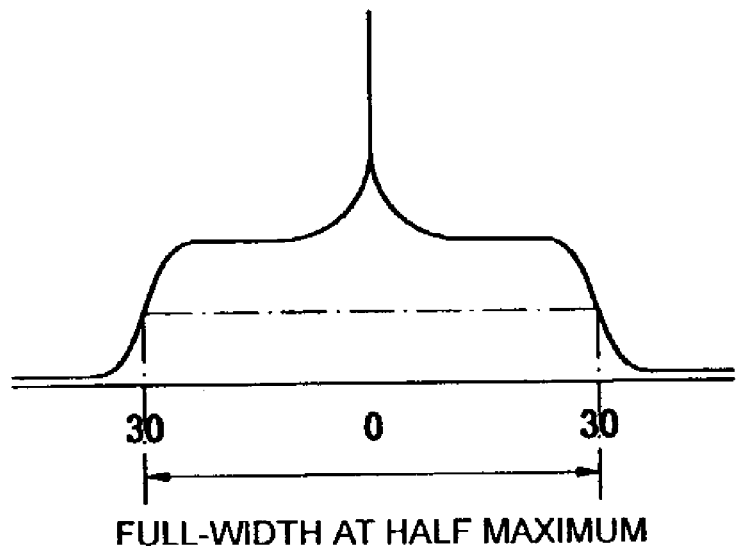
(b)
fig. 17

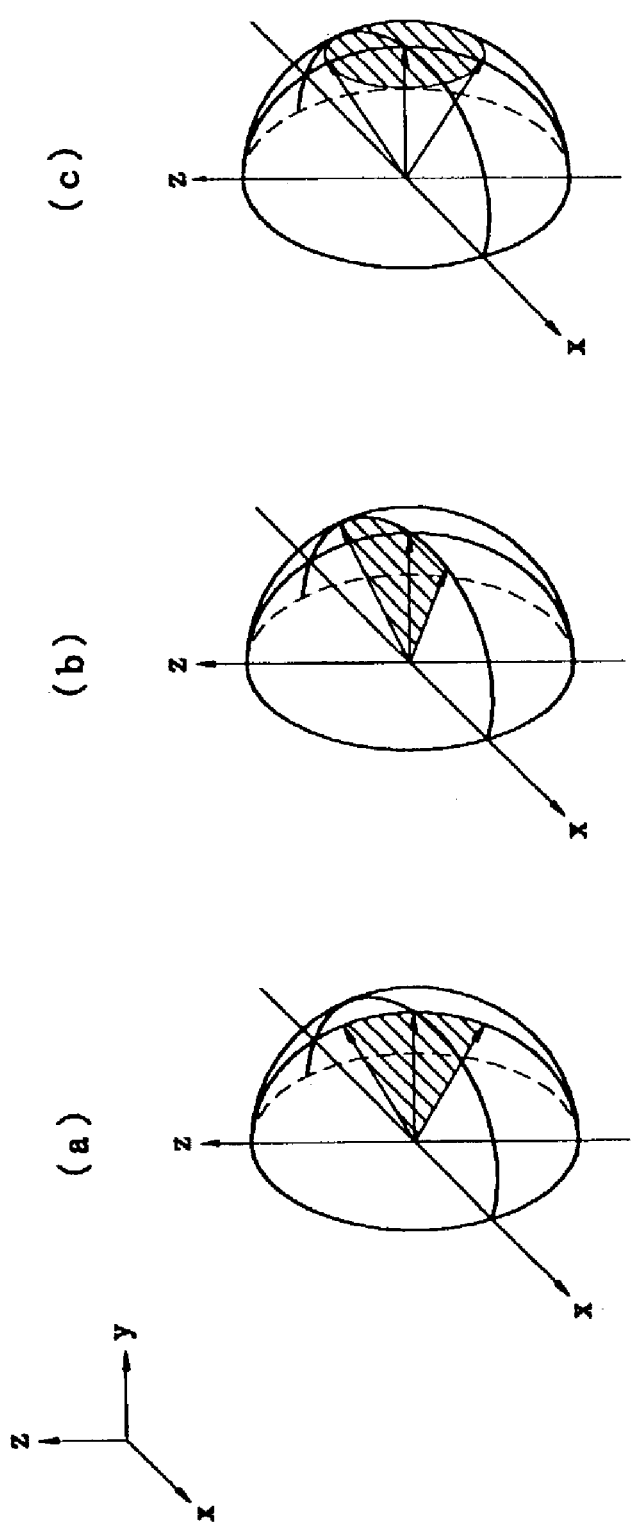
f i g. 2 3

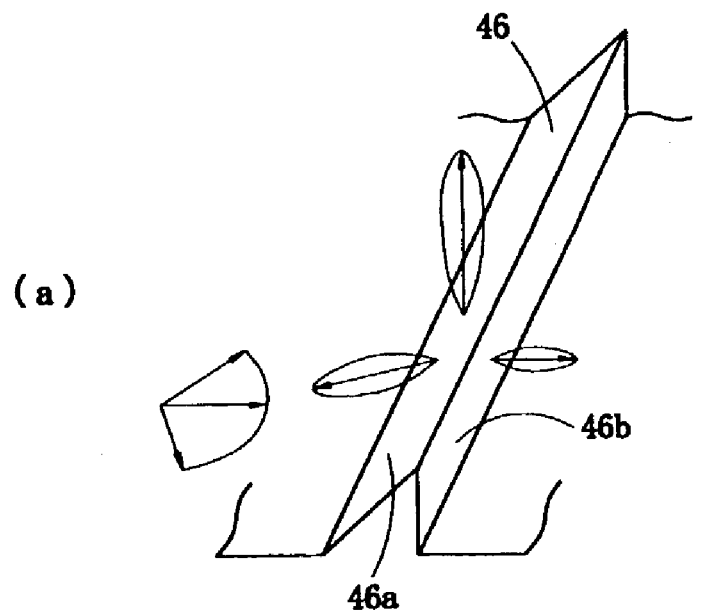
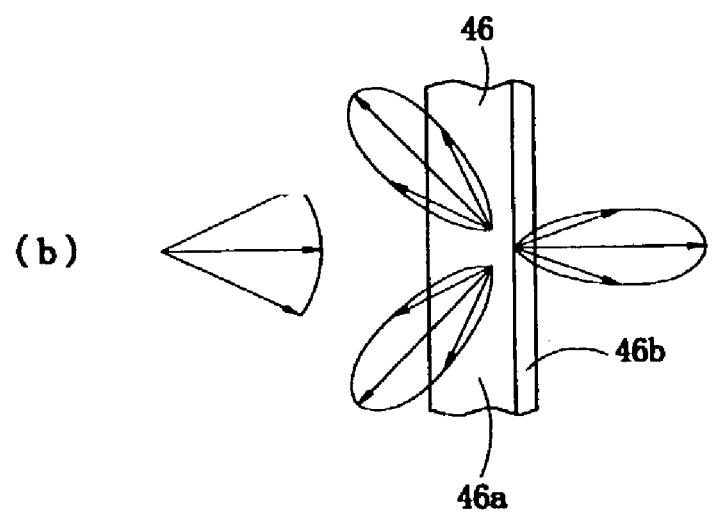
fig. 25
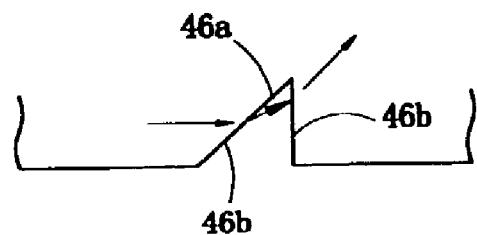
fig. 26

(a) 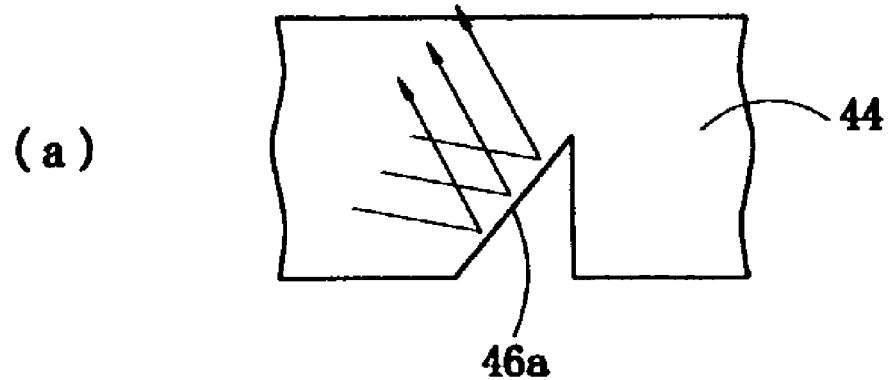
(b) 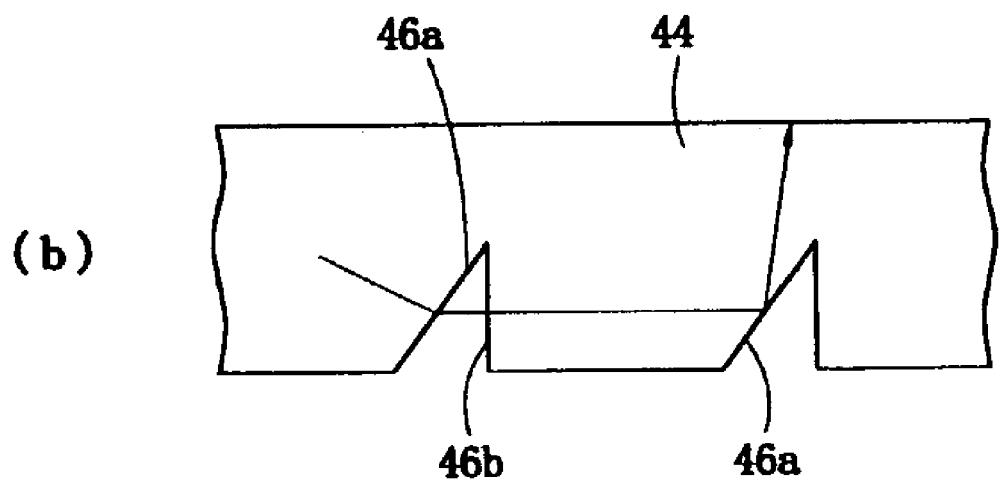
f i g. 3 4

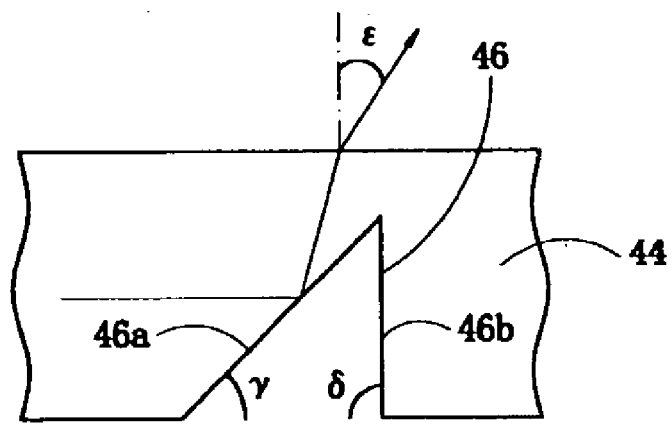
fig. 36
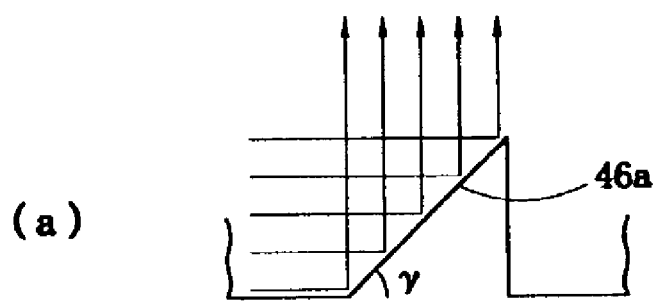
(a)
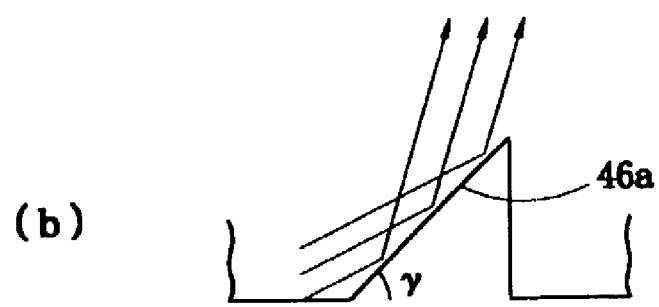
(b)
fig. 37

(a)
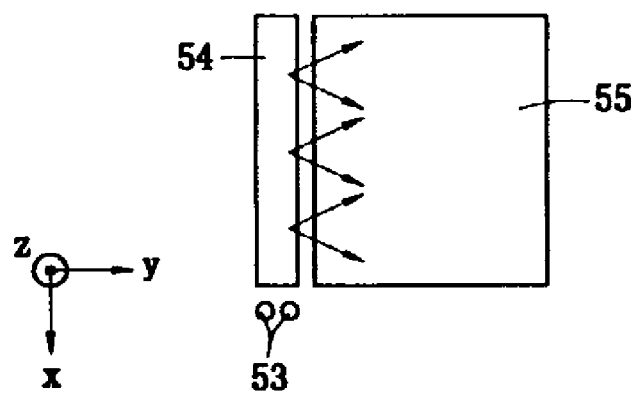
(b)
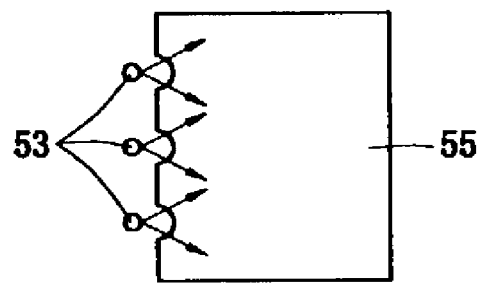
(c)
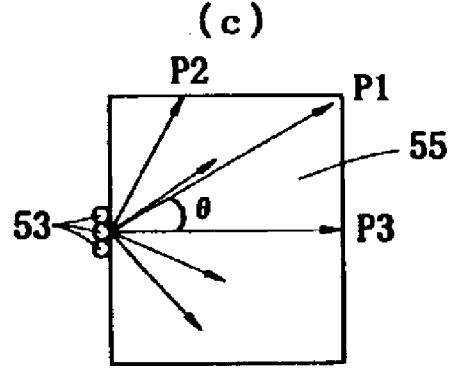
fig. 41

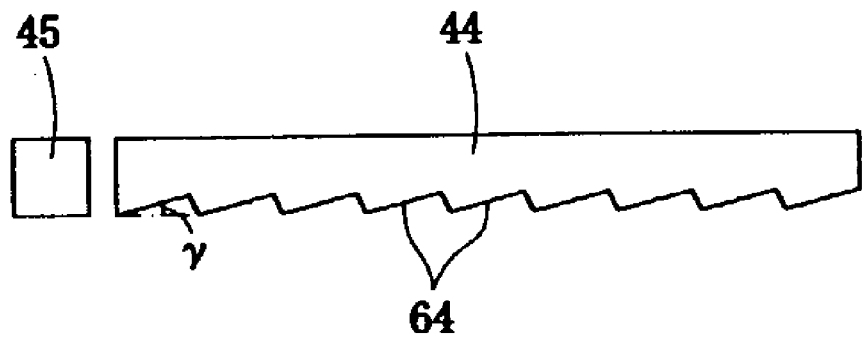
f i g . 5 7
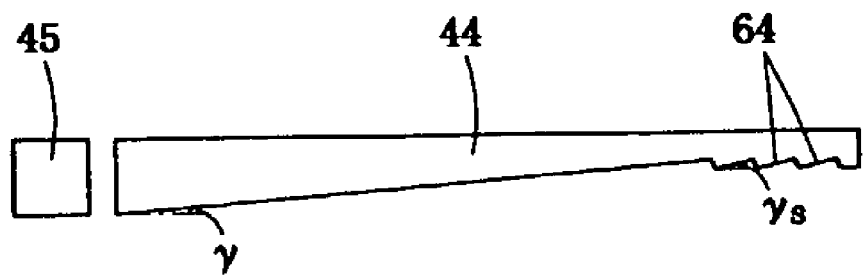
f i g . 5 8

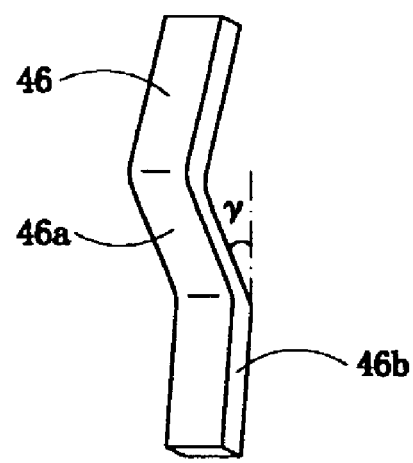
f i g .  8 7
(a)          (b)
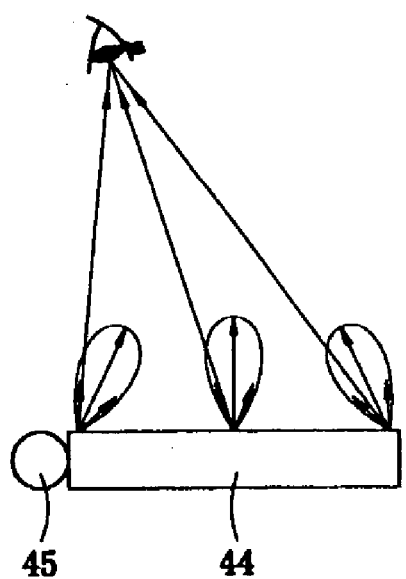 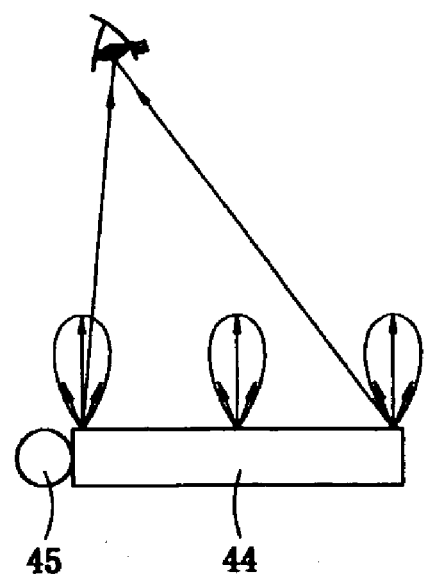
f i g .  8 8

SURFACE LIGHT SOURCE, METHOD FOR MANUFACTURING THE SAME AND APPARATUS USING IT

TECHNICAL FIELD

The present invention relates to a surface light source device and manufacturing method for the same and apparatus using the same device. More particularly, it relates to a surface light source device for use as a backlight or front light of a liquid crystal display unit or the like and manufacturing method for the same.

BACKGROUND OF THE INVENTION

The backlight or front light having a light-emitting diode (LED), as a light source, has the features of size-reduced light source, long life, high performance, unnecessary exclusive power source and so on, and in many cases is used as a light of a liquid crystal display unit used in a display of a portable apparatus. Of among these features, two points, i.e. high efficiency and small size, are particularly important. This is because the surface light source device, if high in efficiency increases the brightness on a light-emitting surface of the surface light source device, making easy to view an image on the liquid crystal display unit. Furthermore, with high efficiency, the surface light source device is decreased in consumption power and increased in battery life. Meanwhile, the portable apparatus cannot be size-reduced without the size reduction of the surface light source device. This requires reducing the area of a non-emitting region and the thickness as well.

Also, in the case of using as a display of a portable apparatus, it is satisfactory to view the display at a front thereof. There is less need to view in an oblique direction. In many cases, it is rather preferred not to be seen obliquely. Accordingly, a broad directivity characteristic is not required for the light to be emitted from the surface light source device. In order to improve the efficiency of the surface light source device, it is preferred to emit light only in a direction having a certain degree of spread, in a direction of a normal line given on a light emitting surface of the surface light source device.

Now, in FIGS. 1 and 2 is shown an explosive perspective view and sectional view of a surface light source device of a general structure. The surface light source device 1, for use as a backlight, is structured with a light conductor plate 2 for light confinement, a light emitting part 3 and a reflection plate 4. The light conductor plate 2 is formed of a transparent resin having a high refractive index, such as a polycarbonate resin or a methacrylic resin. The light conductor plate 2 has, in a lower surface, diffusion patterns 5 formed by concavo-convex working, dot printing with a diffuse-reflection ink or the like. The light emitting part 3 has a plurality of light-emitting diodes 7 mounted on a circuit board 6, and opposed to a side surface (light incident surface 2a) of the light conductor plate 2. The reflection plate 4, formed by a white-resin sheet, is bonded at both sides onto a lower surface of the light conductor plate 2 by double-sided tapes 8.

In the surface light source device 1 like this, the light, emitted from the light emitting part 3 and guided at a light incident surface 2a into the light conductor plate 2, travels while repeating regular reflections at between the upper surface (light emitting surface 2b) and the lower surface of the light conductor plate 2 as shown in FIG. 2. Upon incidence on the diffusion pattern 5, diffuse-reflection occurs. In case the incidence is at an angle smaller than a critical angle of total reflection toward the light emitting surface 2b, the light is emitted at the light emitting surface 2b to the outside. Meanwhile, the light, passed a point where there is no diffusion pattern 5 on the lower surface of the light conductor plate 2, is reflected by the reflection plate 4 to return again into the light conductor plate 2, preventing light amount loss at the lower surface of the light conductor plate 2.

However, although the surface light source device 1 having such a structure is simple in structure, it is structurally worse in light utilization efficiency. It has been impossible to emit only approximately 20% of the emission light of from the light-emitting diode 7, at the light emitting surface 2b of the light conductor plate 2.

Furthermore, in the surface light source device 1 in such a structure, in order to direct the light emitted in a direction approximate to the parallel with the light emitting surface 2b of the light conductor plate 2 toward a direction perpendicular to the light emitting surface 2b, a diffusion plate 9 is used superposed on the light conductor plate 2 as shown in FIG. 3. The surface light source device 1 has an increased thickness, making it difficult to size-reduce the surface light source device 1. Moreover, where using a diffusion plate 9, the light passed the diffusion plate 9 turns into a Lambertian light. Because of broad directivity characteristic, the brightness at the front is low, thus lowering the utilization efficiency of light.

Meanwhile, the surface light source device 1 structured as shown in FIG. 1 uses a light emitting part 3 mounted with a plurality of light-emitting diodes 7. Thus, it is difficult to size-reduce the light emitting part 3. Also, the power consumption of the surface light source device 1 cannot be reduced.

On the other hand, the surface light source device using light-emitting diodes is used on the commodities having a strong requirement of portability, such as cellular phones and PDAs, because of its reduced size and weight. There is a strong need for the life increase of the power source in view of improved portability. The reduction of power consumption is strongly desired for the surface light source device for use in the same. For this reason, there is advancement of decreasing the number of light-emitting diodes to be used.

Under this situation, there is a proposal of a surface light source device 11 as in FIG. 4 using one light-emitting diode (JP-A-11-231320). In this surface light source device 11, a light emitting part 12 is made by arranging a light-emitting diode 14 opposed to an end of a wedge-formed bar member 13, to arrange the light emitting part 12 opposed to a light incident surface 15a of a light conductor plate 15. The light conductor plate 15 also is in a wedge form to have, on its lower surface, a diffuse-reflection sheet 17 to diffuse-reflect the leak light at the lower surface of the light conductor plate 15 and return it into the light conductor plate 15. Opposed to a light emitting surface 15b of the light conductor plate 15, superposed are a diffusion plate 18 and the prism sheet 19. Also, a prism-formed pattern 16 is formed on the light incident surface 15a of the light conductor plate 15.

According to the surface light source device 1 like this, the light utilization efficiency of a light source is improved because of the capability of driving with one light-emitting diode 14. However, because light diffusion is done by the diffuse-reflection sheet 17 and diffusion plate 18, directivity is broadened as shown in FIG. 5. Due to the lower in directivity characteristic, the efficiency is not sufficient as the entire of the surface light source device 11. Furthermore, because the diffusion plate 18 and prism sheet 19 are superposed on the light conductor plate 15, the surface light source device 1 is increased in thickness. The light source 12 is size-increased by the bar-formed member 13. Thus, there has been difficulty in reducing the size.

Also, there is a showing in FIG. 6 as another surface light source device 21 using one light-emitting diode. This has one light-emitting diode 23 arranged opposed to a center of a light incident surface 22a of the light conductor plate 22, to concentrically arrange U-shaped diffusion patterns 24 about the light-emitting diode 23 in a lower surface of the light conductor plate 22. Each diffusion pattern 24 extends in a direction orthogonal to a direction connected to the light-emitting diode 23.

Then, in this surface light source device 21, the light emitted from the light-emitting diode 23 enters at the light incident surface 22a the light conductor plate 22 to travel within the light conductor plate 22. Within the light conductor plate 22, the light striking the diffusion pattern 24 is reflected upon an interface of the diffusion pattern 24 as shown in FIG. 7 and emitted toward the light emitting surface 22b in a surface of the light emitting surface 22b. Only the light incident, at an incident angle smaller than a critical angle of total reflection, on the light emitting surface 22b is allowed to emit at the light emitting surface 22b to the outside.

However, the diffusion pattern 24 is circumferentially uniform about the light source. The light if striking the diffusion pattern 24, in plan view, is not changed in traveling direction. There is no diffusion action of light in the circumferential direction about the light source. Consequently, the evenness of light in the circumferential direction is determined depending solely on the circumferential distribution of light amount of the light source or the distribution of amount of the light entered at the light incident surface into the light conductor plate.

As a result of this, the circumferential directivity characteristic is narrow in this surface light source device 21, the directivity of the light emitted from the light conductor plate 22 is extremely narrow in a widthwise direction of the light conductor plate 22 but broad in a lengthwise direction as shown in FIG. 8. For this reason, a diffusion plate for moderating the widthwise directivity is essentially required, increasing the thickness of the surface light source device 21. Meanwhile, because the diffusion plate causes diffusion not only in the widthwise direction but also in the lengthwise direction, the lengthwise directivity is extremely worsened and hence the brightness in the perpendicular direction is lowered.

Next, in FIG. 9 is shown a surface light source device 31 for use as a front light. In this surface light source device 31, a plurality of slits 33 are formed of a material different from the light conductor plate 32 or air on an upper surface of the light conductor plate 32. A linear light source 34 just like a cold-cathode tube is arranged opposed to a side surface of the light conductor plate 32. Consequently, the light, exited from the linear light source 34 to be incident on the light conductor plate 32, is totally reflected upon the slits 33 and emits at a lower surface of the light conductor plate 32. This is returned to the light conductor plate 32 by the reflection upon a reflective-type liquid crystal display panel 35, to pass through between the slits 33 and emit at the upper surface of the light conductor plate 32.

However, in the surface light source device 31 like this, because sufficiently many slits 33 cannot be provided, the utilization efficiency of light is low. Also, because the slits 33 must be formed in the interior of the light conductor plate 32, there has been a difficulty of manufacture.

Similarly, there is a proposal of a surface light source device for front light having a plurality of island regions formed different in refractivity index from the other within the light conductor plate (JP-A-7-199184). This is also insufficient in light utilization efficiency, and the manufacture is difficult.

Meanwhile, the other surface light source devices for front light include the use of a light conductor plate gradually, stepwise reduced in thickness as distant from the light source (JP-A-10-326515), the provision of a prism sheet on a lower surface of a wedge-formed conductor plate (JP-A-10-301109), the forming with a concavo-convex pattern sectionally in rectangular in a lower surface of a light conductor plate (JP-A-10-123518), and the provision with V-formed groove strips in an upper surface of a wedge-formed conductor plate (JP-A-11-64641).

In the surface light source device like this, despite having a relatively simplified structure, the utilization efficiency of light is still insufficient thus darkening the screen.

DISCLOSURE OF THE INVENTION

It is a first object of the present invention to provide a surface light source device excellent in directivity characteristic, manufacturing method for the same and apparatus using the same device.

A second object of the present invention is to provide a surface light source device excellent in light utilization efficiency, manufacturing method for the same and apparatus using the same device.

A first surface light source device according to the present invention is in a surface light source device having a light source and a light conductor plate for spreading the light introduced from the light source to nearly entire of a light emitting surface and emitting it from the light emitting surface, the surface light source device characterized in that: 50% or more of the light emitted from the light conductor plate is emitted within an area defined by angles of emission of up to 30 degrees as measured in a direction perpendicular to the light emitting surface of the light conductor plate. Herein, the area of within a predetermined angle as measured in a certain direction refers to an area within a cone where an axis inclining a predetermined angle with respect to a certain direction about a certain direction rotates about the same direction, instead of a region within a predetermined angle on one side with respect to a certain direction. Also, a certain angle as viewed in a certain direction refers merely to an angle defined with respect to a certain direction.

According to an experiment, it has been found that the light emitted outward of 30 degrees with respect to a direction perpendicular to a screen of an image display unit results in loss thus lowering visibility on the image display unit. Accordingly, by collecting the major part of the light amount emitted from the surface light source device to within 30 degrees with respect to a direction perpendicular to a light emitting surface, even where this is used for an image display unit, collection is possible to within 30 degrees with respect to a direction perpendicular to the screen, making favorable the visibility on the image display unit. The invention, without placing a prism sheet or the like on the light emitting surface, can emit 50% or more of the light emitted from the light conductor plate is emitted within an area defined by angles of emission of up to 30 degrees as measured in a direction perpendicular to the light emitting surface of the light conductor plate.

A second surface light source device according to the invention is in a surface light source device for lighting a reflective-type display device having a light source and a light conductor plate for spreading the light introduced from the light source to nearly entire of a light emitting surface and emitting it from the light emitting surface, the surface light source device characterized in that: 50% or more of the light emitted from the light conductor plate to the reflective-type display unit is emitted to an area defined by angles of within the half-width of a reflection light intensity-angle distribution on the reflective-type display device as measured in a direction perpendicular to the light emitting surface of the light conductor plate. Herein, a width at half maximum refers to an angle in a half of a full-width at half maximum.

Where structuring a reflective-type liquid crystal display unit by a reflective-type display device and a surface light source device, in case the directivity characteristic of the surface light source device is broadened, the reflection-light intensity angular characteristic of the surface light source device is gradually moderated. When the directivity characteristic of the surface light source device is broadened greater than the reflection-light angular characteristic of the image display panel, there was a lower in the intensity of a perpendicular component of the light reflected upon the image display panel. Accordingly, in the second surface light source device, the range in which, of the light amount emitted from the light conductor plate, 50% or more is emitted is provided narrower than a full-width at half maximum of a reflection light intensity-angle distribution of the reflective-type display device. Thus, the directivity characteristic of the surface light source device is made narrower than a reflection-light angular characteristic of the image display panel, making possible to enhance a front intensity of the image display unit.

A third surface light source device according to the invention is in a surface light source device having a light source and a light conductor plate nearly in a rectangular form for spreading the light introduced from the light source to nearly entire of a light emitting surface and emitting it from the light emitting surface, the surface light source device characterized in that: 50% or more of the light emitted from the light conductor plate is emitted to an area having a brightness of a half or greater of a maximum brightness value of the emission light, the area seen in both a longer-side direction and a shorter-side direction has an angle width of 30 to 70 degrees.

In a surface light source device using a light conductor plate nearly in a rectangular form, in case the major part of emission light is concentrated to a region having a brightness of a half or greater of a maximum brightness wherein the angular width (total width) is given 30–70 degrees, it is possible to obtain a preferable directivity characteristic despite not to be considered as an ideal directivity characteristic.

A fourth surface light source device according to the invention is in a surface light source device having a light source and a light conductor plate for spreading the light introduced from the light source to nearly entire of a light emitting surface and emitting it from the light emitting surface, the surface light source device characterized in that: the brightness of the light emitted from the light conductor plate perpendicularly is lower than that of the light emitted to an area around thereof.

In the fourth surface light source device, particularly the surface light source device for use on a reflective-type image display unit, the noise light caused by light leak from the surface light source device is susceptible to the effect of a directivity characteristic of the light emitted from the surface light source device whereas the light (image) returning due to the reflection upon the image display device is less changed by a change in a directivity characteristic of the surface light source device due to a diffusion characteristic of the image display device. Consequently, in case the directivity characteristic of the surface light source device is made lower in brightness than the surrounding in a direction of a perpendicular given on the light emitting surface, noise light can be reduced in a front direction and image visibility can be improved.

A fifth surface light source device according to the invention is in a surface light source device having a light source and a light conductor plate for spreading the light introduced from the light source to nearly entire of a light emitting surface and emitting it from the light emitting surface, the surface light source device characterized in that: a direction in which emission light brightness is maximum in a peripheral region of the light conductor plate is inclined to a direction of a center of the light conductor plate as compared to a direction in which emission light brightness is maximum in a central area of the light conductor plate.

By changing the orientation that is maximum in emission light brightness depending upon a position of the light conductor plate as in the fifth surface light source device, a lens action can be provided to reduce the unevenness of in-plane brightness of the surface light source device. This is possible, for example, by making somewhat different, from position to position, the form of diffusion pattern having a deflecting slant angle and light re-incident angle provided in a back surface of the surface light source device. This can provide the diffusion pattern with a lens action.

A sixth surface light source device according to the invention is in a surface light source device having a light conductor plate for spreading the introduced light to nearly entire of a light emitting surface and emitting it from the light emitting surface, a light source smaller in size as compared to a light incident surface of the light conductor plate, luminous flux shaping means for spreading the light emitted from the light source to nearly entire of the light incident surface and emitting it, the surface light source device characterized in that: 50% or more of the incident light on the light conductor plate is included in an area defined by angles of 26 degrees as viewed from a direction perpendicular to the light emitting surface of the light conductor plate.

In this sixth surface light source device, the luminous flux shaping means is used to broaden the light emitted from a small light source in a lengthwise direction of the luminous flux shaping means and collect the major part of the light amount incident on the light conductor plate to within 26 degrees as viewed in a direction perpendicular to the light emitting surface. Consequently, for also the light emitted from the light emitting surface of the light conductor plate, obtained is a high directivity of within 40 degrees in a lengthwise direction of the light incident surface of the light conductor plate.

In an embodiment of a sixth surface light source device according to the invention, two-thirds or more of the total light emitted from the luminous flux shaping means is emitted to an area defined by angles of up to 40 degrees from a lengthwise direction of a light emitting surface of the luminous flux shaping means as viewed in a direction perpendicular to the light emitting surface of the light conductor plate, the luminous flux shaping means having, at a light emitting surface side, means to deflect the light emitted from the luminous flux shaping means to a direction perpendicular to a light emitting surface of the luminous flux shaping means.

The present embodiment concerning the sixth surface light source device concentrates the major part of the light amount emitted from the luminous flux shaping means into a narrow range of within 40 degrees with respect to a lengthwise direction of the light emitting surface of the luminous flux shaping means, and causes this to emit in a perpendicular direction by the deflecting means. Accordingly, it is possible to introduce a high directivity light aligned in direction in a lengthwise direction of the luminous flux shaping means into the light conductor plate. Ultimately, the light emitted at the light emitting surface of the light conductor plate has a directivity narrowed in a direction corresponding to the lengthwise direction of the luminous flux shaping means.

In a different embodiment of a sixth surface light source device according to the invention, the luminous flux shaping means is formed of a transparent material. A regular reflection plate may be provided opposed to the opposite side of the light emitting surface.

Because the present embodiment concerning the sixth surface light source device has a reflection plate provided on an opposite surface (back surface) to the light emitting surface of the luminous flux shaping means, the light leaked at the back surface of the luminous flux shaping means can be reflected by the reflection plate to be re-incident upon the interior of the luminous flux shaping means, thus enhancing light utilization efficiency and raising the brightness on the surface light source device. Moreover, because the reflection plate uses a regular reflection plate, there is no possibility of disturbing the direction of the light emitted from the luminous flux shaping means by the light leaked from the luminous flux shaping means and reflected by the regular reflection plate to be re-incident. The light emitted from and deflected by the luminous flux shaping means can be narrowed in directivity characteristic. Incidentally, the luminous flux shaping means like this can use, for example, a transparent resin having a high refractive index formed non-parallel at between a light emitting surface and a back surface thereof.

A seventh surface light source device according to the invention is in a surface light source device having a plurality of relatively small light sources arranged with a spacing, means for decreasing a directivity of the light emitted from the light sources in a direction that the light sources are arranged, and a light conductor plate for spreading the light introduced from the light sources to nearly entire of a light emitting surface and emitting it from the light emitting surface, the surface light source device characterized in that: 50% or more of the incident light on the light conductor plate is included in an area defined by angles of 26 degrees as viewed from a direction perpendicular to the light emitting surface of the light conductor plate.

Because the seventh surface light source device causes the major part of the light amount incident on the light conductor plate to be incident on an area of within 26 degrees as viewed in a direction perpendicular to the light emitting surface, the light, to be emitted at the light emitting surface of the light conductor plate, in its major part is emitted into an area of nearly 40 degrees in a direction that the spot light sources are arranged. Meanwhile, the light emitted from the plurality of small light sources arranged at an interval has a directivity narrowed, before incidence on the light conductor plate, in the light source arranging direction. Consequently, within the light conductor plate, the directivity may be narrowed only in a thickness direction of the light conductor plate. Accordingly, within the light conductor plate, the directivity is aligned in one direction thus facilitating to control light and raising the controllability of the light to be emitted at the light emitting surface of the light conductor plate. Also, the light to be incident on the light conductor plate has a directivity narrowed in one direction. Because in this direction there is no necessity to raise the directivity of the light by the light conductor plate, the light conductor plate can be easily reduced in thickness.

In an embodiment of the sixth or seventh surface light source device according to the invention, in the area, 50% or more of the incident light on the light conductor plate may not be concentrated in an area defined by angles of up to 10 degrees in every direction.

In the present embodiment of the sixth or seventh surface light source device, because the major part of the light amount incident on the light conductor plate does not concentrate into a narrow range of within 10 degrees in any direction, by merely, somewhat moving a line of sight, light reaches and does not reach the eye and hence flicker less occurs.

In a different embodiment of a sixth or seventh surface light source device according to the invention, at least one of the light emitting surface and the opposite surface of the light conductor plate is provided with a concavo-convex formed pattern having a deflecting slant surface which is slanted so that a normal line directed inside of the light conductor plate inclines to a direction that the light source is arranged, a direction of the normal line and a direction of light's traveling within the light conductor plate being in parallel as viewed in a direction perpendicular to the light emitting surface of the light conductor plate.

In the present embodiment concerning the sixth or seventh surface light source device, formed is a concavo-convex pattern having a deflecting slant surface slanted such that a normal line directed toward the inside of the light conductor plate inclines toward a direction arranging the light sources. Because the direction of the normal line and direction of light's traveling within the light conductor plate are in parallel as viewed in a direction perpendicular to the light emitting surface of the light conductor plate, part of the light incident on the deflecting slant surface as viewed in a direction perpendicular to the direction of light's traveling is totally reflected upon the deflecting slant surface and emitted at the light emitting surface, while the remaining light transmits through the deflecting slant surface. As a result of this, of the light incident on the deflecting slant surface, only the light incident at a particular angle is allowed to emit at the light emitting surface. As viewed in this direction, the light emitted at the light emitting surface is narrowed in its directivity.

In a further different embodiment of a sixth or seventh surface light source device according to the invention, of a total light amount emitted to a plane including a direction of light's traveling within the light conductor plate and perpendicular to the light emitting surface of the light conductor plate, two-thirds or more of the light being emitted to an area defined by angles of up to 40 degrees with respect to the light emitting surface of the light conductor plate, the light conductor plate having, at a light emitting surface side, means to deflect the light emitted from the light emitting surface to a direction perpendicular to the light emitting surface.

In the present embodiment concerning the sixth or seventh surf ace light source device, the major part of the light of within the light conductor plate is concentrated into a narrow range of 40 degrees with respect to the light emitting surface of the light conductor plate. This is emitted in a perpendicular direction by the deflecting means. Consequently, it is possible to emit a light high in directivity aligned in direction at the light emitting surface of the light conductor plate. Furthermore, with the deflecting means, it is possible to narrow the directivity of the light to be emitted at the light emitting surface of the light conductor plate.

In a further different embodiment of a sixth or seventh surface light source device according to the invention, the angle defined by a normal line direction of the deflecting slant surface and a direction perpendicular to the light emitting surface of the light conductor plate is 10 degrees or smaller, a regular reflection plate being provided on the opposite side of the light emitting surface of the light conductor plate.

According to the present embodiment concerning the sixth or seventh surface light source device, the angle defined by a normal line direction of the deflecting slant surface and a direction perpendicular to the light emitting surface of the light conductor plate is 10 degrees or smaller. The light extracted at the light emitting surface when an incident light is smaller than a critical angle of total reflection due to the total reflection at between the light emitting surface and the opposite surface can be obtained aligned to a narrow angle. In particular, in case the angle defined between a normal-line direction on the deflecting slant surface and a direction perpendicular to the light emitting surface of the light conductor plate is made 10 degrees or smaller, light emission is possible to a narrow range of approximately ?20 degrees. In this manner, the light emitted nearly parallel with the light emitting surface of the light conductor plate can be directed to a direction perpendicular to the light emitting surface by the light deflecting means arranged, for example, opposite to the light emitting surface of the light conductor plate.

An eighth surface light source device according to the invention is in a surface light source device having a light source and a light conductor plate for spreading the light introduced from the light source to nearly entire of a light emitting surface and emitting it from the light emitting surface, the surface light source device characterized in that: the light conductor plate having a plurality of deflecting slant surfaces to totally reflect a light traveling in the light conductor plate and emitting it from a light emitting surface; as viewed in a direction perpendicular to the light emitting surface of the light conductor plate, a direction of light's traveling within the light conductor plate being aligned nearly in one direction at each position, and a normal line direction of the deflecting slant surface being distributed within 30 degrees about a direction of light's traveling; and the deflecting slant surface in a plane including a direction of light's traveling within the light conductor plate and perpendicular to the light emitting surface having a section of a straight line.

According to the eighth surface light source device, because the light conductor plate has a plurality of deflecting slant surfaces to totally reflect the light traveling in the light conductor plate and emit it at the light emitting surface, by transmitting the light incident on the deflecting slant surface at an incident angle smaller than the total reflection angle, the directivity of the emission light can be narrowed as viewed in a direction perpendicular to a section of the deflecting slant surface. On the other hand, as viewed in a direction perpendicular to the light emitting surface of the light conductor plate, the direction of light's traveling of within the light conductor plate is aligned nearly in one direction at each position and the normal-line direction on the deflecting slant surface is distributed about the direction of light's traveling. Accordingly, the directivity angle can be broadened by totally reflecting on the deflecting slant surface the light having an extremely narrow directivity angle as viewed from the light emitting surface. Consequently, it is possible to emit at a proper directivity angle the light having an excessively wide directivity angle in a direction perpendicular to the light incident surface of the light conductor plate but an excessively narrow directivity angle in a direction parallel with the light incident surface of the light conductor plate. Thus, light loss can be reduced as less as possible to improve front brightness. In particular, by distributing the deflecting slant surfaces within an angle of within 30 degrees as viewed from the light emitting surface, the light to be emitted at the light emitting surface of the light conductor plate can be broadened to approximately ±45 degrees.

A ninth surface light source device according to the invention is in a surface light source device having a light source and a light conductor plate for spreading the light introduced from the light source to nearly entire of a light emitting surface and emitting it from the light emitting surface, the surface light source device characterized in that: at least one of the light emitting surface of the light conductor plate and the opposite surface is provided with concave-formed patterns in plurality structured with a deflecting slant surface for total reflection of light and a light re-incident surface for re-incidence of the light transmitted through the deflecting slant surface; the concave-formed pattern having a section in a triangular groove form having a deflecting slant surface and a light re-incident surface, and a section nearly uniform in a direction perpendicular to a direction of light's traveling within the light conductor plate, the deflecting slant surface having an inclination of 45–65 degrees relative to a surface having the concave-formed patterns; and as viewed in a direction perpendicular to a plane including a direction of light s traveling within the light conductor plate and perpendicular to the light emitting surface of the light conductor plate, 50% or more of the light emitted from the light emitting surface of the light conductor plate being included in a range of within 30 degrees as viewed from the light emitting surface.

In the ninth surface light source device, because formed in plurality the concave-formed patterns structured with a deflecting slant surface to totally reflect light and a light re-incident surface for the light transmitted through the deflecting slant surface to be re-incident, the light traveling in the light conductor plate can be emitted at the light emitting surface of the light conductor plate by total reflection upon the deflecting slant surface. Meanwhile, because the light transmitted through the deflecting slant surface returns at the light re-incident surface into the light conductor plate, there is less possibility that the light transmitted through the deflecting slant surface results in loss. Thus, the light utilization efficiency can be enhanced to increase the brightness on the surface light source device. Furthermore, in case the surface having the concave-formed patterns is provided with an inclination of 45–60 degrees, the major part of the light amount to be emitted at the light emitting surface of the light conductor plate can be emitted to a narrow range of within 30 degrees as measured from the light emitting surface. Accordingly, in case this is deflected to a direction perpendicular to the light emitting surface by proper deflecting means, it is possible to obtain a narrow directivity of within 30 degrees in that direction.

In an embodiment concerning a first to sixth, eighth or ninth surface light source device according to the invention, a relatively small light source is arranged at an end on a side of a shorter side of the light conductor plate nearly in a rectangular form, a light emitting surface of the light source being directed to a corner positioned in a diagonal direction of the light conductor plate.

According to the present embodiment concerning the first to sixth, eighth or ninth surface light source device, it is easy for light to reach a corner diagonally opposed to a light-conductor-plate corner in the vicinity of the arrangement of the light source, thus raising brightness at this corner.

A tenth surface light source device according to the invention is in a surface light source device having a light source and a light conductor plate nearly in a rectangular form for spreading the light introduced from the light source to nearly entire of a light emitting surface and emitting it from the light emitting surface, the surface light source device characterized in that: a relatively small light source is arranged at an end on a side of a shorter side of the light conductor plate, a shorter side of the light conductor plate arranged with the light source and a longer side of the light conductor plate positioned on a side close to the light source having parts inclining relative to the respective opposed shorter side and longer side.

According to the tenth surface light source device, the shorter side of the light conductor plate where the light source is arranged and the longer side of the light conductor plate positioned on a side close to the light source are inclined relative to the respective opposed shorter side and longer side. Consequently, by properly selecting an inclination angle of the inclining part, the light emitted from the light source and reflected upon the inclining part can be directed toward an arbitrary direction. Particularly, by reflecting light toward the part where light is difficult to reach and is ready to darken, it is possible to make even the brightness distribution on the surface light source device.

An eleventh surface light source device according to the invention is in a surface light source device having a light source and a light conductor plate for spreading the light introduced from the light source to nearly entire of a light emitting surface and emitting it from a light emitting surface, the surface light source device characterized in that: the light source has a wavelength spectrum having a plurality of peaks, the light conductor plate having a anti-reflection film formed on the light emitting surface thereof, the anti-reflection film has minimum values of reflective-index waveform dependency for a perpendicular incident light existing at a plurality of points, a maximum wavelength difference of the minimum values at the plurality of points being greater than a maximum wavelength difference of a plurality of peaks of the light source.

According to the eleventh surface light source device, even where the wavelength spectrum of the light source has a plurality of peaks as in a light-emitting diode, in case the maximum wavelength difference between a plurality of minimum values of reflective-index wavelength dependency for a perpendicular incident light possessed by the anti-reflection film is greater than the maximum wavelength difference between a plurality of peaks of the light source, it is possible to effectively suppress the shine due to the light of the light source.

A twelfth surface light source device according to the invention is in a surface light source device having a light source and a light conductor plate for spreading the light introduced from the light source to nearly entire of a light emitting surface and emitting it from a light emitting surface, the surface light source device characterized in that: a plurality of concave-formed patterns are formed on the opposite side of the light emitting surface of the light conductor plate, anti-reflection films different in reflection characteristic from each other being formed on the light emitting surface of the light conductor plate and on an opposite surface thereto.

According to the twelfth surface light source device, because formed are anti-reflection films different in reflection characteristic from each other on the light emitting surface of the light conductor plate and the opposite surface, by selecting a proper film thickness depending upon a main or back surface of the light conductor film, it is possible to effectively suppress the shine on the screen upon use on an image display unit. For example, the film thickness of an anti-reflection film is determined for the surface on the side forming the concave-formed pattern in a manner preventing the reflection of external light while the reflection due to the light-source light can be suppressed on the opposite side to the concave-formed pattern. Incidentally, this embodiment is effective for the case of using the surface light source device as a front light.

A thirteenth surface light source device according to the invention is in a surface light source device having a light source and a light conductor plate for spreading the light introduced from the light source to nearly entire of a light emitting surface and emitting it from a light emitting surface, the surface light source device characterized in that: the light conductor plate has a plurality of concave-formed patterns formed on the opposite side of the light emitting surface, an anti-reflection film being formed on the opposite side of the light reflection surface, the anti-reflection film having a film thickness of the anti-reflection film at a boundary part between a planar surface not in a concave-formed pattern and the concave-formed pattern different from a film thickness of the anti-reflection film in the planar surface.

According to the thirteenth surface light source device, in the opposite surface to the light emitting surface of the light conductor plate, the anti-reflection film at a boundary between the concave-formed pattern and a planar surface is made different in film thickness from the planar surface. Accordingly, in the planar surface other than the concave-formed pattern, the film thickness of the anti-reflection film is determined in a manner preventing the reflection of external light. In the boundary at an edge of the concave-formed pattern, the film thickness of the anti-reflection film is determined in a manner suppressing the reflection due to the light-source light. In this manner, by selecting a proper film thickness depending on a position, shine can be effectively prevented. Meanwhile, the shine due to external light and the shine due to the light-source light can be suppressed more easily by controlling the film thickness rather than changing the material of the anti-reflection film. Incidentally, this embodiment is effective particularly for the case of using the surface light source device as a front light.

Because the respective surface light source devices of the invention are structured as in the above, there is no possibility to narrow the directivity characteristic of the surface light source device to such an extent as causing flicker in the image. Meanwhile, because the directivity characteristic is restricted to certain narrowness, light loss is reduced and front brightness is improved.

A method for manufacturing a surface light source device according to the invention is a method for manufacturing a surface light source device according to claim 11, 15, 19 or 20 having a plurality of concave-formed patterns formed on the opposite side of the light reflecting surface of the light conductor plate, the manufacturing method for a surface light source device comprises: a process of injection-forming a larger plate than a desired light conductor plate; and a process of cutting off undesired part of the plate.

According to the method for manufacturing a surface light source device according to the invention, instead of directly forming a light conductor plate in a target form, a light conductor plate greater than that is first formed and thereafter it is cut to obtain an objective light conductor plate. Accordingly, a large-sized light conductor plate can be made in a form favorable in the resin fluidity during forming. Accordingly, it is possible to prevent the difficulty in achieving the pattern transferability for evenness over the entire surface due to the uneven resin flow during forming, or the readiness to cause warp in the light conductor plate.

A liquid crystal display unit according to the invention comprises a liquid crystal display panel for generating an image and a surface light source device according to any one of claims 1 to 20 for lighting the liquid crystal display panel. According to the liquid crystal display unit of the invention, the visibility of display on the liquid crystal display unit is improved for easy viewing.

A cellular phone according to the invention is in a cellular phone having a transceiver function, the cellular phone characterized by comprising a display section including a liquid crystal display unit according to claim 22. According to the cellular phone of the invention, the visibility of display on the cellular phone is improved for easy viewing.

An information terminal unit according to the invention is in an information terminal unit having an information processing function, the information terminal unit characterized by comprising a display section including a liquid crystal display unit according to claim 22. According to the information terminal unit of the invention, the visibility of display on the information terminal unit is improved for easy viewing.

Incidentally, the structural elements of this invention explained above can be combined to a possible extent.

BRIEF DESCRIPTION OF THE DRAWINGS

FIG. 11 is a view representing one example of a directivity characteristic shown for comparison;

FIG. 12($a$) is a characteristic view showing one example of a preferred directivity characteristic, FIG. 12($b$) is a characteristic view showing one example of a more preferred directivity characteristic;

Figure 18:
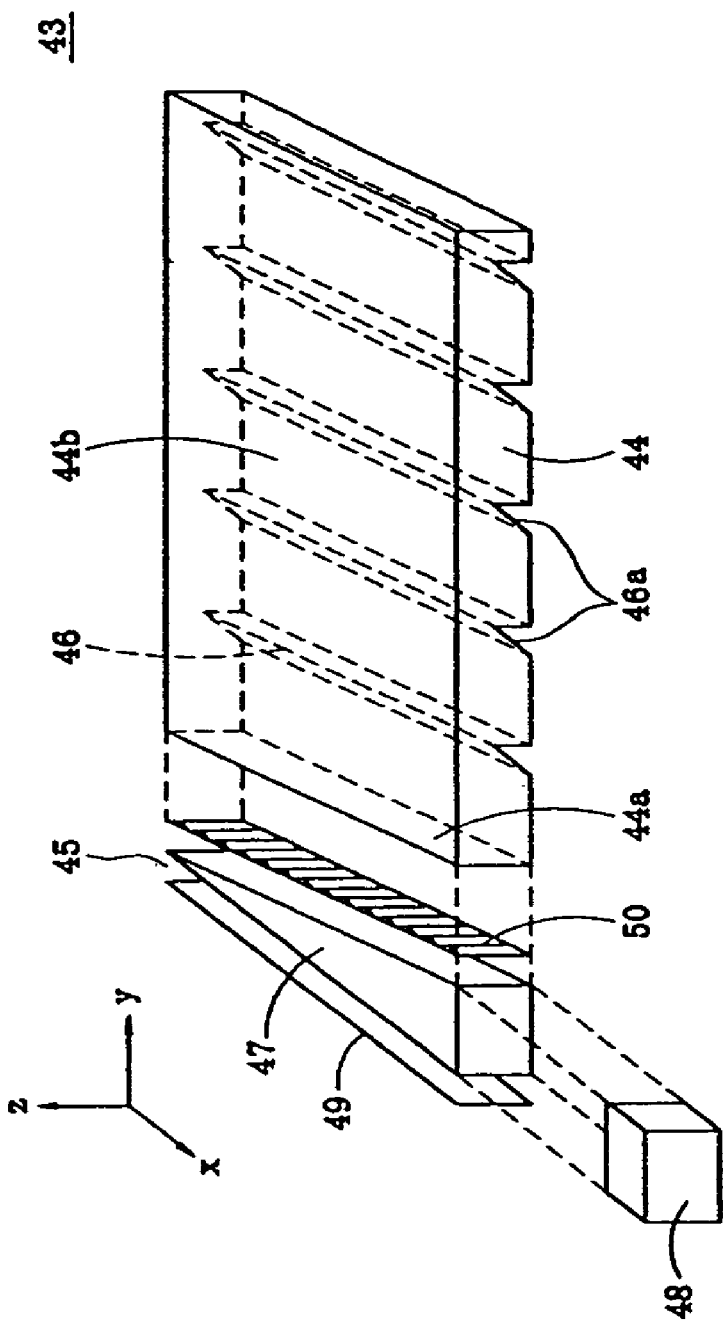
Figure 19:
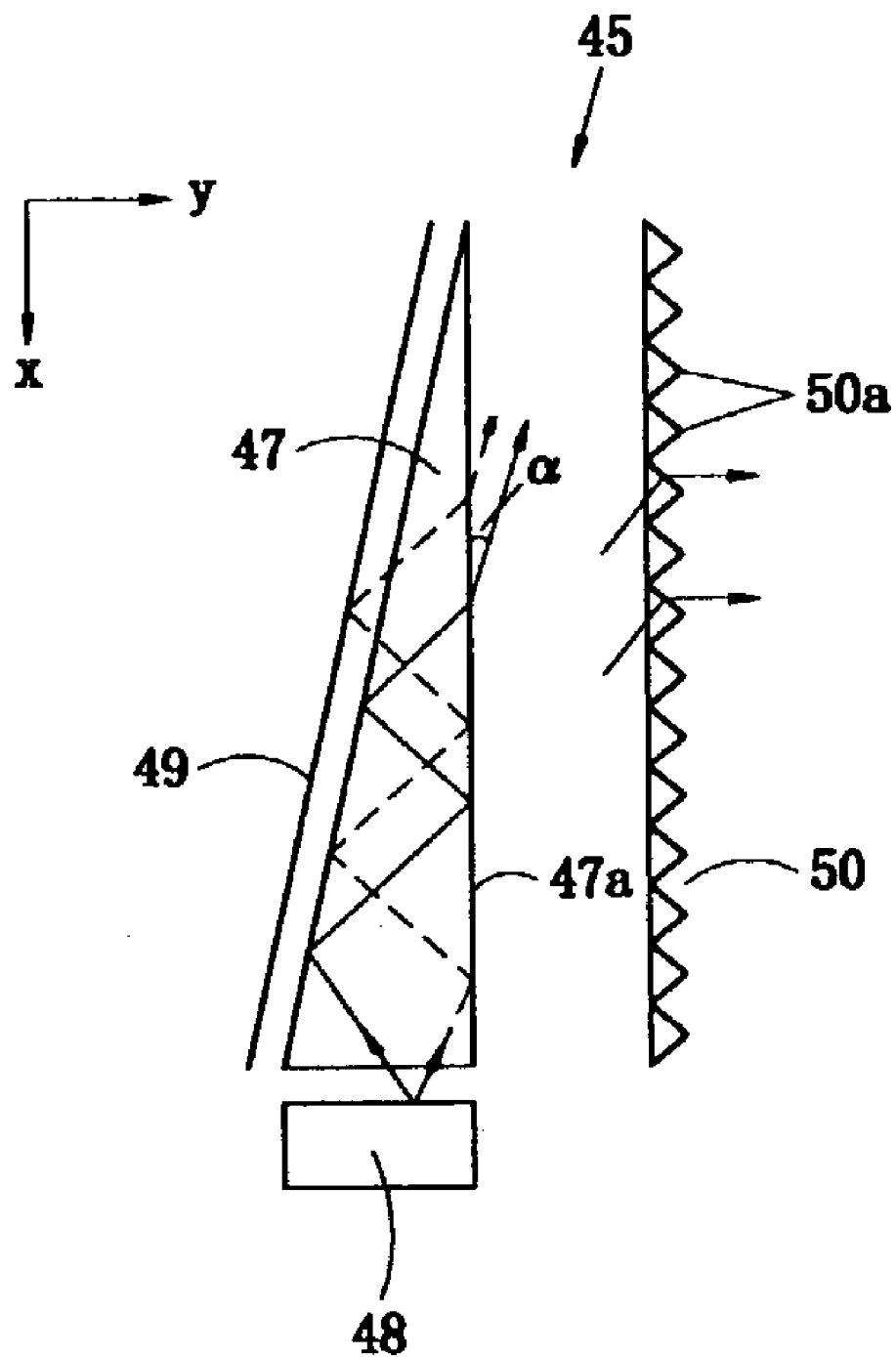
Figure 20:
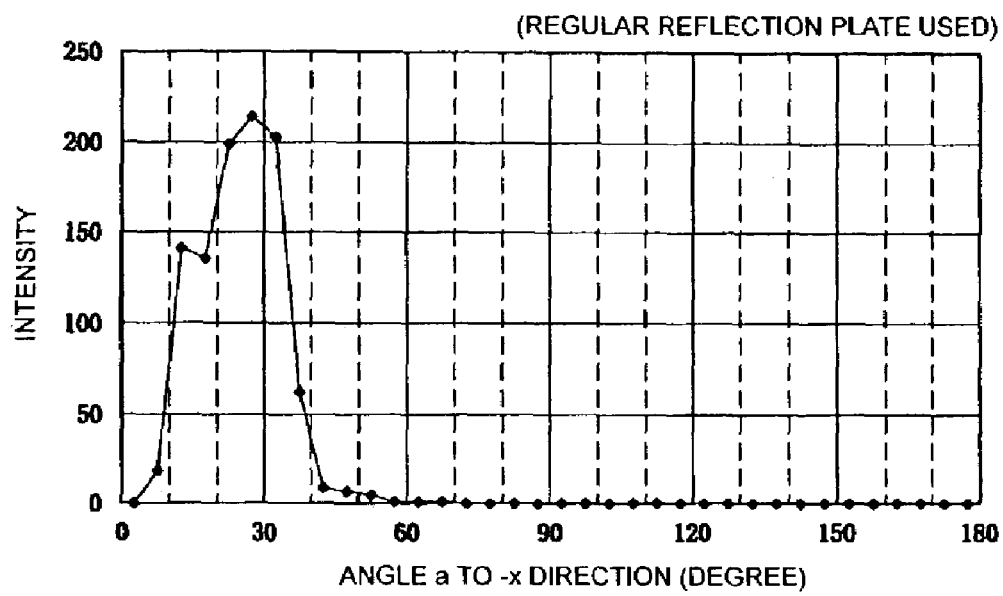
Figure 21:
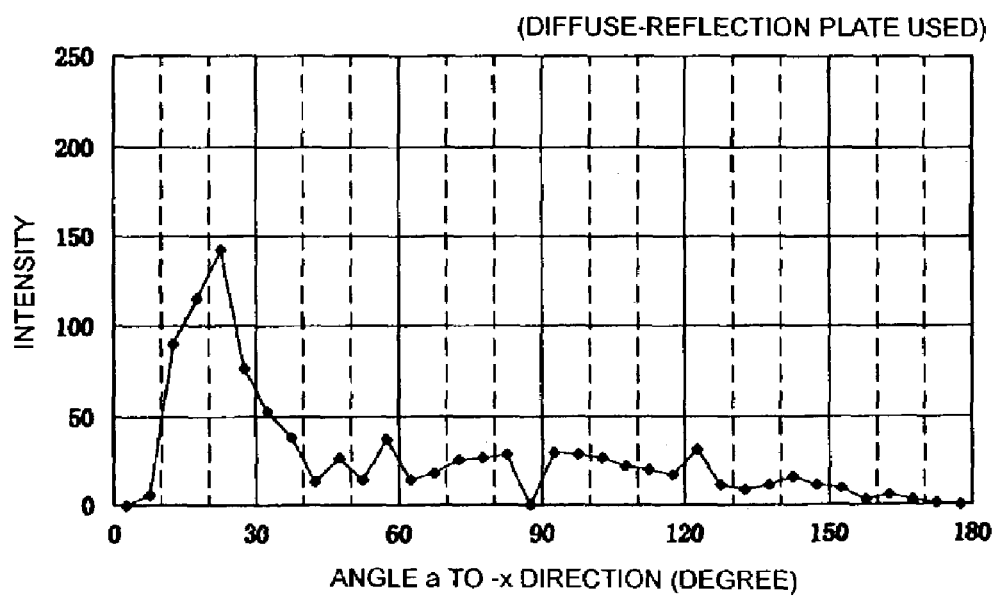
Figure 22:
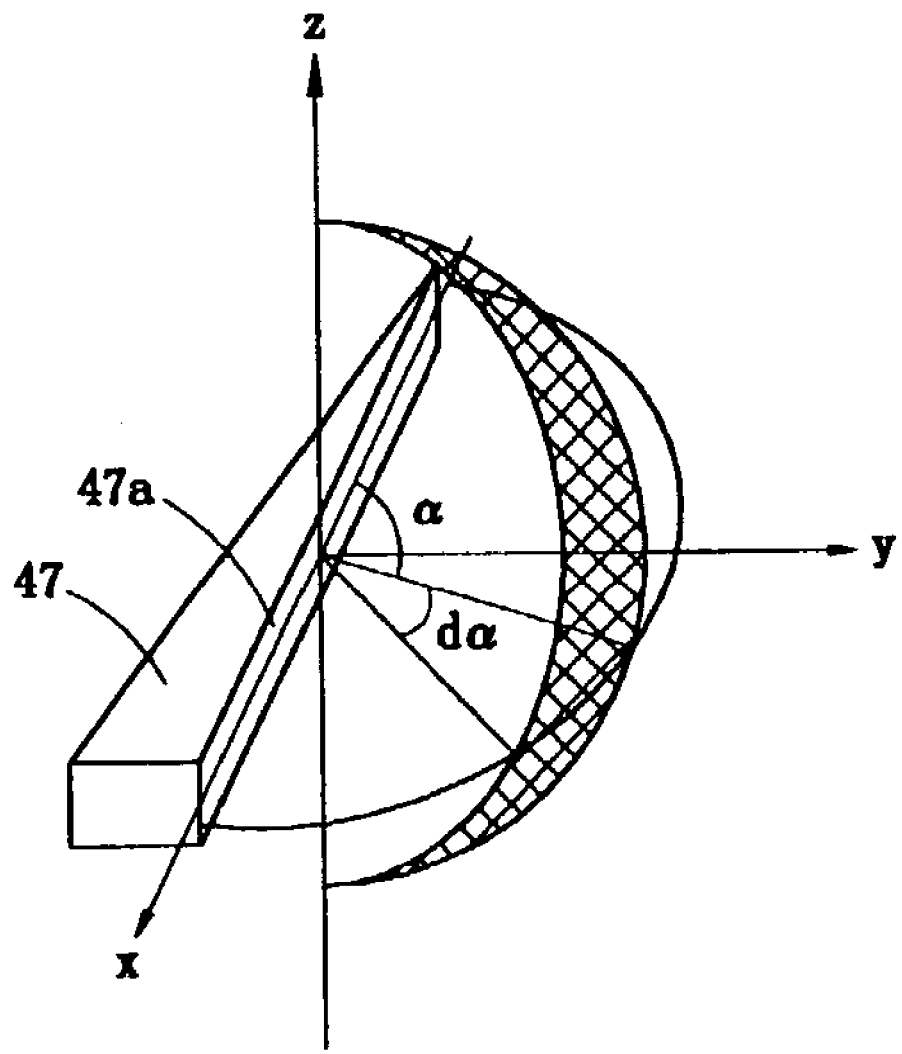
Figure 24:
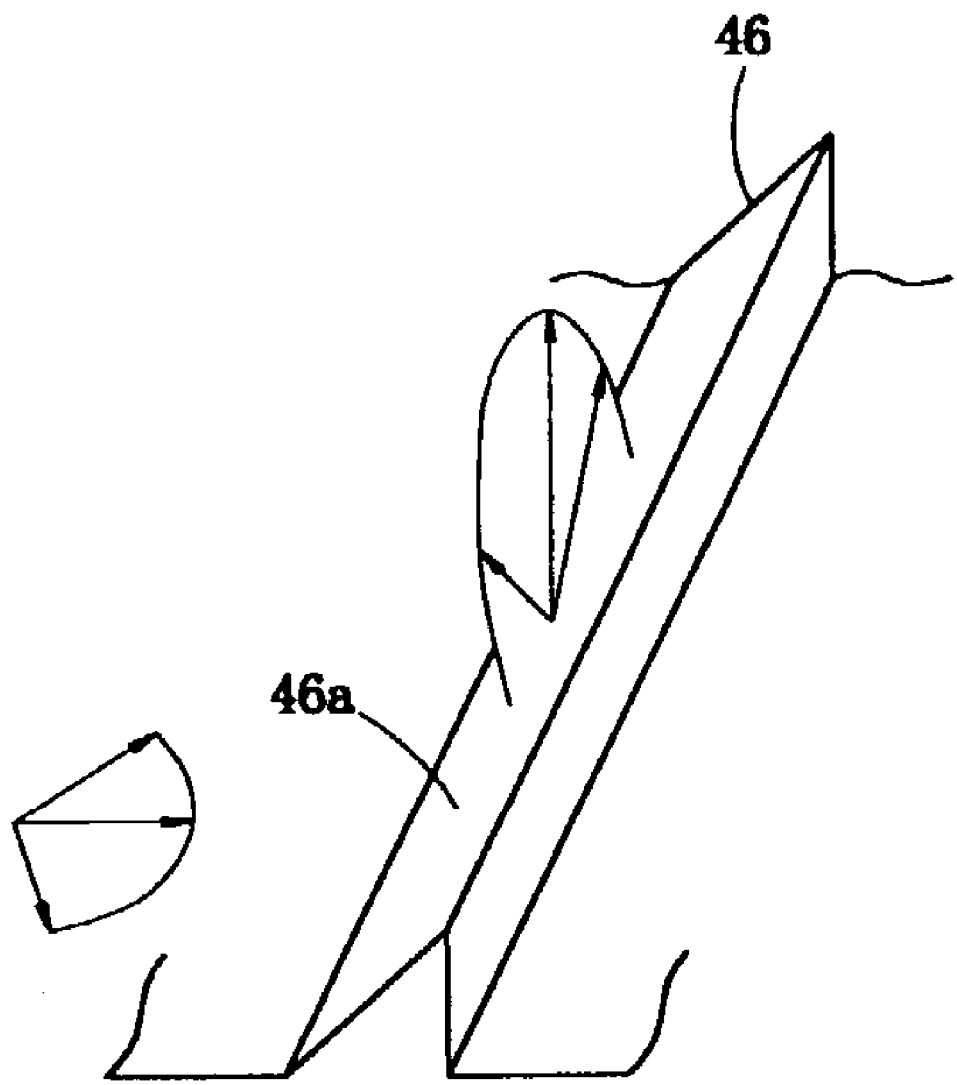
Figure 27:
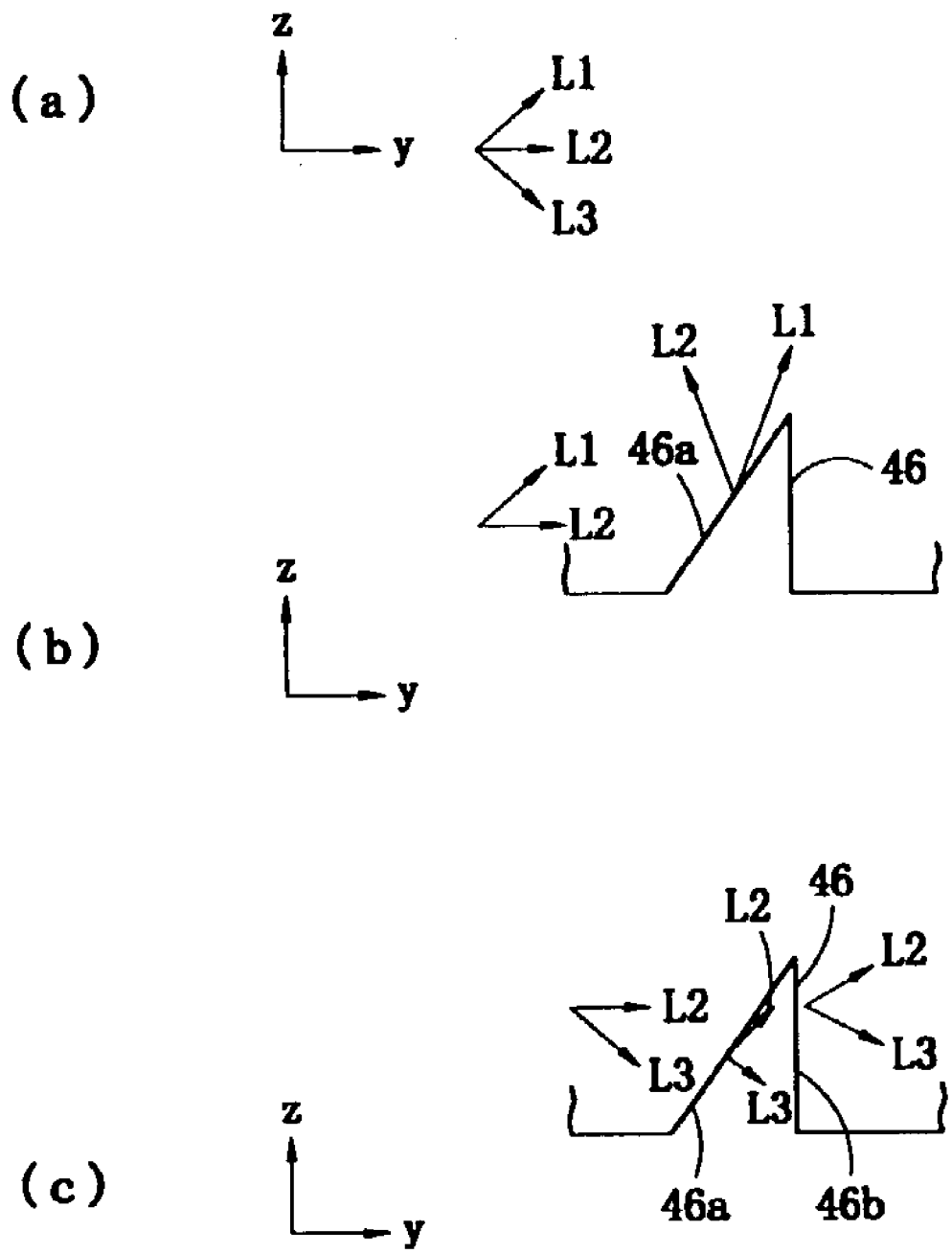
Figure 28:
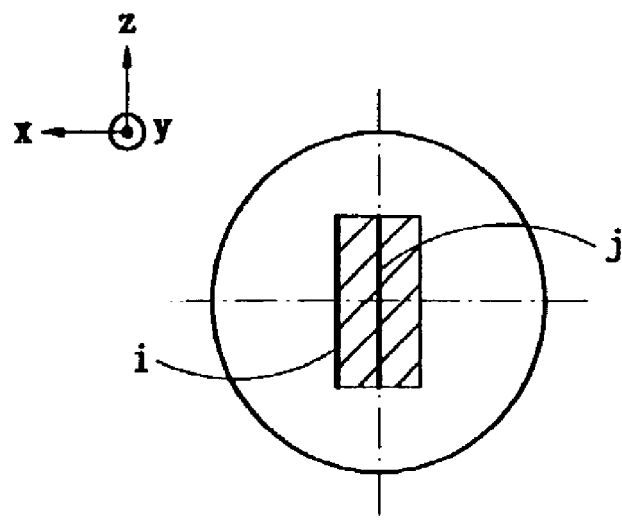
Figure 29:
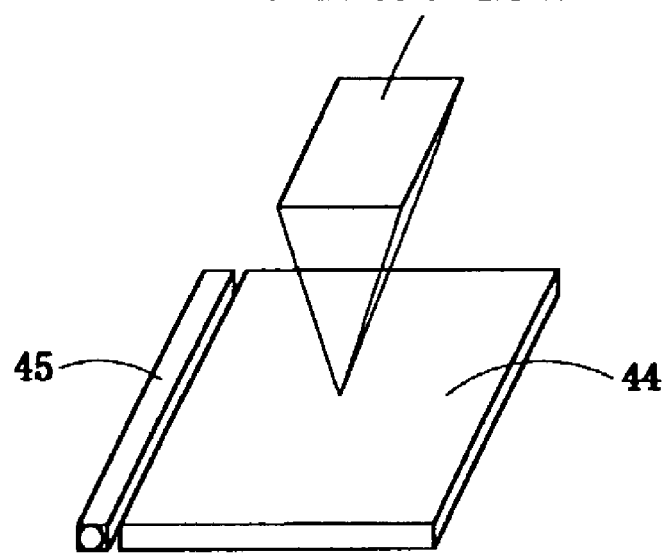
Figure 30:
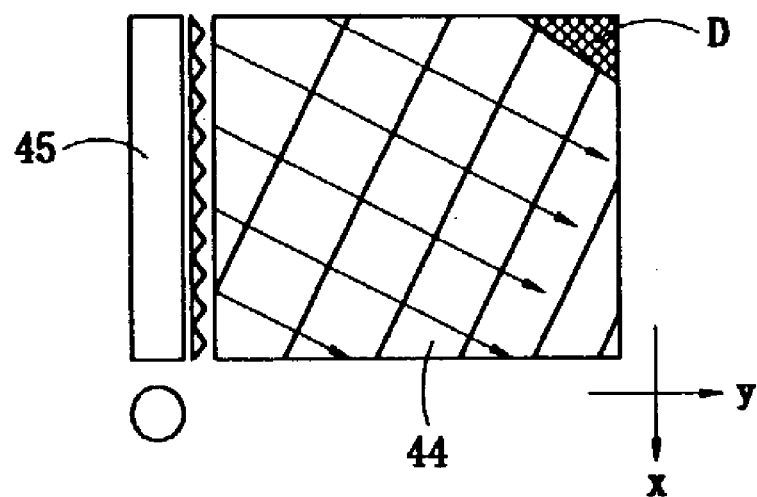
Figure 31:
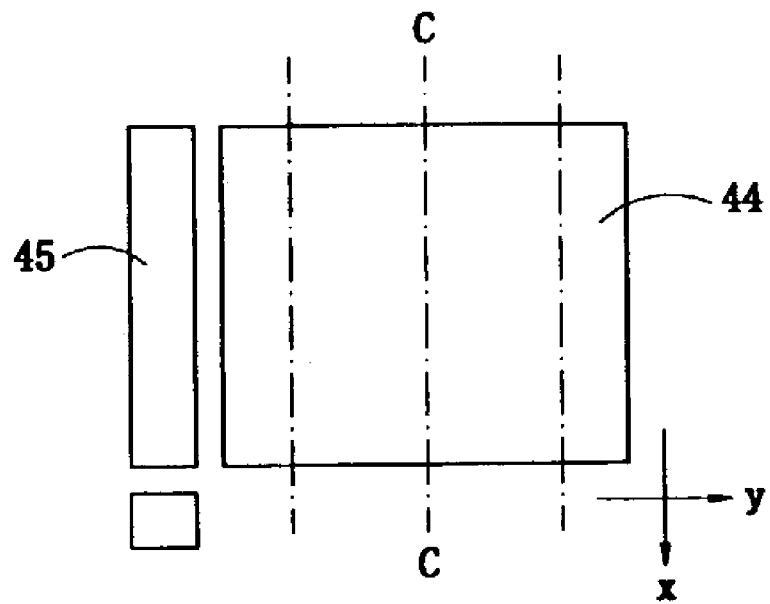
Figure 32:
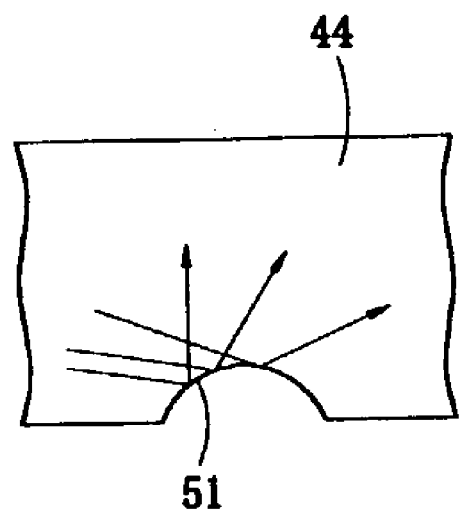
Figure 33:
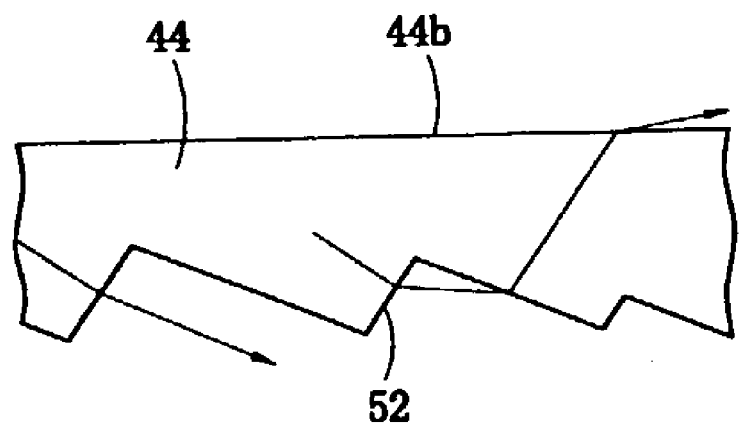
Figure 35:
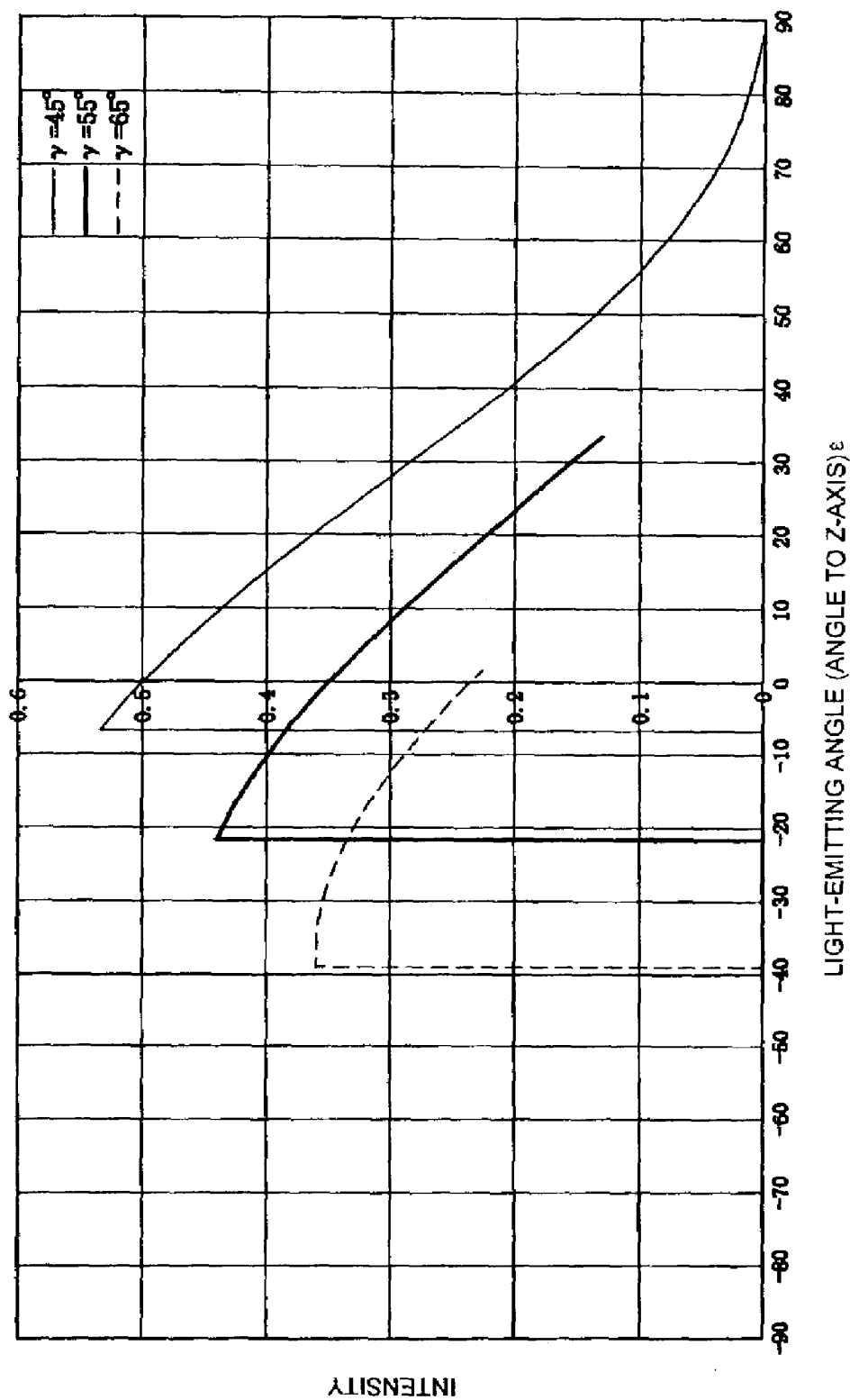
Figure 38:
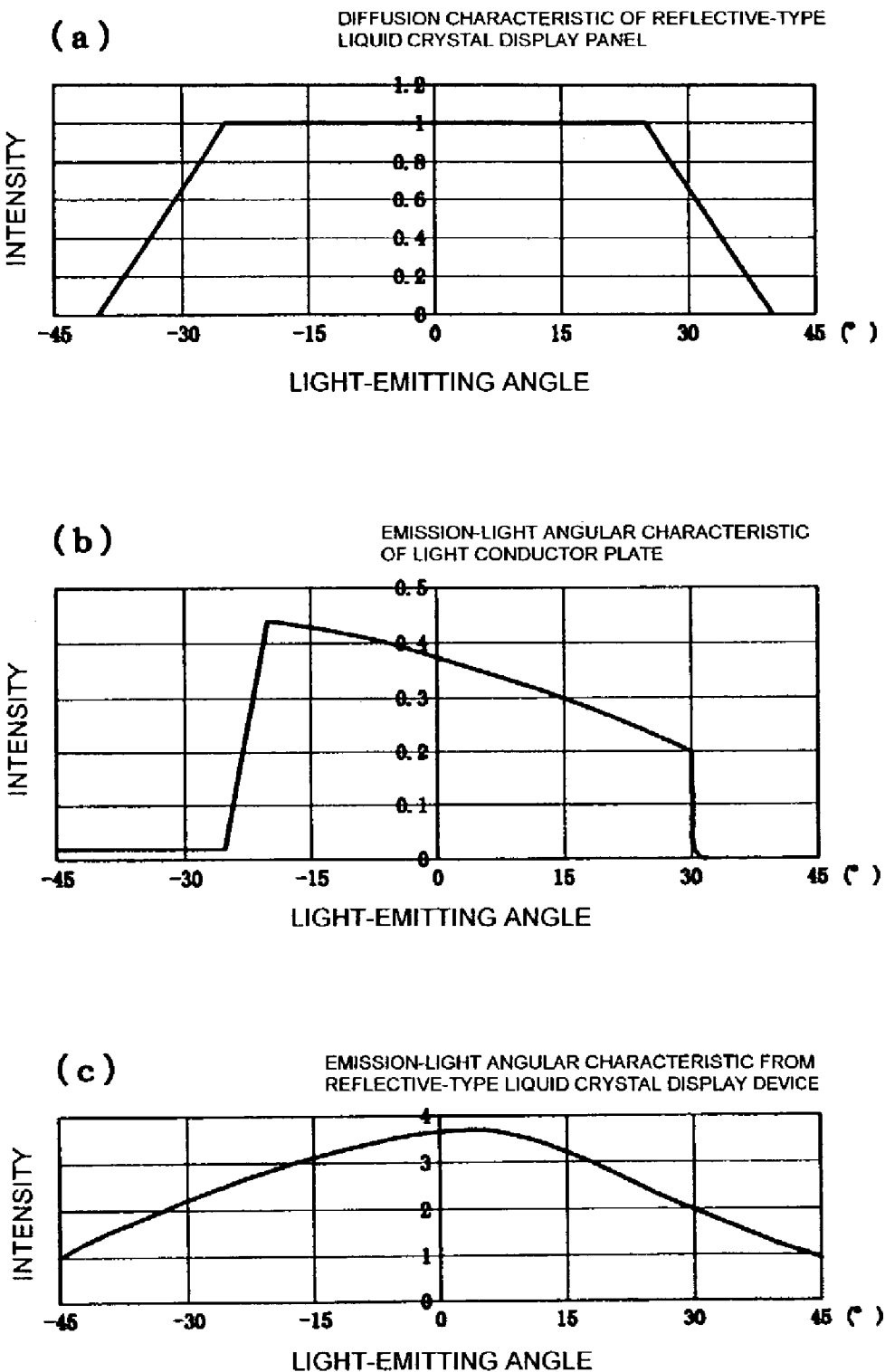
Figure 39:
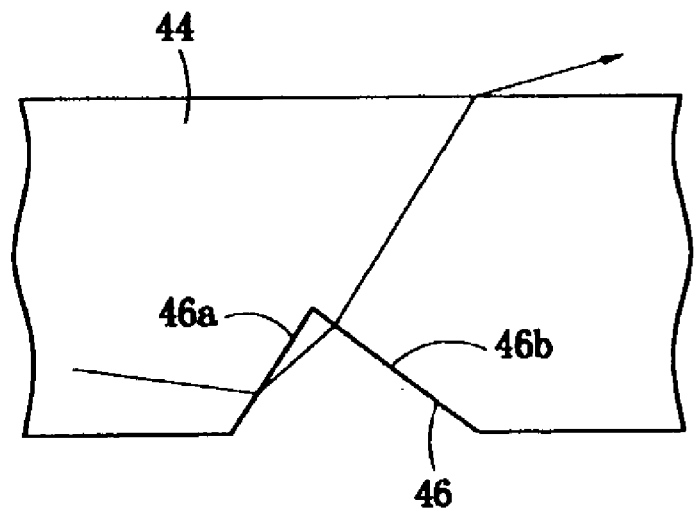
Figure 40:
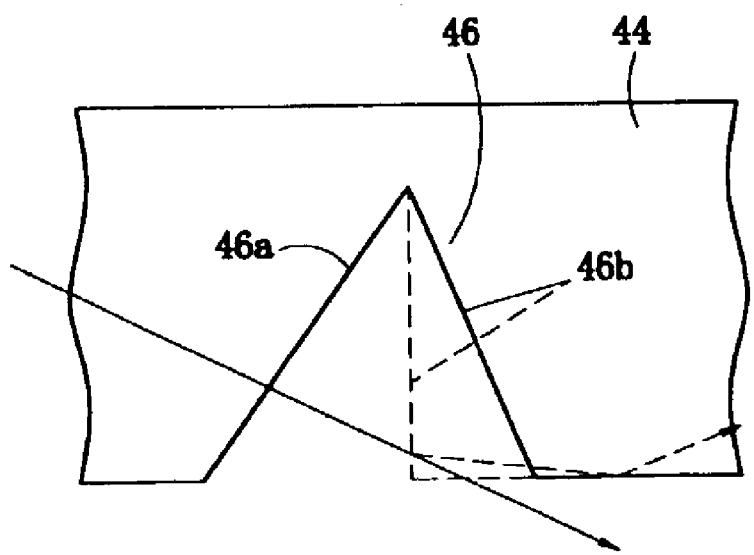
Figure 42:
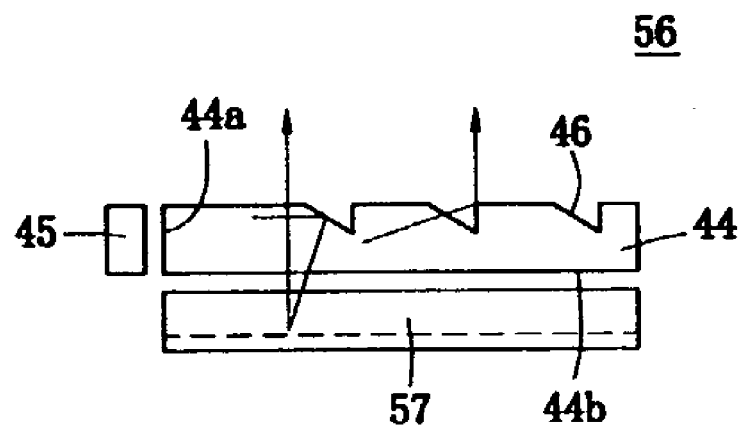
Figure 43:
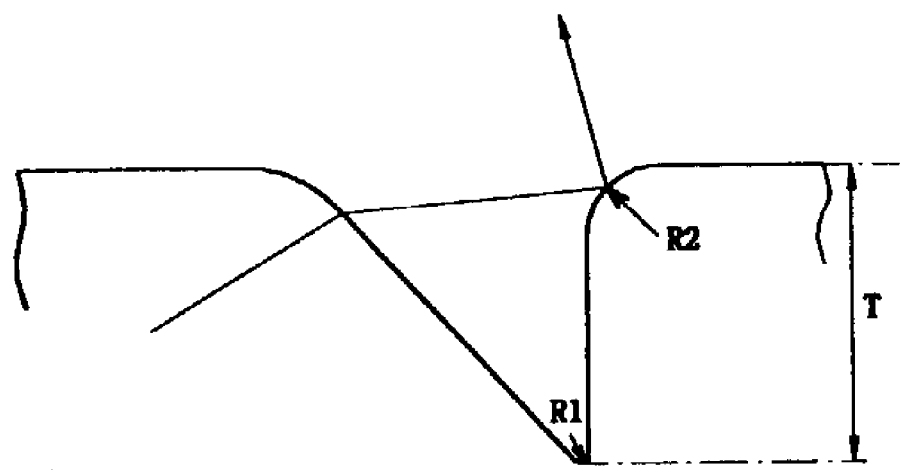
Figure 44:
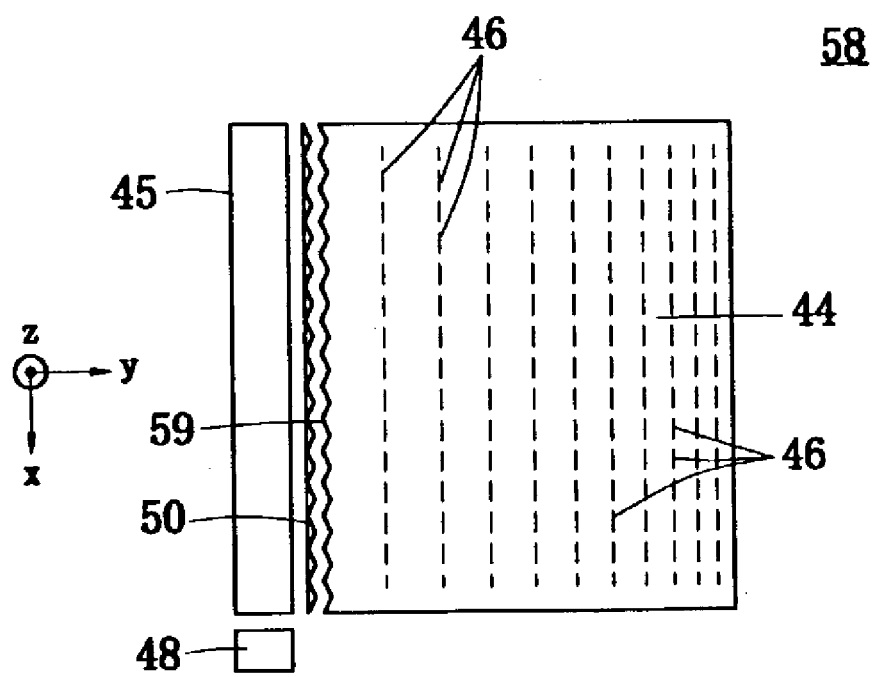
Figure 45:
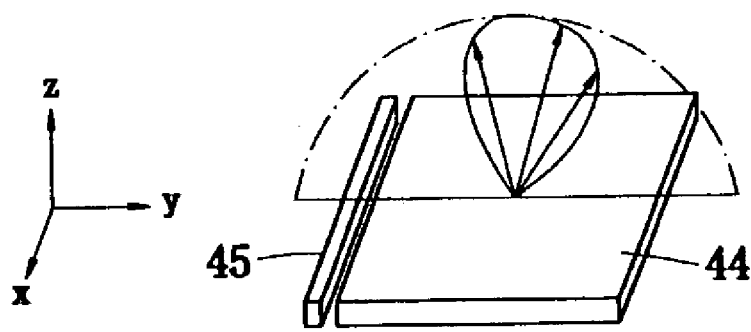
Figure 46:
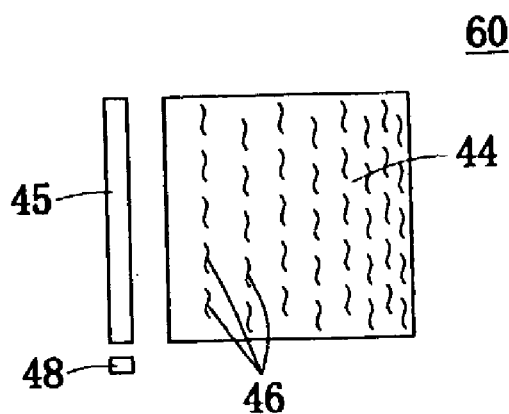
Figure 47:
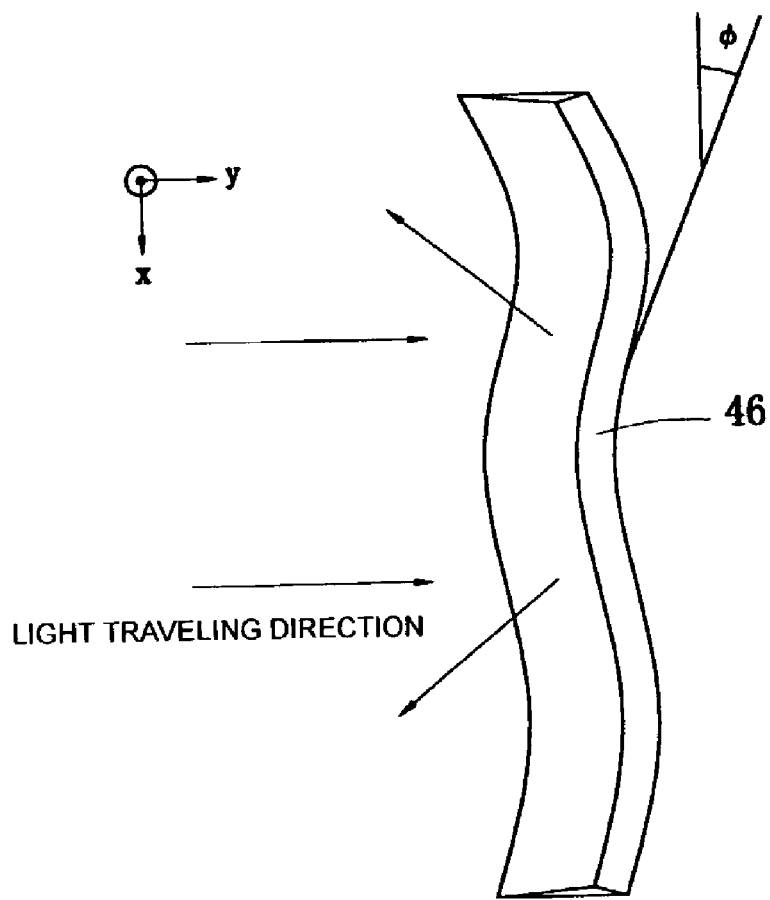
Figure 48:
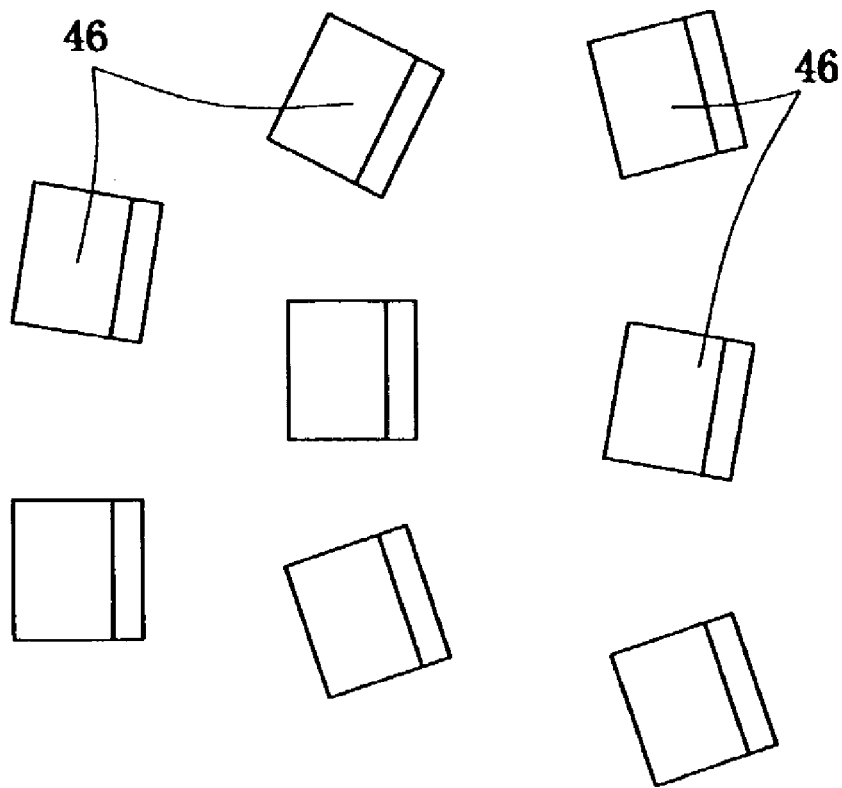
Figure 49:
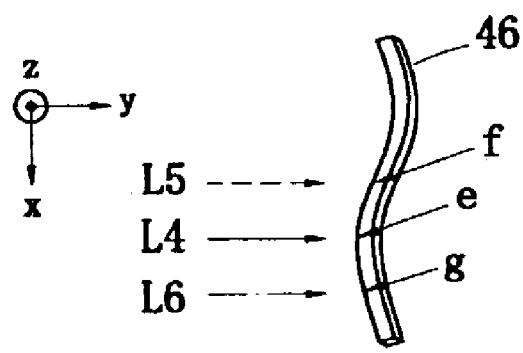
Figure 50:
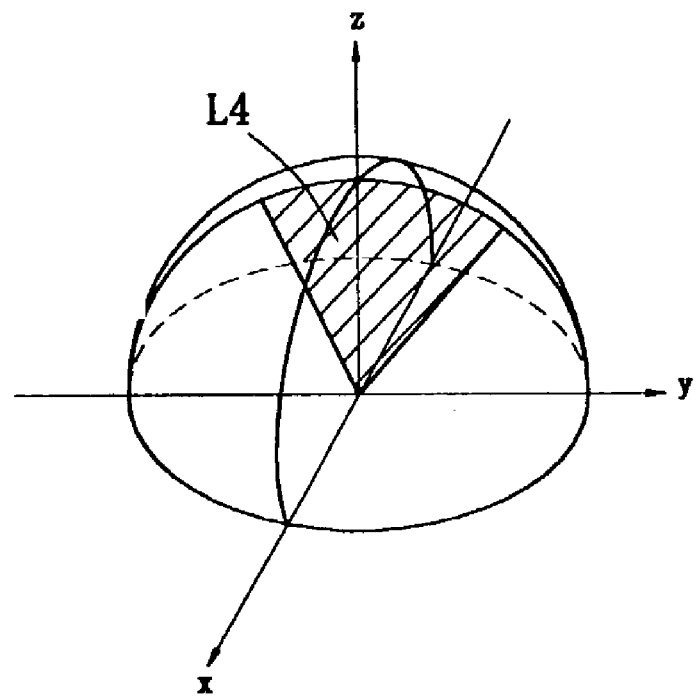
Figure 51:
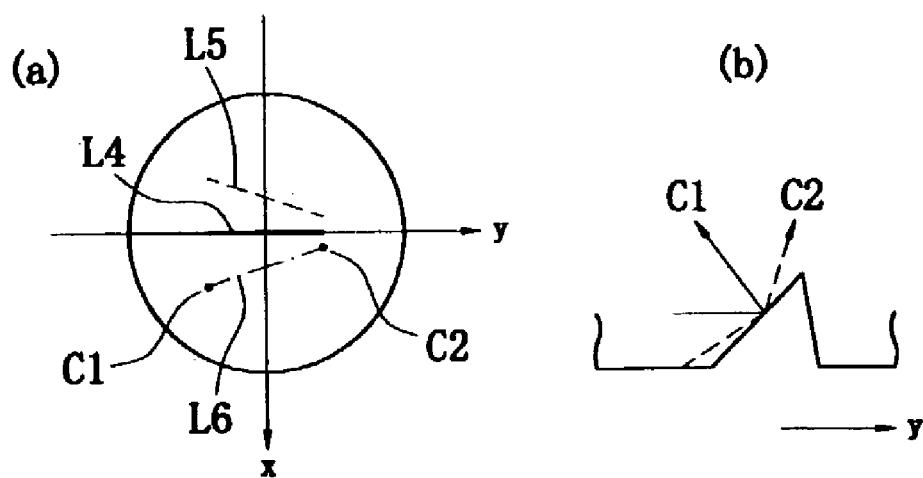
Figure 52:
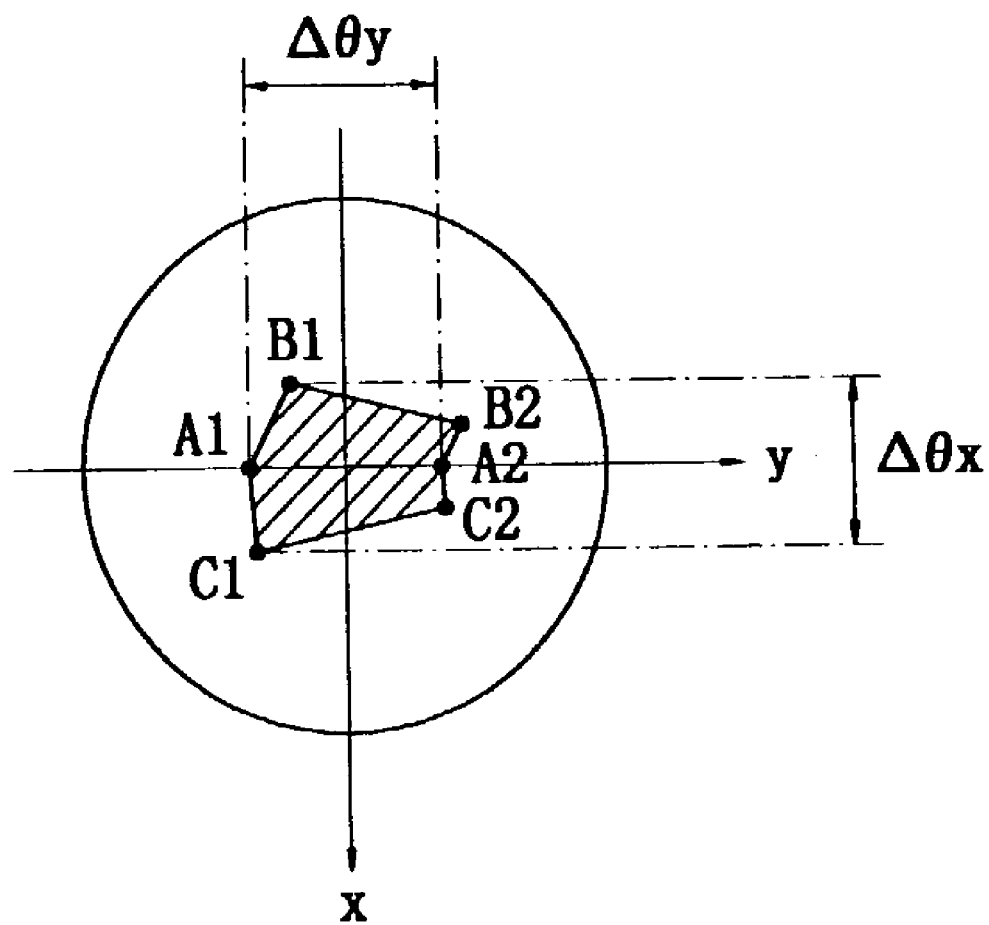
Figure 53:
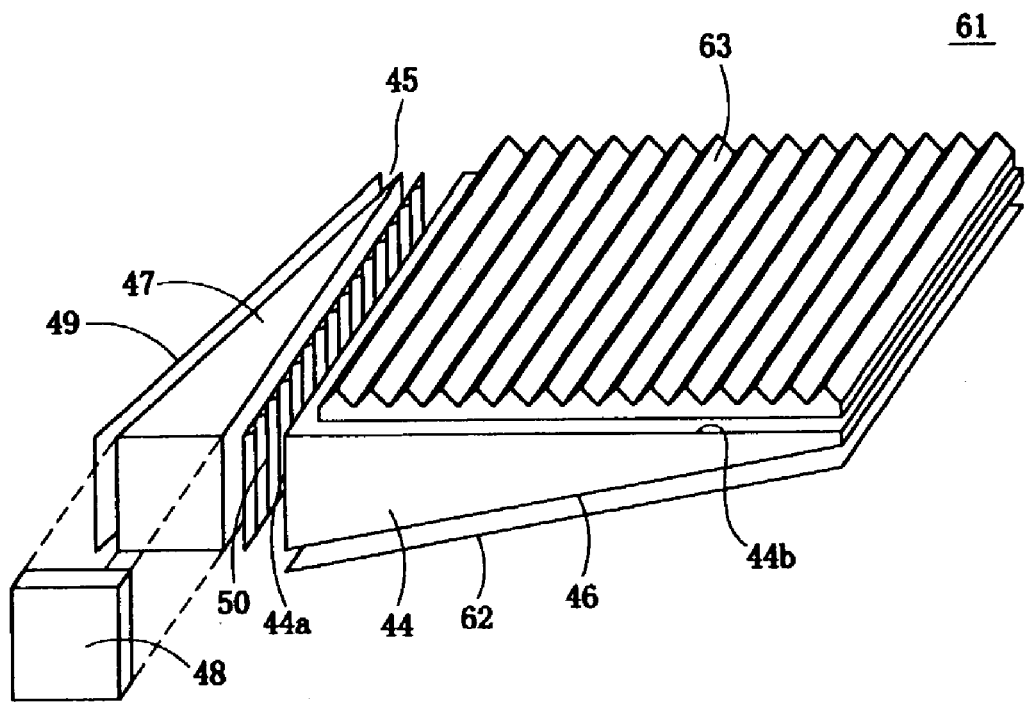
Figure 54:
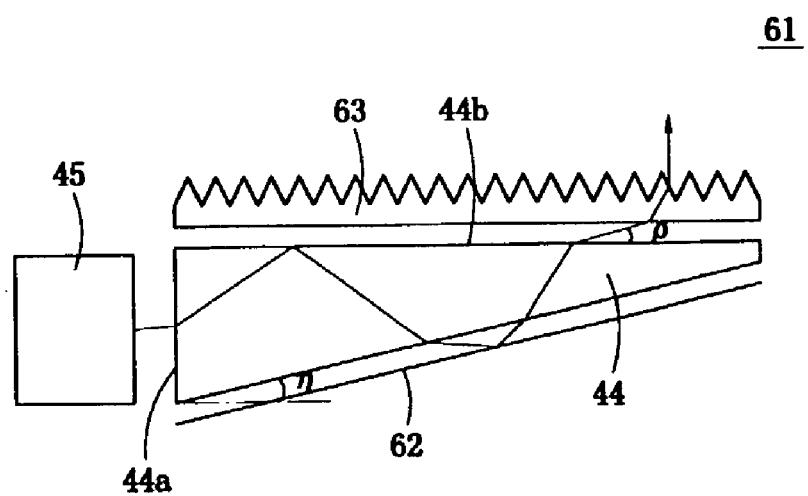
Figure 55:
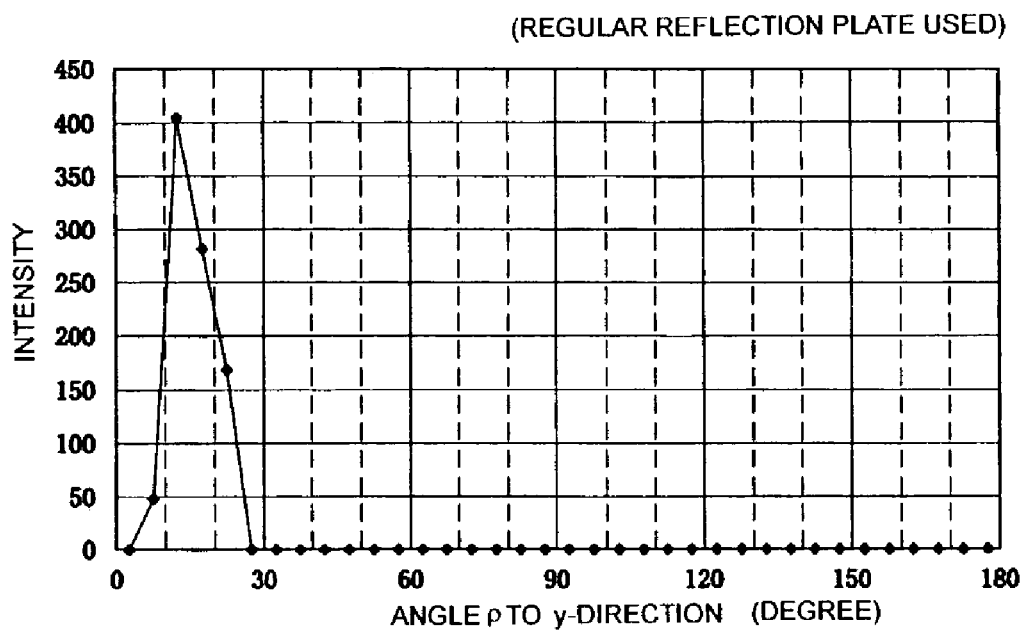
Figure 56:
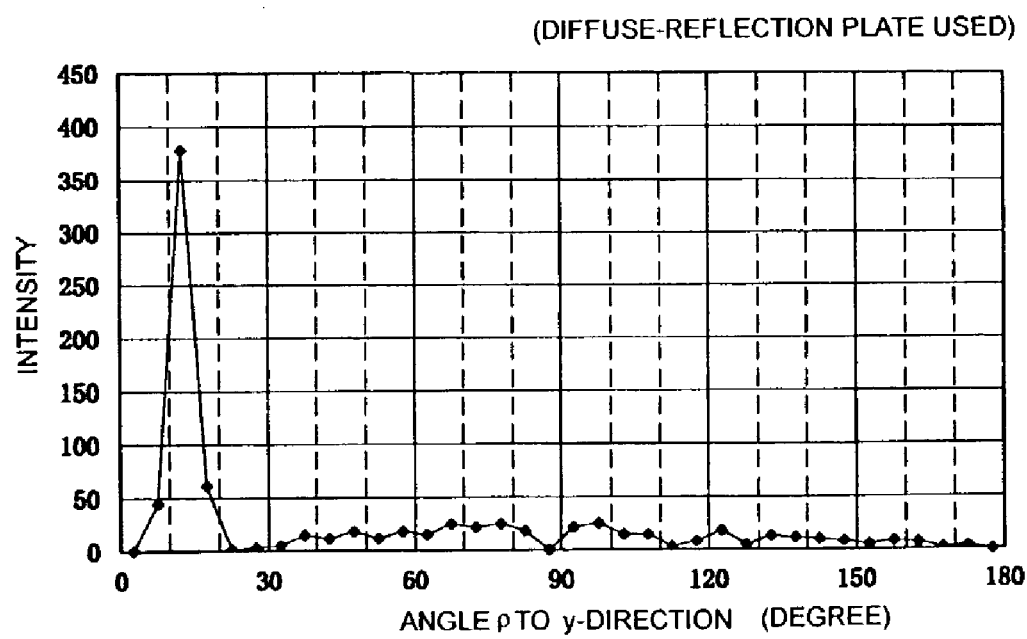
Figure 59:
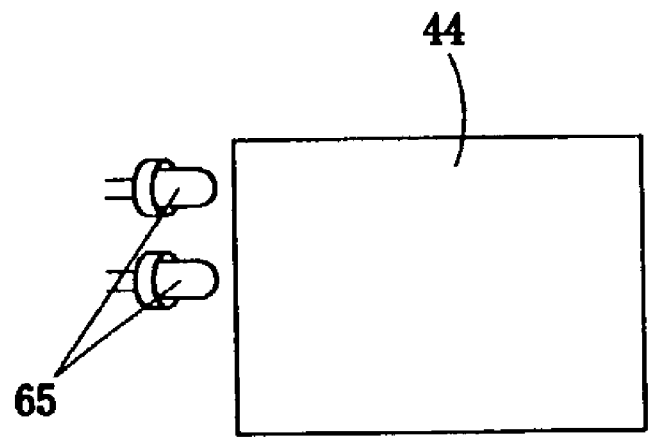
Figure 60:
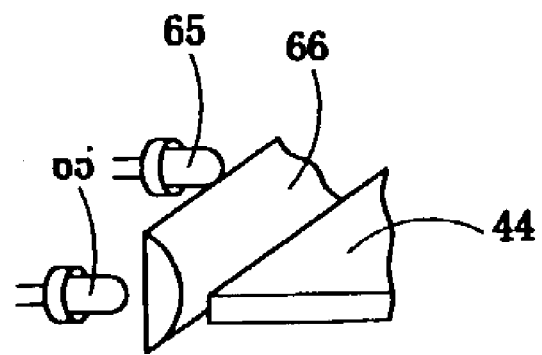
Figure 61:
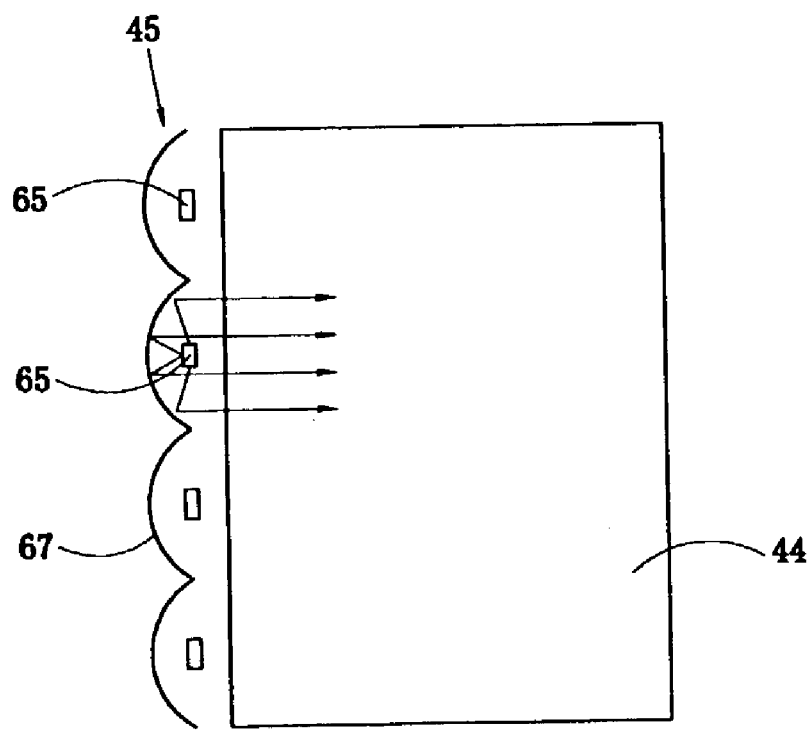
Figure 62:
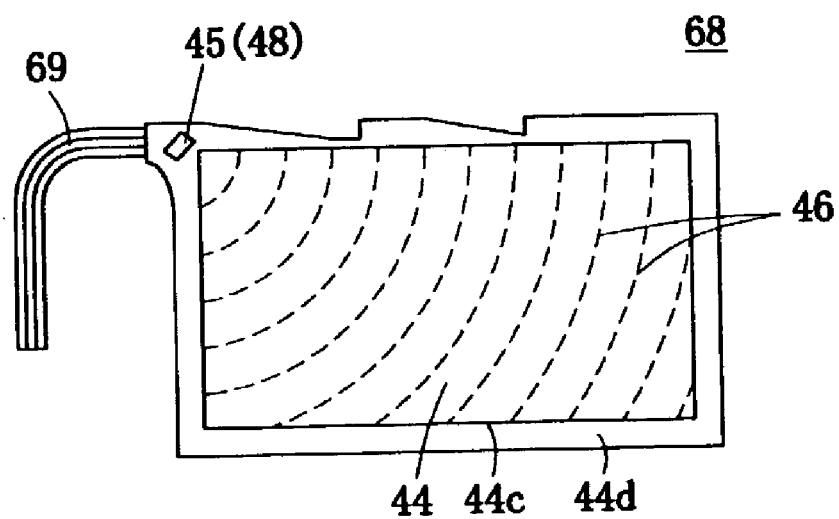
Figure 63:
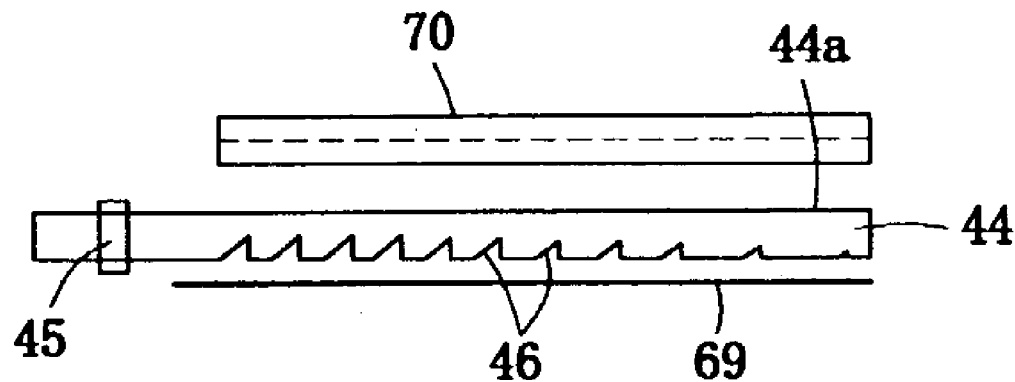
Figure 64:
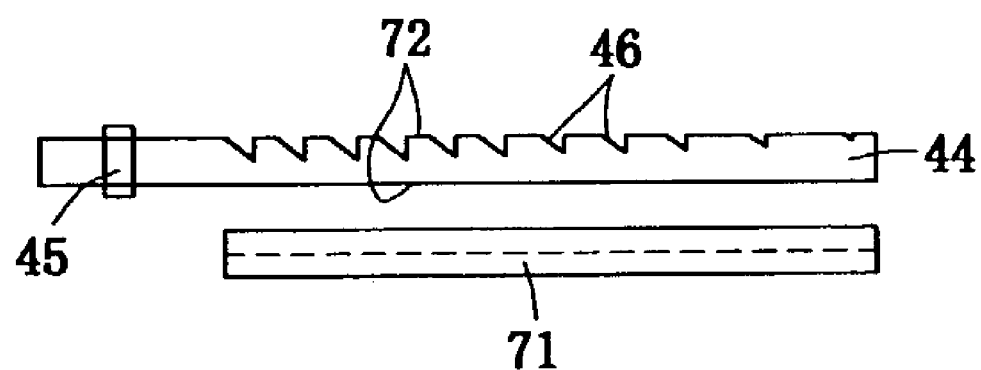
Figure 65:
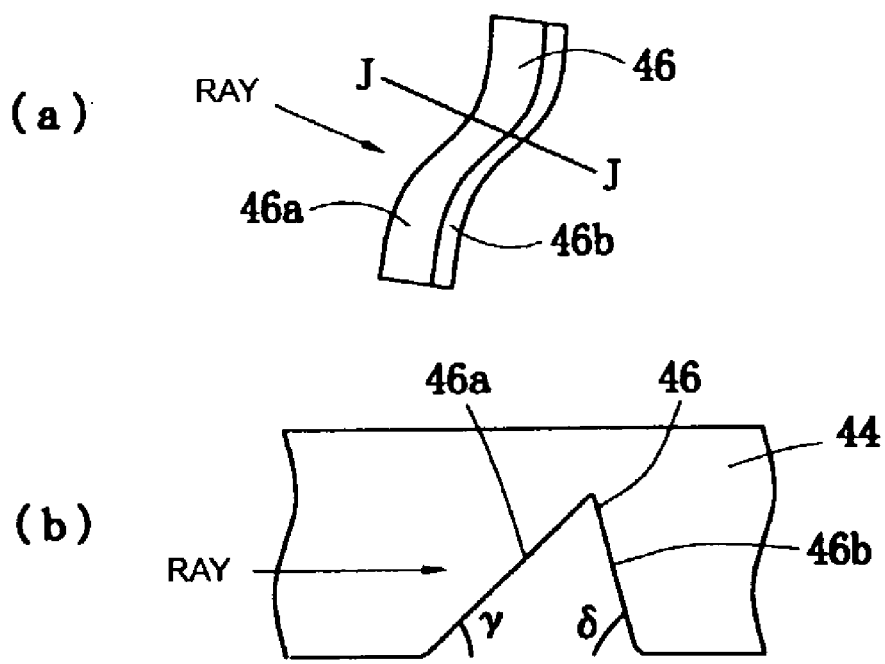
Figure 66:
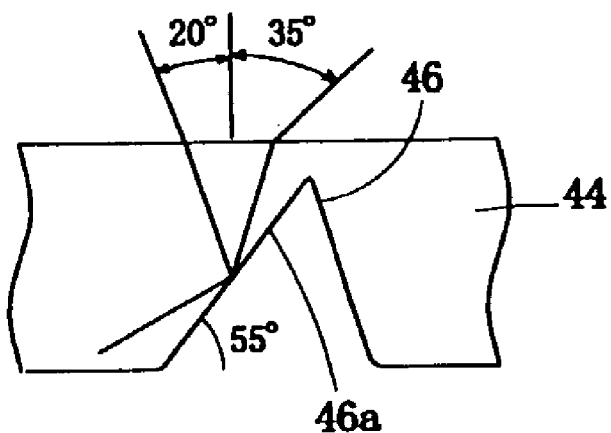
Figure 67:
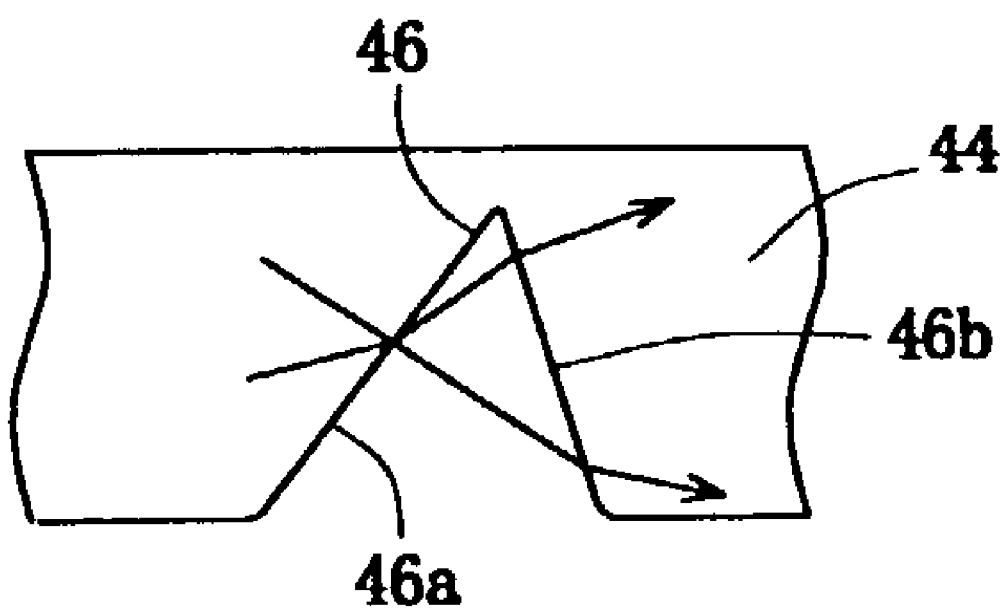
Figure 68:
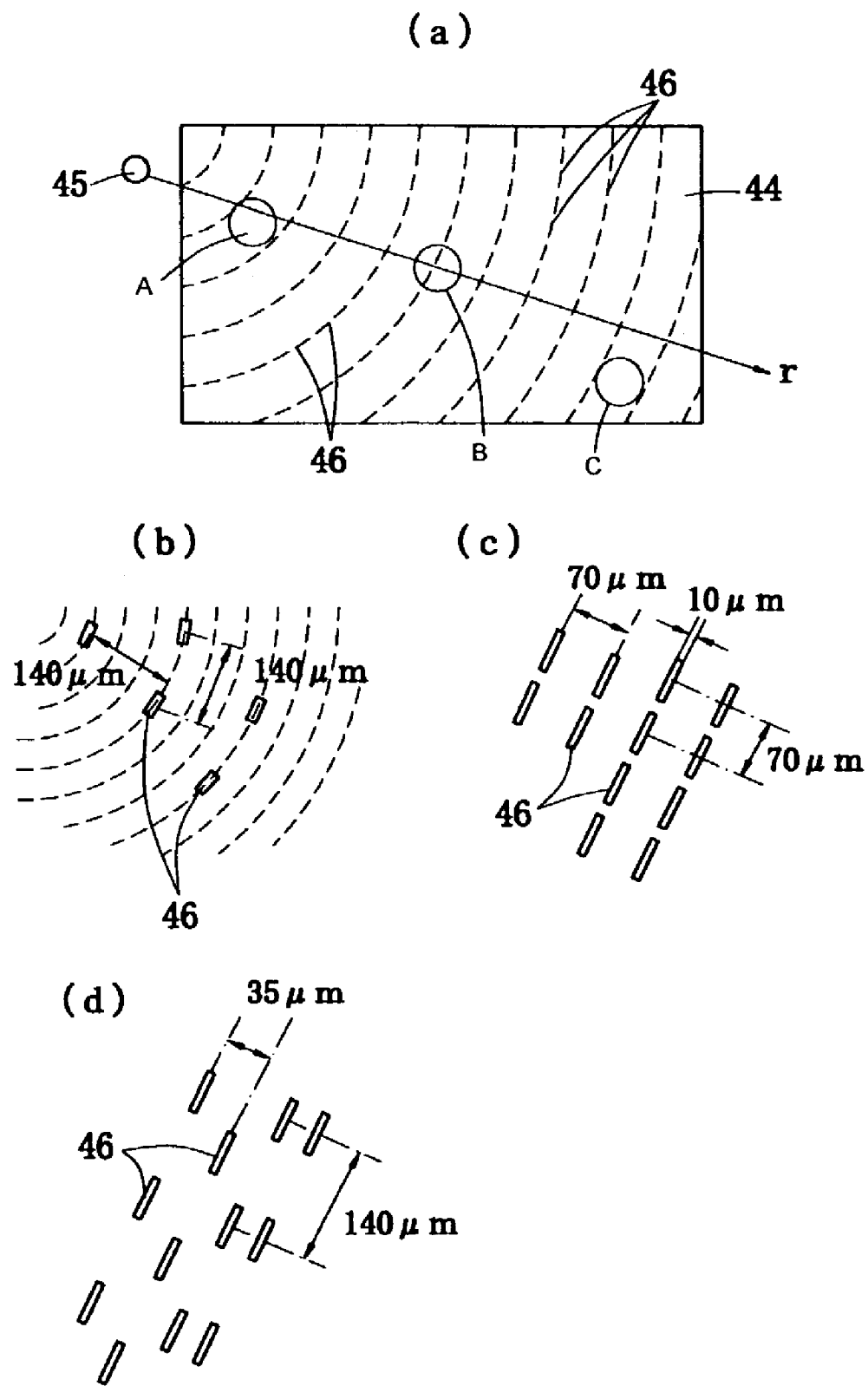
Figure 69:
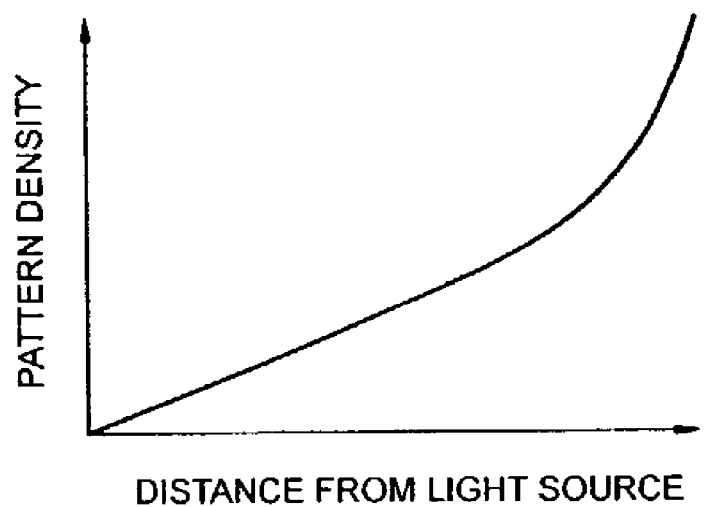
Figure 70:
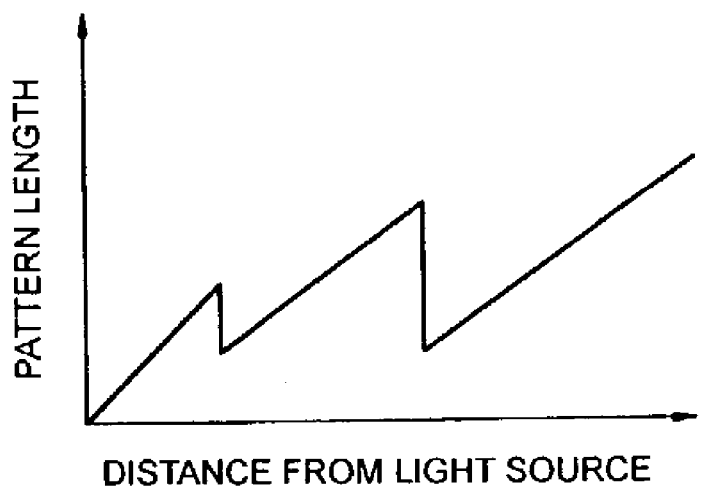
Figure 71:
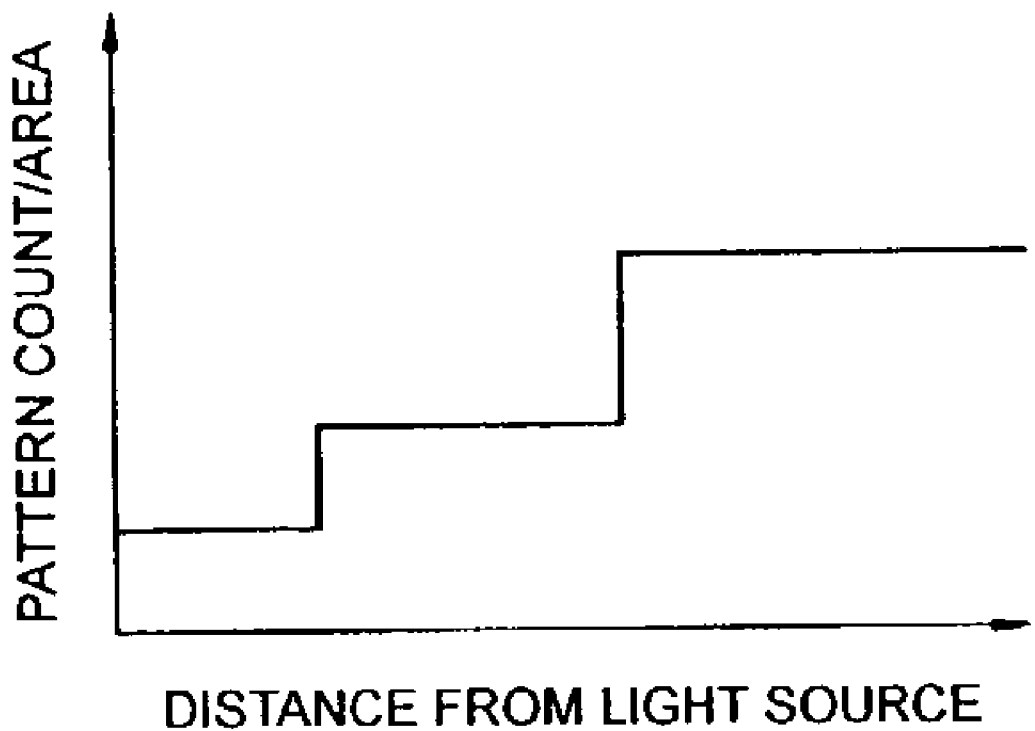
Figure 72:
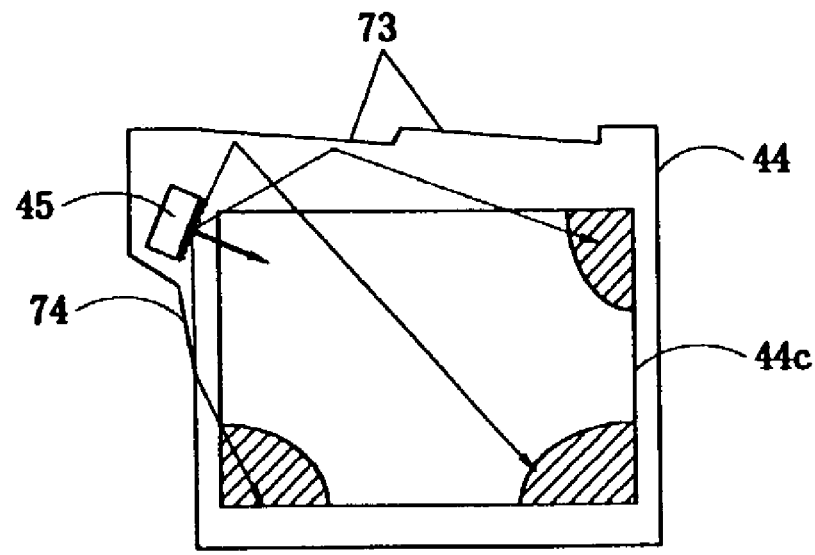
Figure 73:
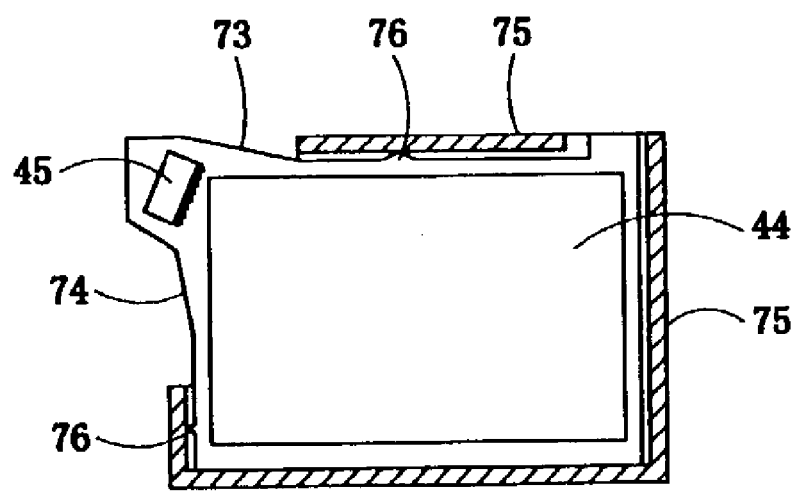
Figure 74:
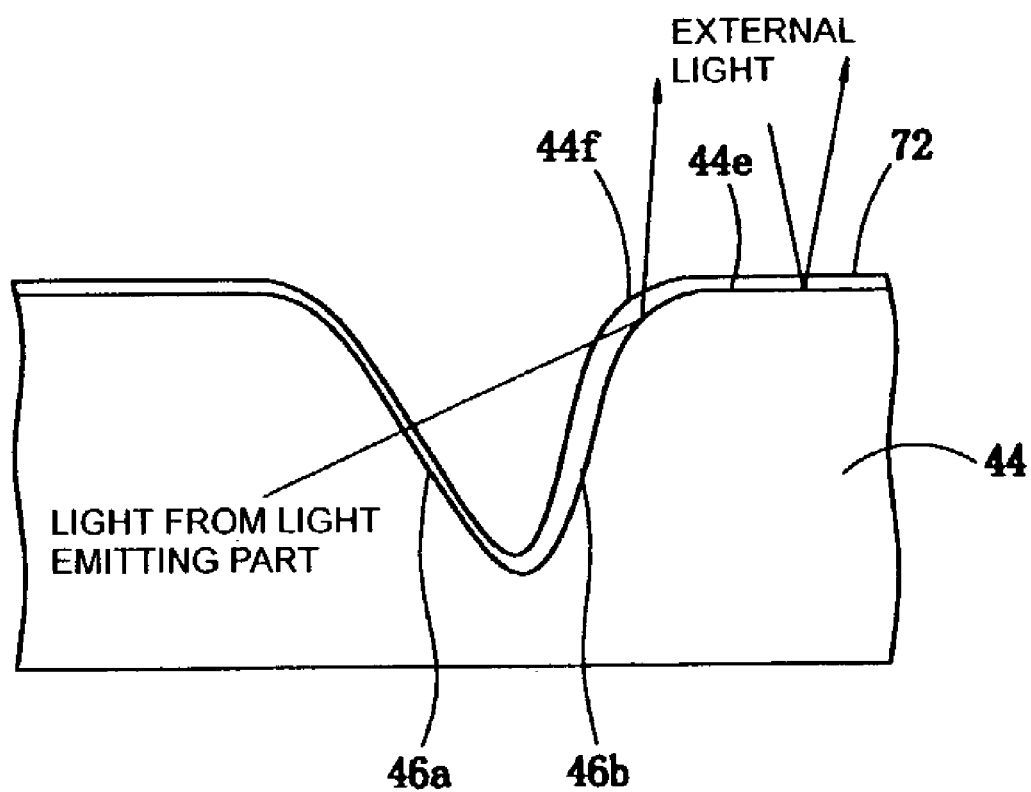
Figure 75:
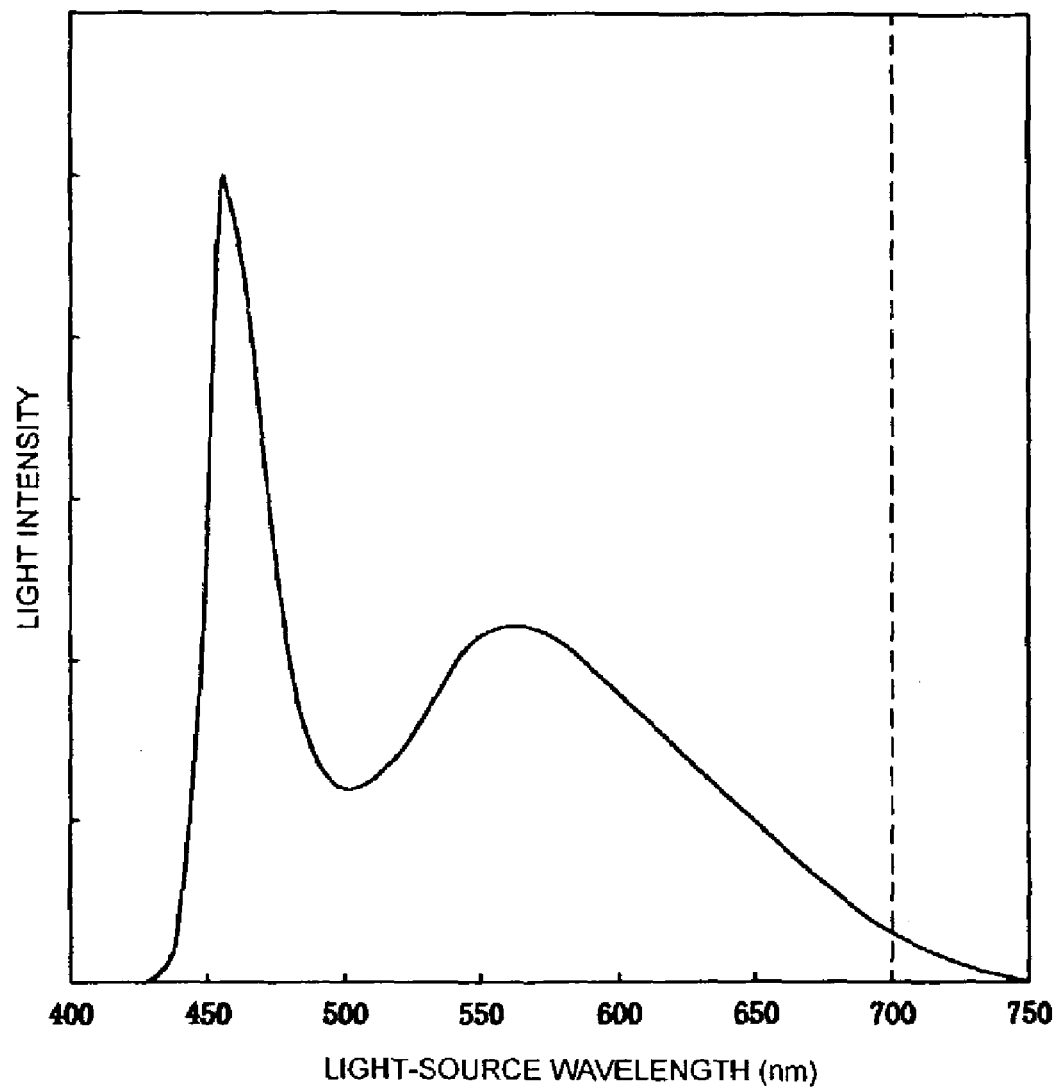
Figure 76:
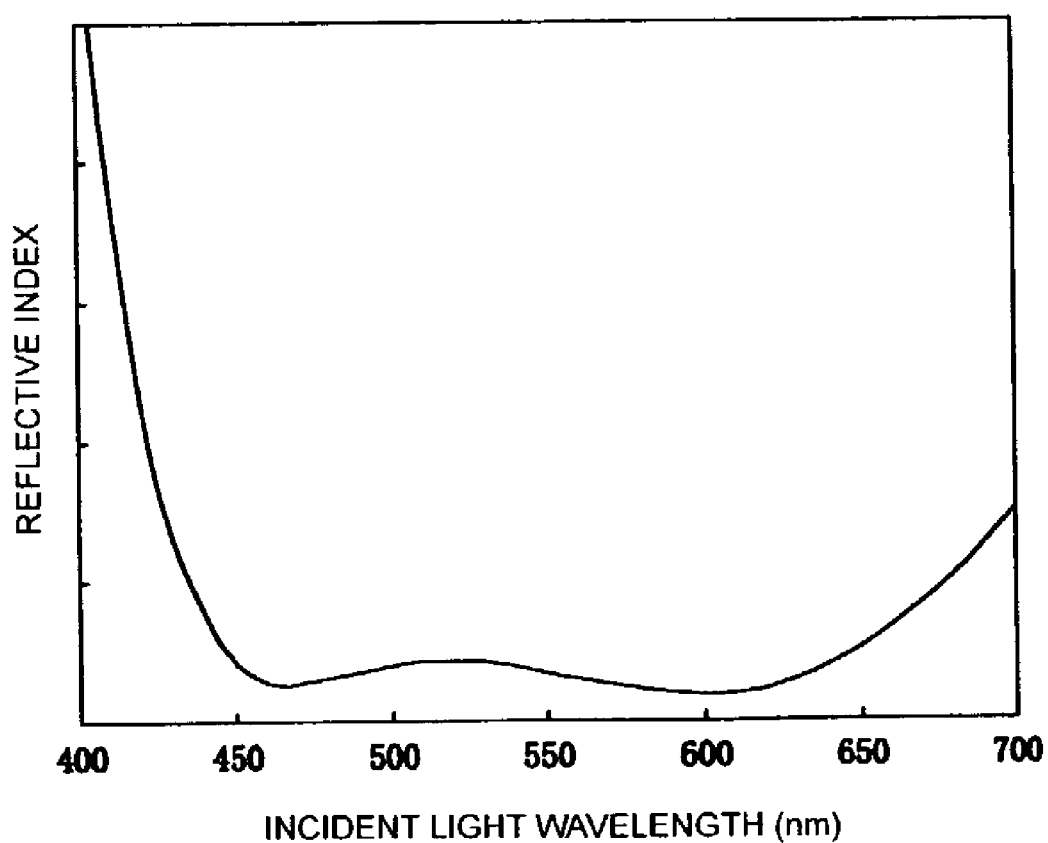
Figure 77:
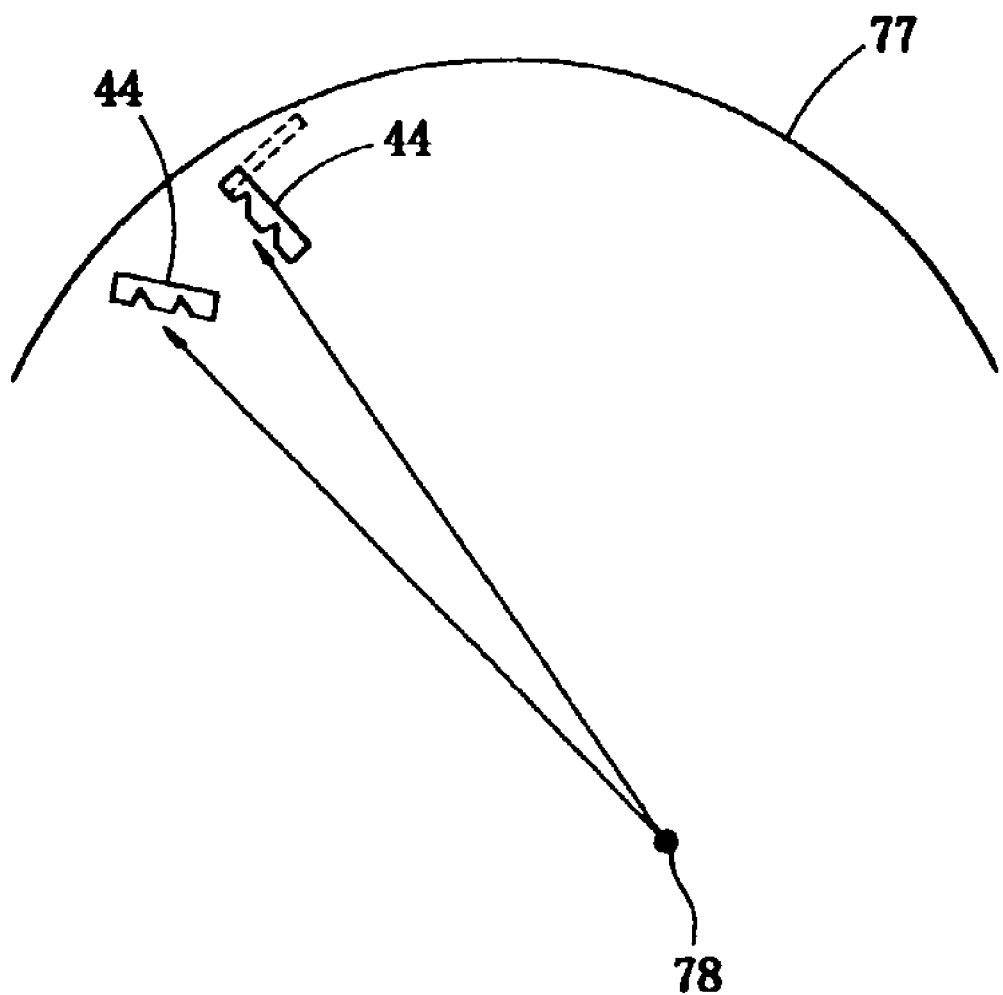
Figure 78:
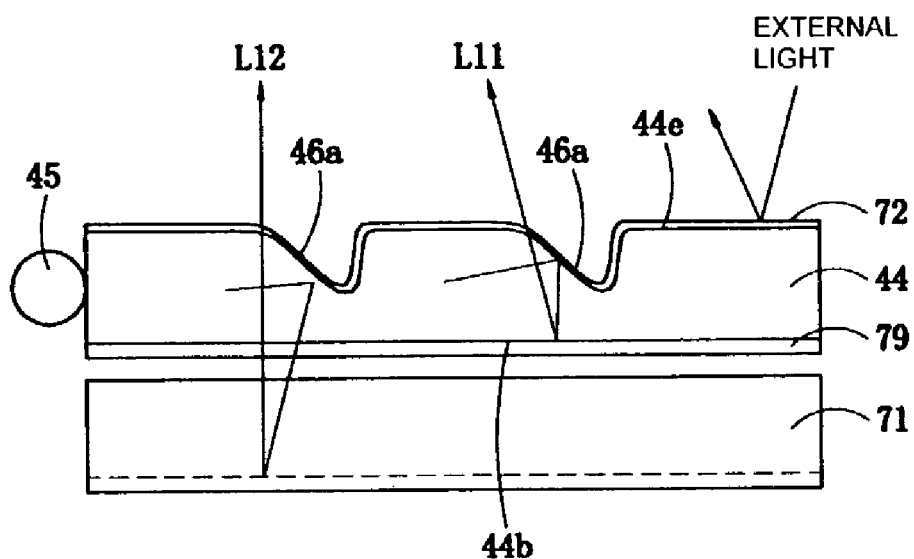
Figure 79:
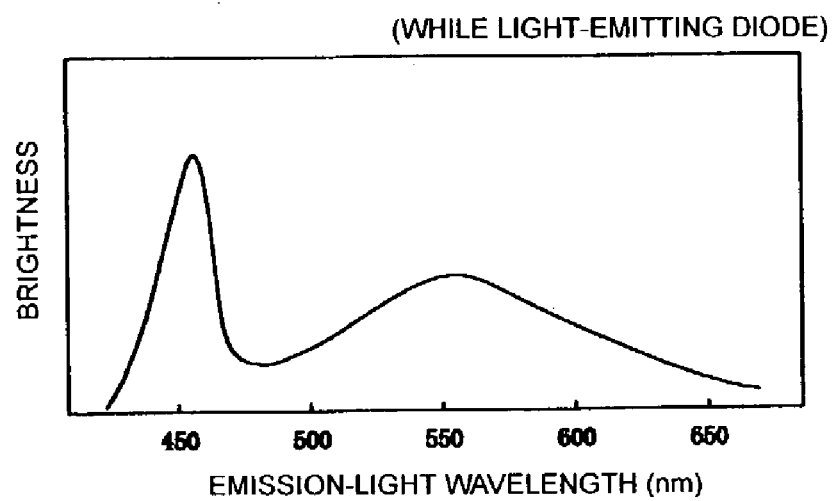
Figure 80:
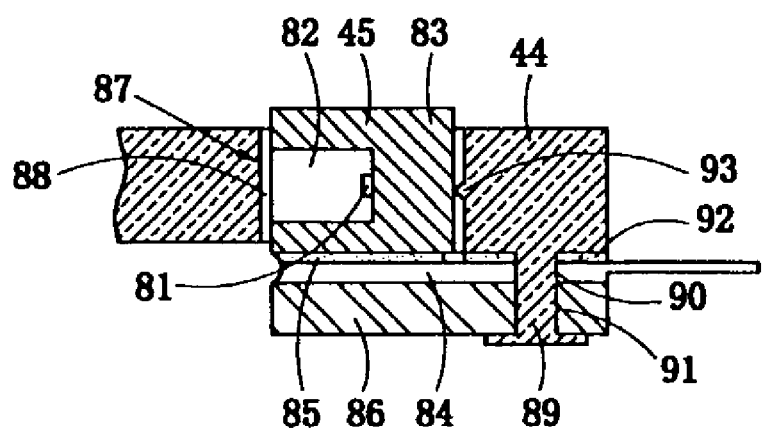
Figure 81:
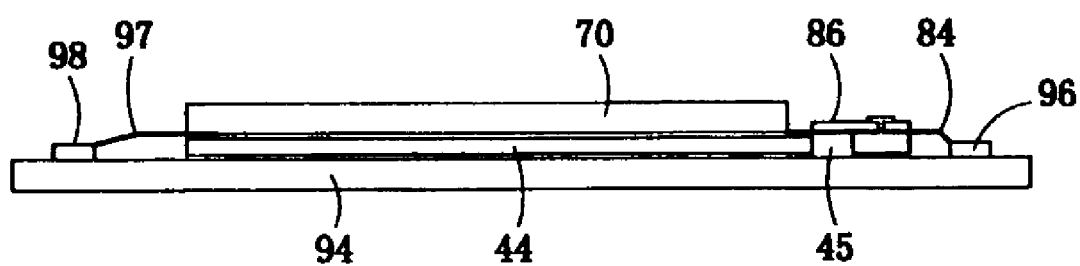
Figure 82:
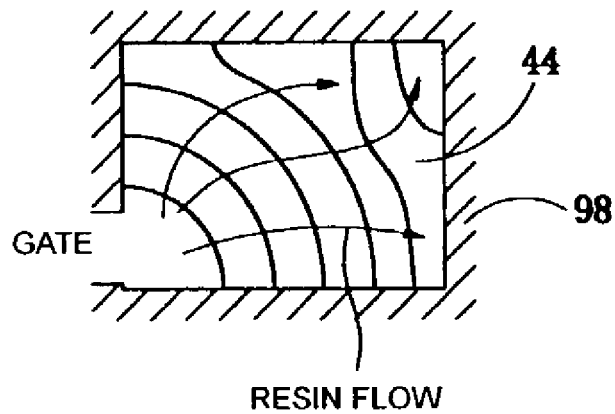
Figure 83:
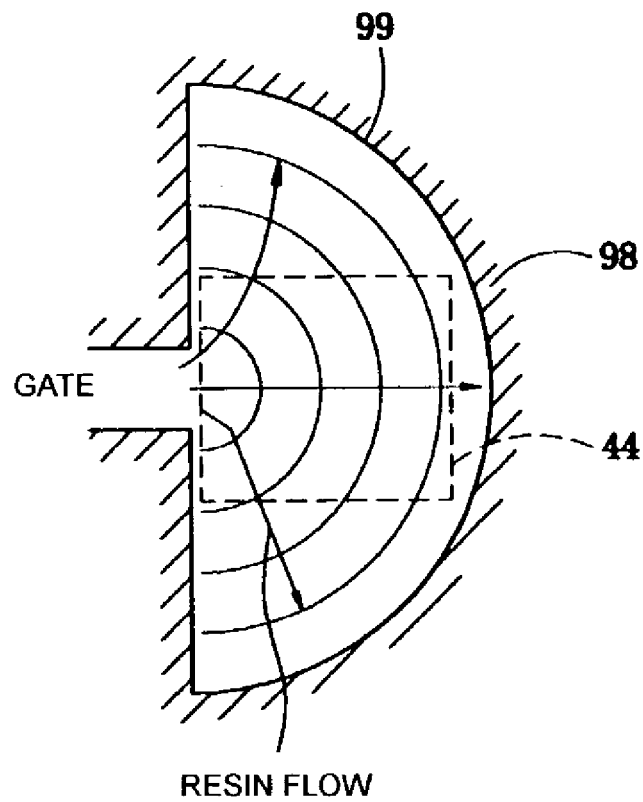
Figure 84:
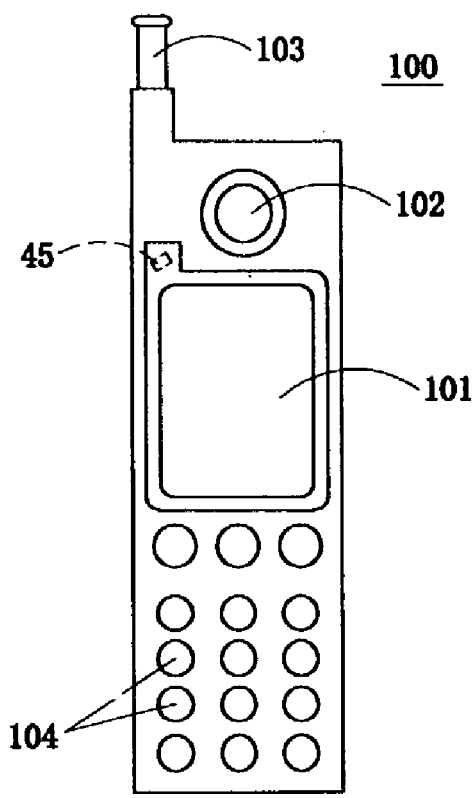
Figure 85:
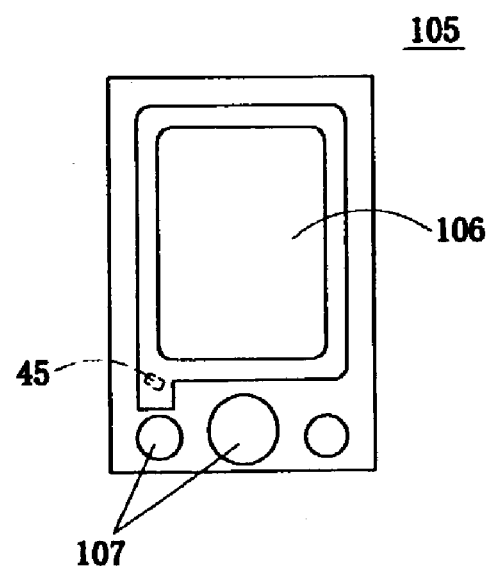

(A) (B) (C) (D) in FIG. 16 is a figure showing a directivity characteristic of the surface light source device, and ($a$) ($b$) ($c$) ($d$) is a figure showing a corresponding reflection-light intensity angular characteristic of a reflective-type liquid crystal display panel;

FIG. 17($a$) is a figure explaining a full-width at half maximum in a reflection light intensity—angle distribution of a reflective-type liquid crystal display panel, and FIG. 17($b$) is a figure explaining a full-width at half maximum in a directivity characteristic of a surface light source device;

FIG. 18 is an exploded perspective view showing a structure of a surface light source device according to a first preferred embodiment of the invention;

FIG. 19 is a view showing a behavior of the light in a plan form in a light emitting part used in the same surface light source device;

FIG. 20 is a figure showing a directivity characteristic of the light emitted from the light emitting part of FIG. 19 using a regular reflection plate on a back surface;

FIG. 21 is a figure showing a directivity characteristic of emission light in the case the regular reflection plate on the back surface is replaced with a diffuse-reflection plate in the light emitting part of FIG. 19;

FIG. 22 is a figure explaining how to determine a light intensity (energy) in a α direction in FIGS. 20 and 21;

FIG. 23($a$) is a figure showing a directivity characteristic of the light spread in a thickness direction (z-axis direction) of the light conductor plate, FIG. 23($b$) is a figure showing a directivity characteristic of the light spread in a widthwise direction (x-axis direction) of the light conductor plate and FIG. 23($c$) is a figure showing a directivity characteristic of the light spread in a thickness direction and width wise direction (z-axis direction, x-axis direction) of the light conductor plate;

FIG. 24 is a figure showing a manner the direction of light changes when the light spread in the widthwise direction of the light conductor plate is totally reflected upon a deflecting slant surface of the diffusion pattern;

FIG. 25($a$) ($b$) is a figure representing another manner the direction of light changes when the light spread in the widthwise direction of the light conductor plate is totally reflected upon a deflecting slant surface of the diffusion pattern;

FIG. 26 is a figure showing a behavior of the light transmitted through the deflecting slant surface of the diffusion pattern and re-incident at the back surface on the light conductor plate;

FIG. 27($a$) is a figure showing a direction of the light before being incident on the diffusion pattern, FIG. 27($b$) is a figure showing a direction of the light totally reflected upon a deflecting slant surface of the diffusion pattern and the light of after reflection, and FIG. 27($c$) is a figure showing a direction of the light transmitted through the deflecting slant surface of the diffusion pattern and re-incident at the back surface on the light conductor plate to be incident at the back surface and the light of after re-incidence;

FIG. 28 is a figure representing a light spatial frequency as viewed in a direction of light's traveling (y-axis direction) within the light conductor plate;

FIG. 29 is a figure showing a directivity characteristic of the light emitted at the light emitting surface of the surface light source device;

FIG. 30 is a figure explaining how to provide a diffusion pattern in the case of introducing light obliquely from the light emitting part into the light conductor plate;

FIG. 31 is a figure explaining how to examine a directivity characteristic of the light of within the light conductor plate;

FIG. 32 is a figure showing a behavior of the reflection light upon a diffusion pattern sectionally in an arcuate form (comparative example);

FIG. 33 is a figure showing a behavior of the reflection light upon a diffusion pattern sectionally in a saw-tooth form (comparative example);

FIG. 34($a$) is a figure showing a behavior of the light totally reflected upon a deflecting slant surface of a diffusion pattern sectionally in a triangular form, and FIG. 34($b$) shows a figure showing a behavior of the light transmitted through the diffusion pattern in the front and reflected upon the diffusion pattern in the rear;

FIG. 35 is a figure showing a relationship between a light emission angle from the surface light source device and a light intensity when the angle of the deflecting slant angle is changed as 45, 55, 65 degrees;

FIG. 36 is a figure showing a definition on an inclination angle $\gamma$ of a deflection slant surface in the diffusion pattern, an inclination angle $\delta$ of a back surface and a light emission angle $\epsilon$ from a light emitting surface;

FIG. 37($a$) ($b$) is a figure for explaining a relationship between a light emission angle and a light intensity shown in FIG. 35, wherein the same figure ($a$) shows a manner that the light incident nearly horizontally is reflected upon the deflecting slant surface while the same figure ($b$) shows a manner that the light incident at the below is reflected upon the deflecting slant surface;

FIG. 38($a$) shows a diffusion characteristic of a reflective-type liquid crystal display panel, and FIG. 38($b$) is a figure showing an emission-light intensity angular characteristic on the light conductor plate, and FIG. 38($c$) is a figure showing an emission-light intensity angular characteristic from the reflective-type liquid crystal display device;

FIG. 39 is a figure showing a behavior of the light transmitted through the deflecting slant surface to be re-incident at the back surface where the inclination angle in a back surface of the diffusion pattern is small;

FIG. 40 is a figure showing a behavior of the light transmitted through the deflecting slant surface where the inclination angle in a back surface of the diffusion pattern is small;

FIG. 41($a$) is a schematic view showing a traveling direction of the light to be introduced from a linear light source into the light conductor plate, and FIG. 41($b$) is a schematic view showing a traveling direction of the light to be introduced from a plurality of spot light sources arranged at an interval into the light conductor plate, and FIG. 41($c$) is a schematic view showing a traveling direction of the light to be introduced from a plurality of spot light sources arranged collected at one point into the light conductor plate;

FIG. 42 is a schematic side view showing a reflective-type liquid crystal display unit using a surface light source device according to a second preferred embodiment of the invention;

FIG. 43 is a magnifying sectional view showing a diffusion pattern of the light conductor plate in the same surface light source device;

FIG. 44 is a schematic plan view of a surface light source device according to a third preferred embodiment of the invention;

FIG. 45 is a figure showing a directivity characteristic of the light emitted from the same surface light source device;

FIG. 46 is a schematic plan view of a surface light source device according to a fourth preferred embodiment of the invention;

FIG. 47 is a magnifying plan view of a diffusion pattern provided on the light conductor plate of the same surface light source device;

FIG. 48 is a modification to the same diffusion pattern;

FIG. 49 is a figure showing a winding diffusion pattern and the light incident thereon;

FIG. 50 is a figure showing a directivity characteristic of the light L4 reflected at a point-e in FIG. 49;

FIG. 51($a$) is a figure viewing in a z-axis direction a direction of the light L4, L5, L6 reflected at a point-e point-f, point-g in FIG. 49, and FIG. 51($b$) is a figure showing the light of C1, C2 of the same figure ($a$) to be reflected upon the deflecting slant surface;

FIG. 52 is a figure showing a light emitting region of the light shown in FIG. 49;

FIG. 53 is a perspective view of the surface light source device according to a fifth preferred embodiment of the invention;

FIG. 54 is a side view showing a behavior of the light in the same surface light source device;

FIG. 55 is a figure showing a relationship between the angle defined by a direction parallel with the light emitting surface (y-axis direction) and an emission light and an emission-light intensity when using a regular reflection plate on a back surface of the light conductor plate;

FIG. 56 is a figure showing a relationship between the angle defined by a direction parallel with the light emitting surface (y-axis direction) and an emission light and an emission-light intensity when using a diffuse-reflection plate on a back surface of the light conductor plate;

FIG. 57 is a schematic side view of a surface light source device using a light conductor plate formed with different structured diffusion patterns;

FIG. 58 is a schematic side view of a surface light source device using a light conductor plate formed with further different structured diffusion patterns;

FIG. 59 is a schematic view of a comparative example using a plurality of spot light sources;

FIG. 60 is a schematic perspective view partly broken away showing a comparative example using a plurality of spot light sources and cylindrical lenses;

FIG. 61 is a schematic plan view showing a surface light source device using a plurality of spot light sources and concave mirrors to emit a light having a narrow directivity;

FIG. 62 is a plan view showing a surface light source device according to a sixth preferred embodiment of the invention;

FIG. 63 is a schematic side view showing a liquid crystal display unit using the surface light source device of FIG. 62 as a backlight;

FIG. 64 is a schematic side view showing a liquid crystal display unit using the surface light source device of FIG. 62 as a front light;

FIG. 65(a) is a plan view showing a winding diffusion pattern, and FIG. 65(b) is a J—J line sectional view of the same figure (a);

FIG. 66 is a is a view showing the spread of the light reflected upon the deflecting slant surface of the same diffusion pattern;

FIG. 67 is a view showing the light transmitted through the same diffusion pattern;

FIG. 68(a) is a plan view of a light conductor plate provided with the same diffusion pattern, and FIG. 68(b) is a part-A magnifying view of the same figure (a), FIG. 68(c) is a part-B magnifying view of the same figure (a), and FIG. 68(d) is a part-C magnifying view of the same figure (a);

FIG. 69 is a figure showing a relationship between a distance from the light emitting part (light source) and a pattern density of diffusion patterns in the same light conductor plate;

FIG. 70 is a figure showing a relationship between a distance from the light emitting part and a pattern length of diffusion patterns in the same light conductor plate;

FIG. 71 is a figure showing a relationship between a distance from the light emitting part and a pattern count density (pattern count/area) of diffusion patterns in the same light conductor plate;

FIG. 72 is a schematic view showing a structure and an operation thereof for sending much more light to a corner in the light emitting surface in the same surface light source device;

FIG. 73 is a schematic view showing a light conductor plate fitted with a fixing frame;

FIG. 74 is a magnifying sectional view partly broken away showing an anti-reflection film formed on a side of a patterned surface of the same light conductor plate;

FIG. 75 is a figure showing a relationship between a wavelength of a light-emitting diode and an emission-light intensity;

FIG. 76 is a figure showing a relationship between an incident light wavelength and reflective index in the anti-reflection film;

FIG. 77 is a schematic view explaining on how to form an anti-reflection film having a great thickness on an edge of the diffusion pattern;

FIG. 78 is a view showing the light as shine due to reflection upon the patterned surface of the light conductor plate, the light emitting surface and the like and an anti-reflection film provided on the patterned surface of the light conductor plate and light emitting surface;

FIG. 79 is a figure showing an emission-light intensity wavelength characteristic of the light emitted from a white light-emitting diode;

FIG. 80 is a sectional view showing a structure of a light emitting part attached on the light conductor plate;

FIG. 81 is a side view showing a liquid crystal display unit mounted on a circuit board;

FIG. 82 is a figure showing a resin flow upon forming a rectangular light conductor plate within a rectangular cavity of a mold die;

FIG. 83 is a view showing a manner of forming with a mold die having a cavity greater than a target light conductor plate and smooth in resin flow;

FIG. 84 is a front view of a cellular phone;

FIG. 85 is a front view of a PDS;

FIG. 86(A) (a) is a figure showing an emission-light intensity distribution of the light emitted from the light conductor plate, FIG. 86(B) (b) is a figure showing an intensity distribution of the light reflected at a lower surface of the light conductor plate and emitted from the light emitting surface, FIG. 86(C) (c) is a figure showing a diffusion characteristic of a liquid crystal display panel, FIG. 86(D) (d) is a figure showing an emission-light intensity distribution of from the liquid crystal display panel, and FIG. 86(E) (e) is a figure showing an S/N ratio during lighting of the surface light source;

FIG. 87 is a plan view showing a diffusion pattern used on a surface light source unit according to a seventh preferred embodiment of the invention; and FIG. 88(a) is a schematic view of a surface light source unit according to an eighth preferred embodiment of the invention, and FIG. 88(b) is a view for explanation by comparison.

BEST MODE FOR CARRYING OUT THE INVENTION

With reference to the drawings, preferred embodiments of the present invention will be explained in detail in the below.

With a portable apparatus such as a cellular phone, it is often the case for one person to view the display (liquid crystal display device) without requiring a wide view angle. According to an experiment, in the case of viewing a screen of a portable apparatus while walking, unless light is emitted only within 10 degrees as measured in a direction perpendicular to the screen, there has been flicker whenever the screen has been swung in viewing direction. However, it has been confirmed that in case a direction of light emission is approximately 20 degrees, sufficiently 30 degrees or greater, with respect to a direction perpendicular to the screen, it is easy to view it.

From this result, it can be seen that the light emitted to the outward greater than 20 to 30 degrees as measured in a direction perpendicular to the screen results in a loss lowering the visibility on the liquid crystal display device. In other words, in order to make preferable the light utilization efficiency of a surface light source device and improve the visibility of a liquid crystal display device, it is considered satisfactory to provide the light emitted from the surface light-source device with a directivity broader than approximately 10 degrees but narrower than approximately 20–30 degrees.

However, the directivity of the light emitted from a light conductor plate can be easily broadened by using a diffusion plate. Conversely, there is difficulty in narrowing it. The use of a prism sheet allows aligning the direction of light. However, the light once spread in a light-emitting direction is difficult to align to a narrow range even by using a prism sheet. Also, it is preferred not to use a prism sheet in order to prevent the increase in the thickness of a surface light-source device.

Accordingly, in order to fabricate a surface light source device excellent in efficiency and visibility, the more preferable the higher is the ratio, to the light emitted from the light conductor plate, of the light emitted within 20 to 30 degrees as measured with respect to a normal line given on a light emission surface, wherein a prism sheet is not used. It is preferred to emit light to within the area at a ratio of at least a half or more, preferably two-thirds or more.

Figure 1:
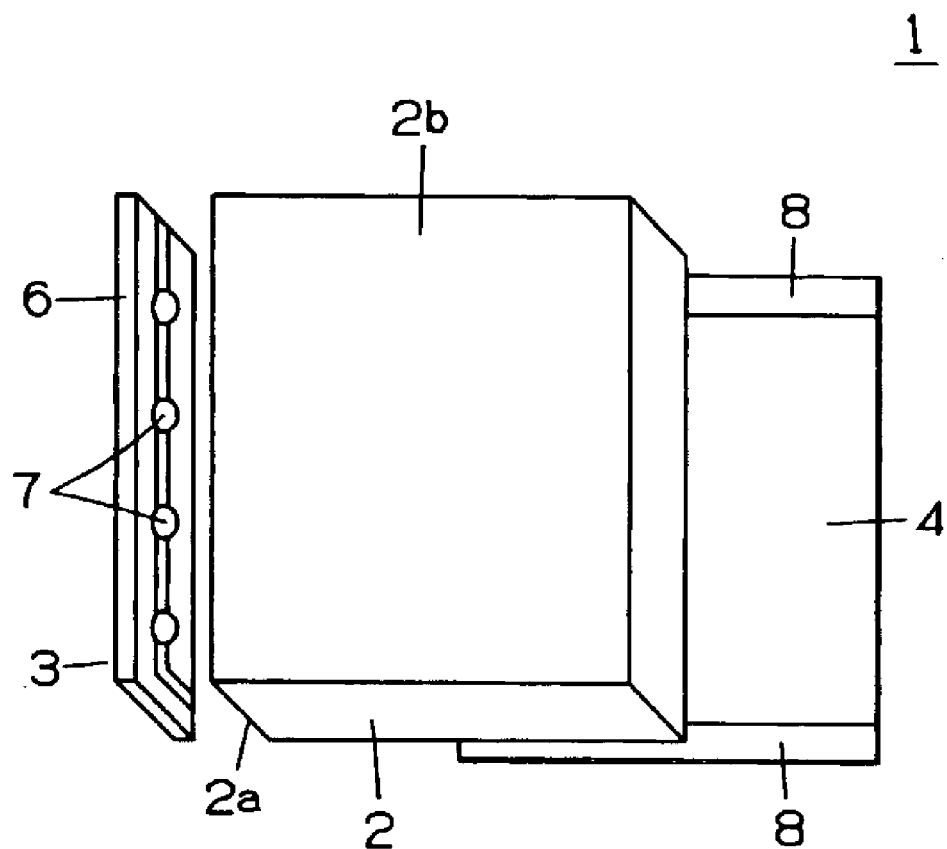
FIG. 1 is an exploded perspective view of a surface light source device having a conventional general structure.
Figure 2:
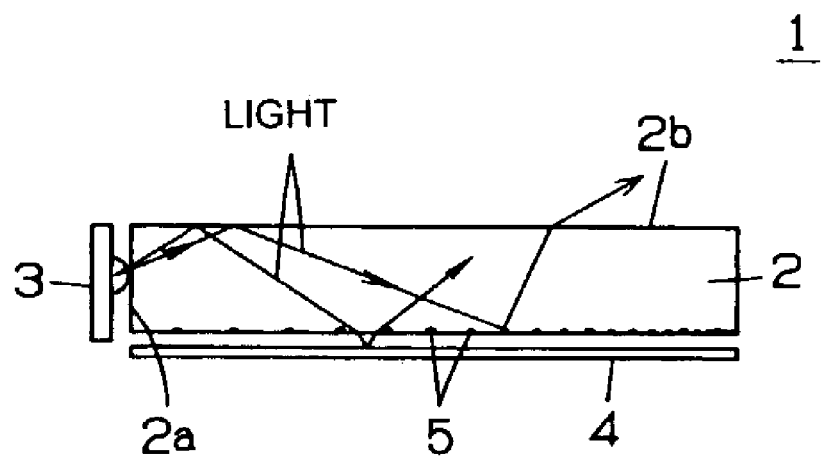
FIG. 2 is a sectional view of the same surface light source device.
Figure 3:
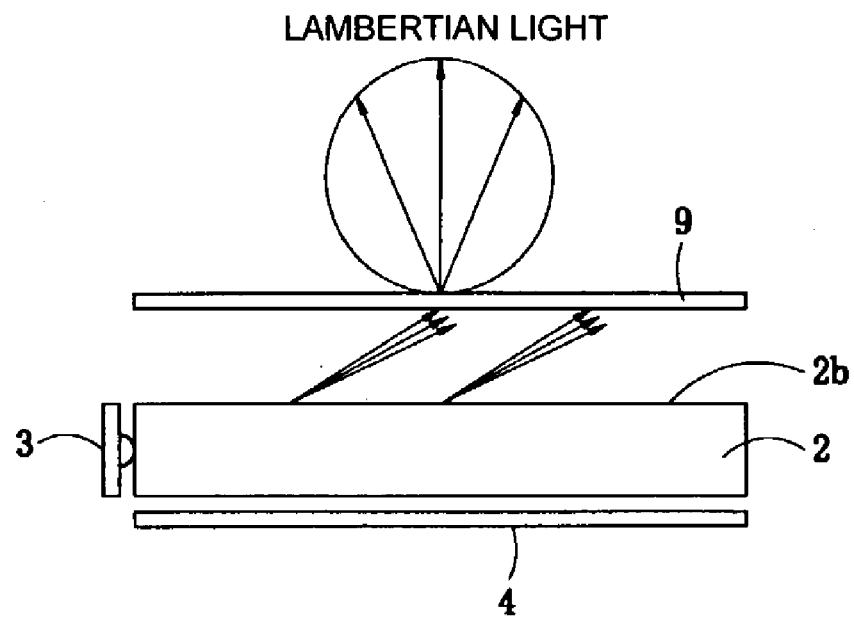
FIG. 3 is a view showing a directivity characteristic of a surface light source device of FIG. 1.
Figure 4:
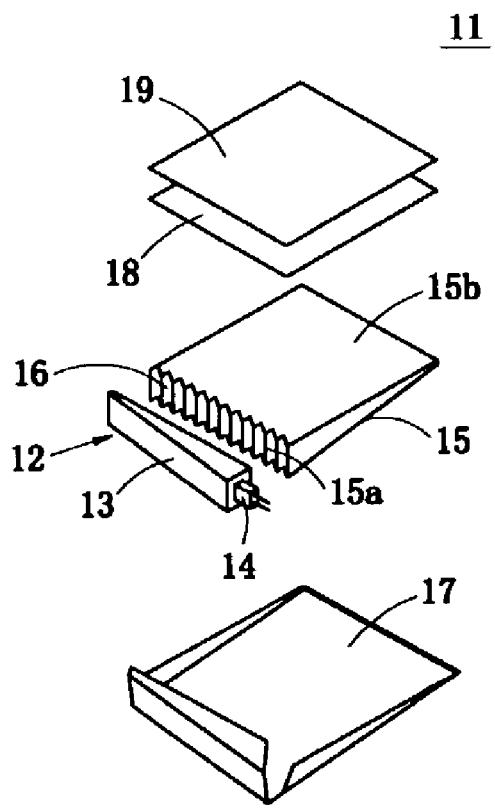
FIG. 4 is an exploded perspective view of a surface light source device having another conventional structure.
Figure 5:
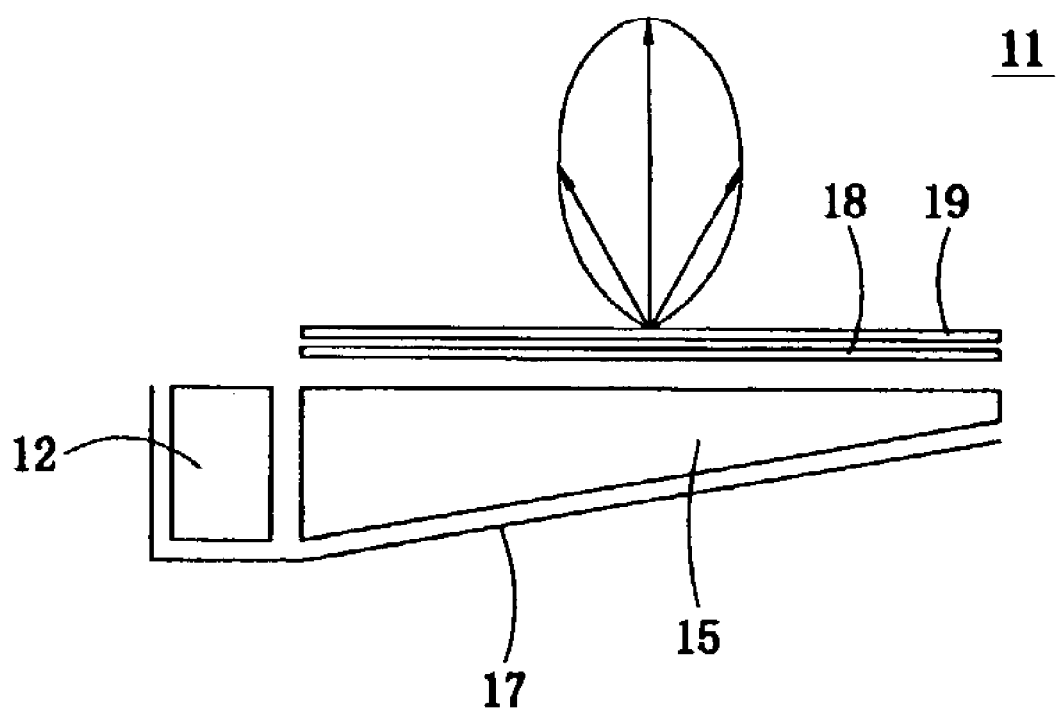
FIG. 5 is a view showing a directivity characteristic of the same surface light source device.
Figure 6:
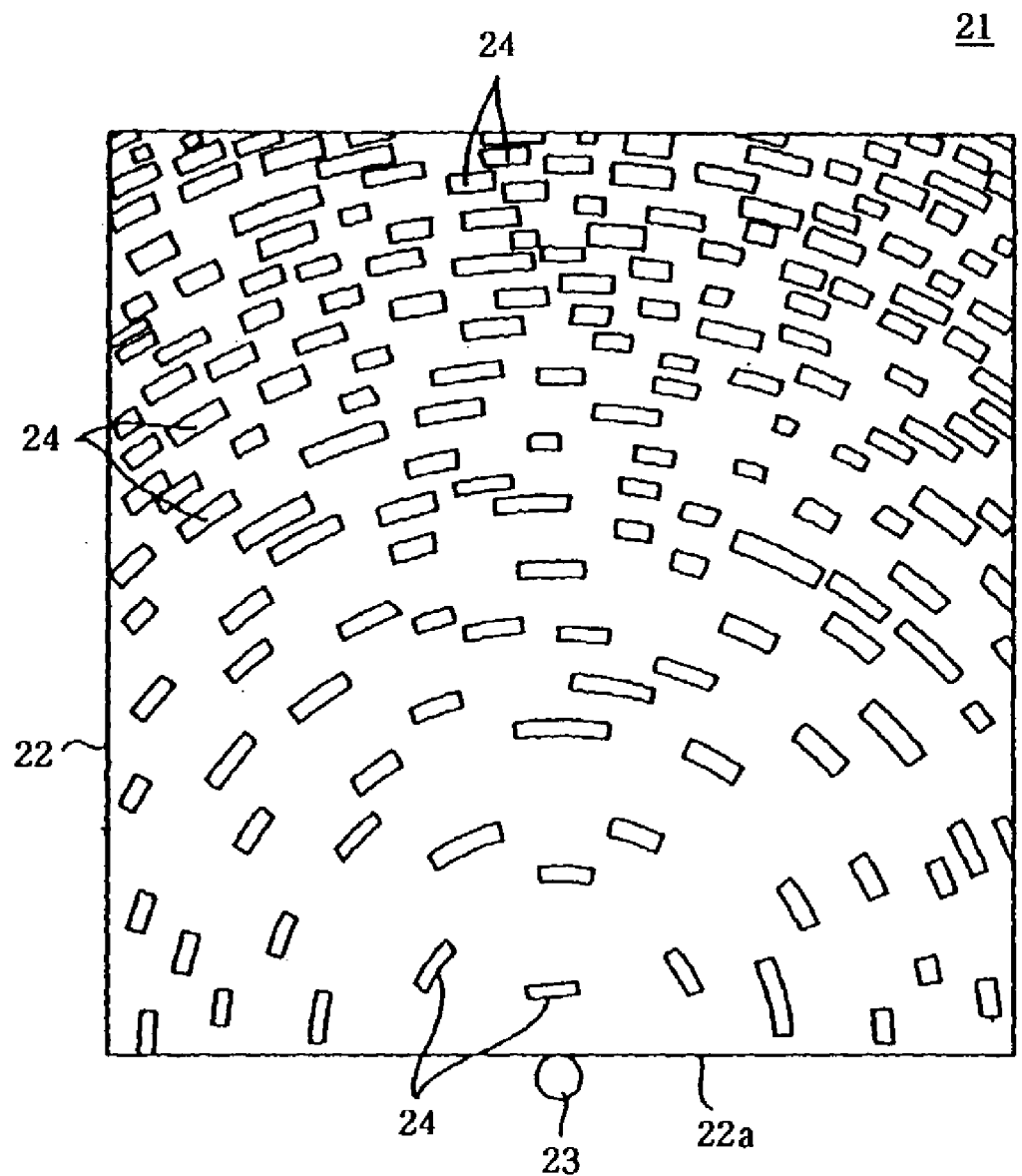
FIG. 6 is a plan view showing a structure of a surface light source device in still another conventional structure.
Figure 7:
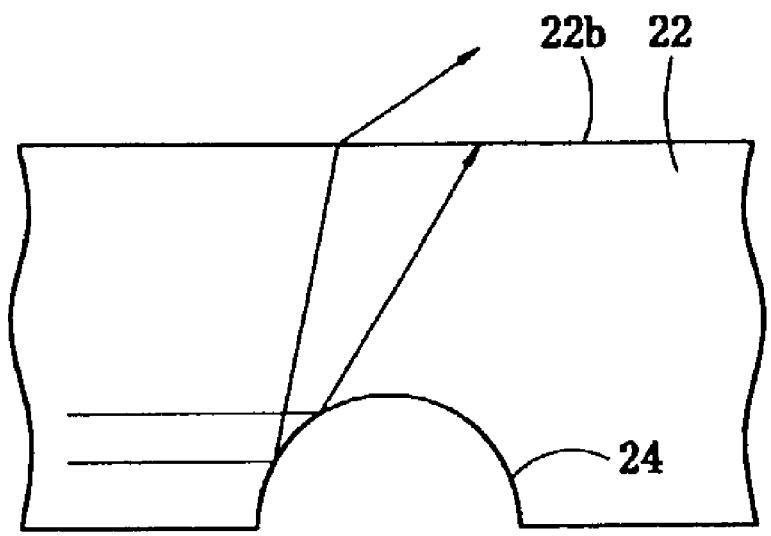
FIG. 7 is a view showing a shape and operation of a diffusion pattern of the same surface light source device.
Figure 8:
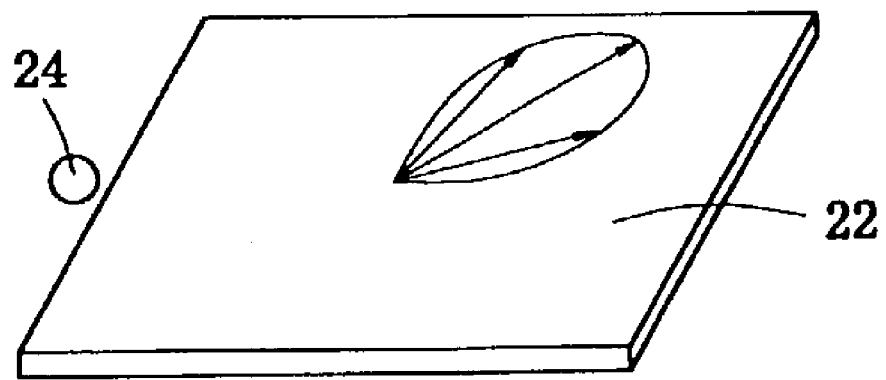
FIG. 8 is a view showing a directivity characteristic of the surface light source device of FIG. 6.
Figure 9:
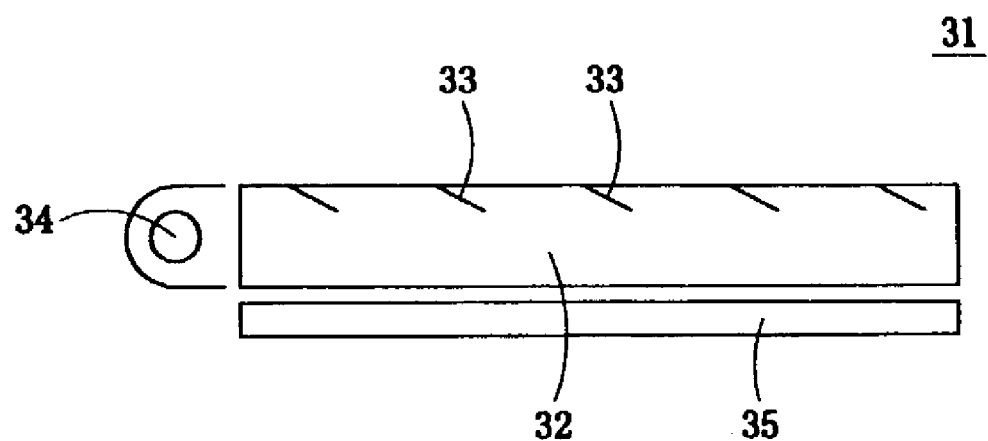
FIG. 9 is a sectional view showing a surface light source device in a conventional front-light type.
Figure 10:
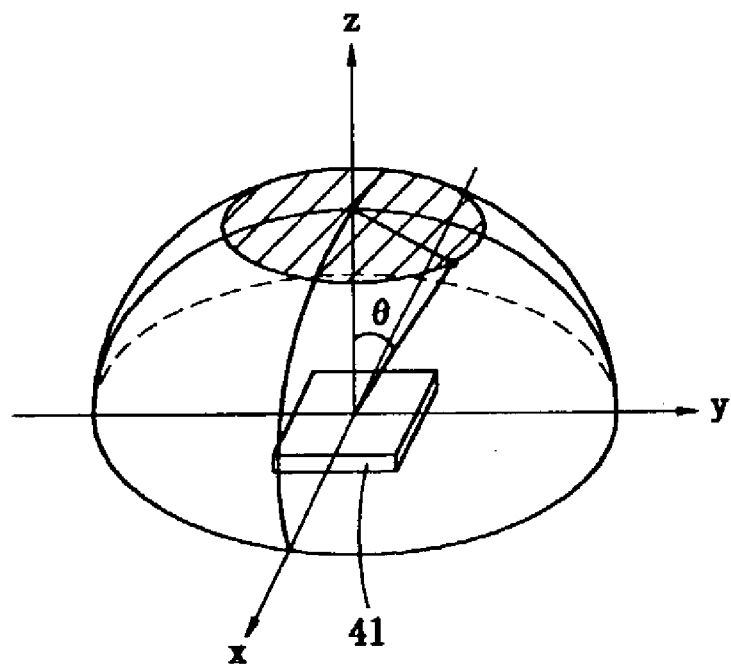
FIG. 10 is a view for explaining a desired directivity characteristic in the surface light source device.

Incidentally, the direction of the light emitted from the surface light source device is a direction of a normal line given on a light-emitting surface of the surface light source device 41 (light conductor plate), as shown in FIG. 10 (hereinafter, this direction refers to a z-axis direction, a direction parallel with a pair of sides of the surface light source device refers to an x-axis direction, and a direction parallel with the remaining pair of sides refers to a y-axis direction). For example, a direction of within θ=30 degrees, when mentioned, refers to every direction of within θ=30 degrees with respect to the z-axis, which refers to a direction of the light emitted directed to a hatched area of FIG. 10. Taking one example, in the case of a surface light source device for emitting light in a manner turning into nearly a Lambertian light at within a z-x plane as shown in FIG. 11, there is less light contained within 30 degrees as viewed in a direction perpendicular to the z-x plane. However, nearly all the light is contained within 30 degrees as viewed in a direction perpendicular to a y-z plane. In such a case, nearly all the light is not emitted in the direction of within 30 degrees, in the sense as used in the present specification. Namely, when mentioning is made in this specification that light is emitted in a direction of within 30 degrees for example, light emission must be made in a direction of within 30 degrees as viewed not only in one direction but also in every direction.

FIG. 12(a) represents a directivity characteristic of a light the major part of which is emitted to within θ from the surface light source device 41. Considering an ideal directivity characteristic of the light emitted from the surface light source device 41, it is preferred that brightness is even in an inside range of θ=20–30 degrees (40–60 degrees in the overall width) while no brightness is given in the inner direction than that as shown in FIG. 12(b). By realizing such a directivity characteristic, there is no occurrence of image brightness change and flicker even if the viewing direction is changed (even if there is swing in screen angle). Meanwhile, despite there is difference in viewing angle at between a center and an end of the screen, brightness is provided constant. This results in easiness in viewing the screen.

Figure 13:
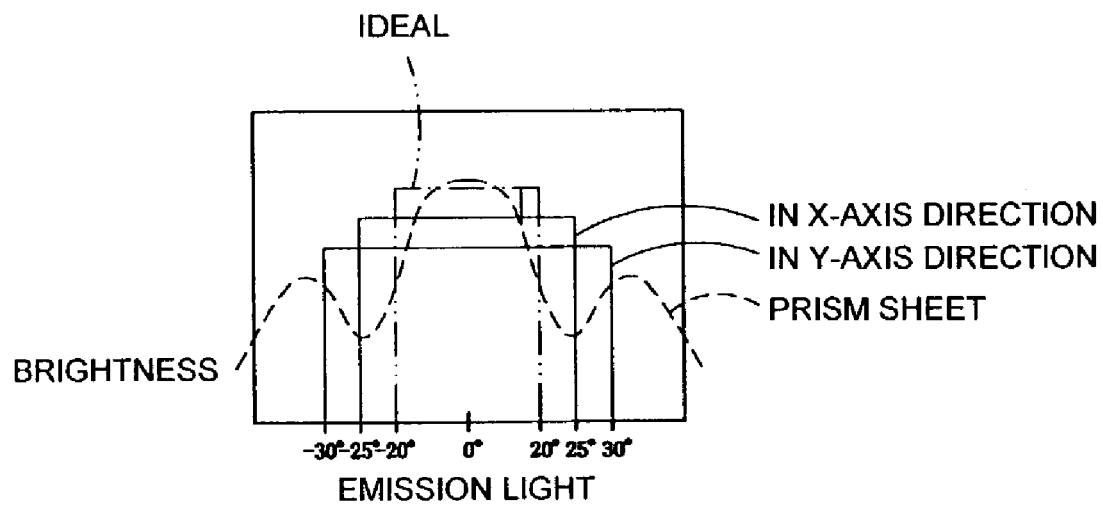
FIG. 13 is a figure representing an ideal directivity characteristic, the directivity characteristic in the case of using a prism sheet and a directivity characteristic in an x-axis direction and y-axis direction in the case of using a diffusion pattern.
Figure 14:
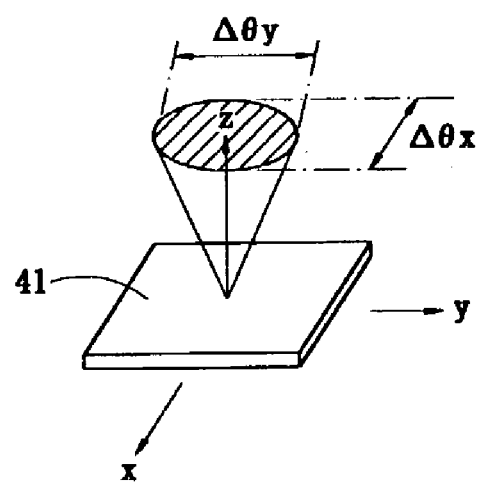
FIG. 14 is a view stereoscopically representing a directivity characteristic of the light emitted from the surface light source device.

Such an ideal directivity characteristic, if represented with an emission angle taken on a horizontal axis and brightness on a perpendicular axis, is given as a rectangular-formed characteristic as shown by a two-dot chain line in FIG. 13. It is difficult to correctly realize such a directivity characteristic. However, despite not obtaining such an ideal directivity characteristic, if it is assumed that emission light is emitted in a direction nearly perpendicular to the light emitting surface (z-axis direction), a half or more of the total emission light is contained within an area having a half of the maximum brightness in an emission-light brightness angular distribution, and as shown in FIG. 14, the area has a width (entire-width angle) of Δθx and Δθy respectively in an x-direction and a y-direction, then a more preferred directivity characteristic is obtained by providing at least 30°≦Δθx≦70°

30°≦Δθy≦70°.

Furthermore, a desirable directivity characteristic is obtained provided that

40°≦Δθx≦60°

40°≦Δθy≦60°.

Figure 15:
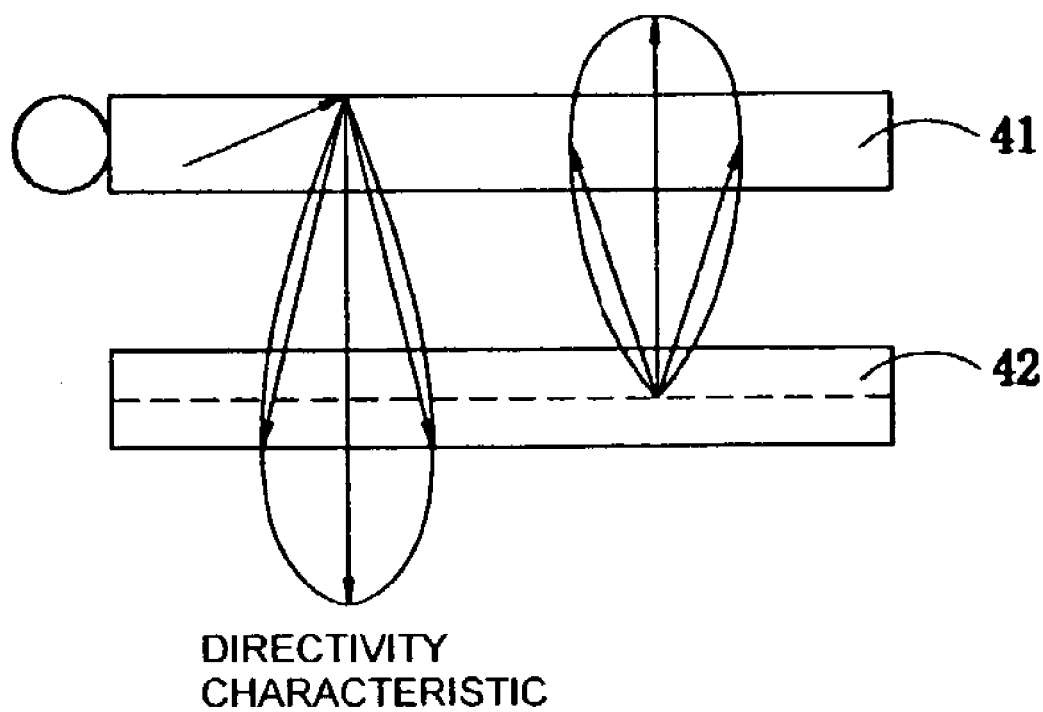
FIG. 15 is a schematic view showing a combination of a reflective-type liquid crystal display panel and a front-light type surface light source device (surface light source device)

Next, consideration is made on a case of a surface light source device 41 to be used as a front light. For a surface light source device 41 of a front light type, there is a need to consider a relationship with a reflection light angle characteristic of a reflection type liquid crystal display panel 42. Herein, the reflection light angle characteristic of a reflection type liquid crystal display panel 42 refers to an angle dependency of reflection light intensity where collimated light is incident on the reflection type liquid crystal display panel 42, as shown in FIG. 15. FIG. 16(A) (B) (C) (D) represents directivity characteristic of a front-light type surface light source device 41, wherein the directivity characteristic is gradually broadened from (A) toward (D). Meanwhile, FIG. 16(a) (b) (c) (d) represents a reflection-light angle characteristic of a reflection type liquid crystal display panel 42, wherein (a) (b) (c) (d) respectively corresponds to the directivity characteristic A) (B) (C) (D).

As shown in FIG. 16, as the directivity characteristic of the surface light source device broadens, the reflection light intensity angle characteristic of the liquid crystal display panel 42 is gradually moderated. In the case that the directivity characteristic of the surface light source device 41 becomes broader than the reflection light intensity angle characteristic of the liquid crystal display panel 42 as in FIG. 16(D) (d), there is decrease in the perpendicular component intensity of the light reflected upon the liquid crystal display panel 42 as compared to the case having a directivity characteristic of the surface light source device 41 narrower than a reflection light intensity angle characteristic of the liquid crystal display panel 42 as in FIG. 16(A) (a); (B) (b); (C) (c).

Mentioning on the case shown in FIG. 16, of the light emitted from the surface light source device 41, the light reflected at an angle outside 30 degrees or its around as measured with respect to an axis perpendicular to the liquid crystal display panel 42 substantially results in loss.

Accordingly, in the case of the front-light type surface light source device 41, it is preferred to narrow the directivity characteristic to emit a half or more, desirably two-thirds or more, of the emission light of the surface light source device 41 to within an angular range of a full-width at half maximum of the reflection light intensity angular distribution of the reflection-type liquid crystal display panel 42. It is noted that the full-width at half maximum of the reflection light intensity angular distribution of the reflection-type liquid crystal display panel 42 refers to an angle of between the two points having a half value of the maximum value as shown in FIG. 17(a). However, the directivity characteristic of the surface light source device 41 has, in some cases, a sharp peak at a center. Accordingly, as shown in FIG. 17(b), the angle of between the two points having a half of the intensity in a position off a center peak position, e.g. a position distant by approximately 5 degrees from a peak, is referred to as a full-width at half maximum.

In the below, explanations will be made on various embodiments of surface light source devices having a characteristic approximate to an ideal directivity characteristic as noted above.

(First Preferred Embodiment)

First, FIG. 18 is an exploded perspective view showing a structure of a backlight-type surface light source device 43 according to a first preferred embodiment of the present invention. This surface light source device 43 is structured with a transparent light conductor plate 44 and a light emitting part 45 arranged oppositely to a light incident surface 44a of the light conductor plate 44. The light conductor plate 44 is formed in a rectangular plate form of a transparent resin having a high refractive index (e.g. polycarbonate resin, methacrylic resin or the like). This has a lower surface having a plurality of strips of diffusion patterns 46 formed parallel one with another to extend over nearly entire widthwise length. The diffusion pattern 46 has a section nearly in a rectangular triangular form structured with a deflecting slant surface 46a at a light-source side and a nearly perpendicular surface in a rear surface (light re-incident surface) 44b. The diffusion patterns 46 are formed by cutting the lower surface of the light conductor plate 44. These are formed with a spacing from one another. The spacing between the diffusion patterns 46 decreases with increase in distance from the light incident surface 44a.

The light emitting part 45 has a wedge-like light conductor 47 formed of a transparent resin having a high refractive index (hereinafter, referred to as a wedge-like light conductor), a small light source (hereinafter, referred to as a spot light source) 48 arranged oppositely to a side end surface of the wedge-like light conductor 47, a regular reflection plate 49 arranged on a rear surface of the wedge-like light conductor 47, and a prism sheet 50 arranged in front of the wedge-like light conductor 47. Herein, the spot light source 48 is sealed with one or a plurality of light-emitting diodes in a transparent resin. The transparent resin is covered, excepting its front surface, with a white resin. The light emitted from the light-emitting diode is efficiently emitted toward the front directly or after reflection upon an inner surface of the white resin (see FIG. 80).

The light emitted from the spot light source 48 (Lambertian light) is incident on the wedge-like light conductor 47 at a side end surface of the wedge-like light conductor 47. The light entered in the wedge-like light conductor 47 repeatedly reflects upon a front surface (light emitting surface) 47a and a rear surface of the wedge-like light conductor 47 to travel within the wedge-like light conductor 47 as shown in FIG. 19. Each time of reflection on the rear surface of the wedge-like light conductor 47, decreased is the incident angle on the front surface 47a. At a point where the incident angle on the front surface 47a of the wedge-like light conductor 47 is smaller than a critical angle of total reflection, the light is emitted at the front surface 47a of the wedge-like light conductor 47 to the outside. Meanwhile, as shown with a broken line in FIG. 19, the light emitted outside at the rear surface of the wedge-like light conductor 47 is reflected upon a regular reflection plate 49 to be returned again into the wedge-like light conductor 47, then being emitted at the front surface 47a of the wedge-like light conductor 47. In this manner, the light emitted at the front surface 47a of the wedge-like light conductor 47 is aligned into a direction nearly parallel with the front surface 47a of the wedge-like light conductor 47 (generally in a negative direction on the x-axis).

The prism sheet 50, arranged on the front surface 47a of the wedge-like light conductor 47, is formed of also a transparent resin having a high refractive index (e.g. a transparent resin having a refractive index 1.59). The prism sheet 50 has a plurality of prisms 50a arranged on a front surface thereof. Each prism 50a is sectionally in a triangular form having an apex angle of 40 degrees to extend in a perpendicular direction (in a thickness direction of the light conductor 44). Consequently, the light emitted at the front surface 47a of the wedge-like light conductor 47 in the above manner transmits the prism 50a and refracted whereby it is deflected to a direction nearly perpendicular to the prism sheet 50 and then incident nearly perpendicularly on the light conductor plate 44 at the light incident surface 44a. Consequently, according to the light-emitting part 45, the light emitted from the spot light source 48 can be emitted with spread over nearly entire length of the prism sheet 50. Thus, the spot light source 48 can be converted into so-called a linear light source.

Incidentally, there is a case that the light transmitted through the prism sheet 50 in a part turns into stray light due to the forming error of apex roundness in a prism section of the prism sheet 50 or Fresnel reflection. Consequently, in order to deflect at least a half or more of the light emitted from the spot light source 48 by the prism sheet 50 to be incident at a desired angle (in a direction perpendicular to the light incident surface 44a, in this embodiment) on the light conductor plate 44, it is preferred that the light emitted, at the front surface 47a of the wedge-like light conductor 47, in parallel with the front surface 47a has a ratio of two-thirds or greater to all the emission light of from the spot light source 48.

Considering, for comparison, a case using a diffuse-reflection plate on the rear surface of the wedge-like light conductor 47 in place of the regular reflection plate 49, the light emitted, at the front surface 47a of the wedge-like light conductor 47, along the front surface 47a is a half or less of the total amount of the light emitted from the spot light source 48. This is because of the reason that, as the light shown by the broken line in FIG. 19, the light leaked at the rear surface of the wedge-like light conductor 47 strikes the diffuse-reflection plate where it is reflected nearly in Lambertian distribution, so that less light is emitted along the front surface 47a of the wedge-like light conductor 47 (nearly in a negative direction on x-axis).

Although it was already mentioned that the light-emitting part 45 structured as in this embodiment can convert the spot light source into a linear light source, furthermore the light emitted from the linear light source can be aligned nearly even in direction. FIG. 20 shows, in a form arranged with a regular reflection plate giving equal incident and emitting angles without diffusive action on the rear surface of the wedge-like light conductor 47, shown is a result of a measurement on a relationship between an angle $\alpha$ of the emission light from the wedge-like light conductor 47 defined relative to the front surface 47a thereof (negative direction on x-axis) (see Fig. FIG. 19) and an intensity of the light in that direction. FIG. 21 shows, in a case of replacing the regular reflection plate on the rear surface of the wedge-like light conductor 47 with a diffuse-reflection plate, shown is a result of a measurement on a relationship between an angle $\alpha$ of the emission light from the wedge-like light conductor 47 defined relative to the front surface 47a thereof (negative direction on x-axis) (see Fig. FIG. 19) and an intensity of the light in that direction. This measurement uses a wedge-like light conductor 47 having a length 30 mm, a thickness 1 mm, a width of a side surface to which a spot light source 48 opposes 2 mm and a refractive index 1.53, and a regular reflection plate or diffuse-reflection plate having a length of approximately 30 mm. Meanwhile, measurement was made in a state the prism sheet 50 was removed.

Incidentally, in the graphs shown in FIGS. 20 and 21, the light intensity (energy) in an $\alpha$ direction does not signify an angular distribution of intensity of the light emitted in the $\alpha$ direction on a plane perpendicular to the front surface 47a of the wedge-like light conductor 47 (x-y plane in FIG. 22). Instead, it is a representation of an intensity of the light contained in a unit angle ($d\alpha=1$) in the $\alpha$ direction where the emission light at the front surface 47a is all projected onto the relevant plane.

As can be seen from FIG. 20, in the case of using a regular reflection plate, light intensity reaches the maximum at a direction of nearly, slightly smaller than 30 degrees. In a range of 0 to 40 degrees, there is light concentration of 98% of the total light amount. Even if this is deflected by the prism sheet 50 and incident on the light conductor plate 44 whereupon, should nearly 10% of loss occur due to manufacture error of the prism sheet 5, 80% or more of the light can be aligned to within a range of ±13 degrees as viewed from the above (z-axis direction). Contrary to this, as shown in FIG. 21, in the case of using a highly-diffusive reflection plate as in usual use, only 52% of light concentrates within the range of 0 to 40 degrees. Moreover, in case loss is added due to the prism sheet 50, it is impossible to narrow the directivity at within the light conductor plate 44.

Consequently, according to such a light-emitting part 45, light emission is possible over a long range as in a linear light source by the use of the spot light source 48, such as light-emitting diodes, and the wedge-like light conductor 47. Moreover, the Lambertian light emitted from the spot light source can be aligned nearly evenly and emitted as a light narrow in directivity.

In this manner, the light incident at the light incident surface 44a on the light conductor plate 44 travels from a proximate side to the light-emitting part 45 toward a distal side within the light conductor plate 44 while repeating total reflection at between the upper surface (light emitting surface 44b) and the lower surface of the light conductor plate 44. Then, when this is incident on a triangular diffusion pattern 46 provided in a bottom surface of the light conductor plate 44, a part thereof is reflected upon the diffusion pattern 46 and emitted at the light emitting surface 44b. Because the triangular diffusion pattern 46 is made long in the x-axis direction, the light even if reflected by the diffusion pattern 46 does not change in its directivity in the x-axis direction. Accordingly, the light narrow in directivity in the x-axis direction aligned by the light-emitting part 45, after reflected upon the diffusion pattern 46 and emitted in the z-axis direction, is kept narrow in its directivity in the x-axis direction. On the other hand, the light propagating in the light conductor plate 44 has a spread in the z-axis direction. However, the spread turns into a spread in they-axis direction upon reflection in the z-axis direction by the diffusion pattern 46. However, the spread in the y-axis direction can be narrowed by restricting the angle of the light being reflected by the diffusion pattern. Thus, the light after emitted at the light emitting surface 44b can be made narrower in the directivity in the y-axis direction than a directivity in the z-axis direction of within the light conductor plate 44. In a typical example, the directivity of the light exited at the light emitting surface 44b of the light conductor plate 44 as viewed in the x-axis direction, in the overall width, is within a range of approximately 55 degrees about the z-axis direction, while the directivity thereof as viewed in the y-axis direction, in the overall width, is within a range of approximately 25 degrees about the z-axis direction.

Consequently, according to the surface light source device 43, it is possible to emit light in a direction perpendicular to the surface light source device 43 without the use of a prism sheet or the like, and to narrow the directivity thereof. It is possible to realize a directivity characteristic approximate to the ideal directivity characteristic. Because of no use of a prism sheet, the surface light source device 43 can be cost-reduced and the surface light source device 43 can be reduced in thickness.

Contrary to this, in a method for enhancing a directivity of light by laminating two prism sheets having patterns made orthogonal to each other, the directivity characteristic of light is given as a pattern as shown by a broken line in FIG. 13. Even where the light before entering the prism sheet has a directivity of ±30 degrees, the light after passing the two-laminated prism sheets could not have emitted a half or more to within a range of ±20 degrees.

Meanwhile, in this surface light source device 43, the diffusion patterns 46 have an increased interval in an area close to the light emitting part 45 while the interval of the diffusion patterns 46 is gradually decreased as distant from the light emitting part 45. Due to this, brightness is made even on the entire of the light emitting surface 44b of the light conductor plate 44.

Next, explanation will be made in detail on the operation of the diffusion pattern 46 sectionally in a triangular form. Now, the directivity of the light before incidence on the diffusion pattern 46 is considered on a case that is narrow only in the x-axis direction as in FIG. 23(*a*), a case that is narrow only in the z-axis direction as in FIG. 23(*b*) and a case that is narrow only in the x-axis and z-axis directions as in FIG. 23(*c*). Of these, such a case as in FIG. 23(*c*) is free from a narrow directivity in any direction unlike FIG. 22(*a*) and (*b*) and hence excluded.

Next, considered is a case that the light having a directivity narrow only in the z-axis direction is incident on the diffusion pattern 46 as shown in FIG. 23(*b*). In this case, as shown in FIG. 24, in case all the light incident on the diffusion pattern 46 is totally reflected upon the deflecting slant surface 46a of the diffusion pattern 46, there is no change in directivity of the light reflected upon the diffusion pattern 46. In particular, the directivity in the x-axis direction is not narrowed. Consequently, as shown in FIG. 25(*a*) (*b*), in case the deflecting slant surface 46a of the diffusion pattern 46 is increased in its inclination angle to reflect a part of the light upon the diffusion pattern 46 to transmit the part of the light, the light totally reflected upon the deflecting slant surface 46a of the diffusion pattern 46 is emitted in a direction largely inclined relative to the z-axis. This also transmits through the deflecting slant surface 46a of the diffusion pattern 46 as shown in FIG. 26. The light re-incident on the rear surface 46b is changed in its angle upon re-incidence. Thus, the directivity in the z-axis direction is collapsed. Accordingly, as shown in FIG. 23(*b*), for the light having a directivity narrow only in the z-axis direction, there is extreme difficulty in narrowing the directivity also in the x-axis direction.

Contrary to this, as shown in FIG. 23(*a*), for the light having a directivity narrow only in the x-axis direction, when it is incident on the deflecting slant surface 46a of the diffusion pattern 46 sectionally in a triangular form long in the x-axis direction, even if it before incidence has a relatively great spread in the z-axis direction as in FIG. 27(*a*), if a part of the light is totally reflected on the deflecting slant surface 46a of the diffusion pattern 46 as in FIG. 27(*b*) while a part of the light is caused to transmit through the deflecting slant surface 46a as in FIG. 27(*c*) and re-incident on the rear surface 46b, then the light reflected upon the diffusion pattern 46 can be limited in region to one part. Accordingly, it is possible to narrow the directivity in the y-axis direction of the light totally reflected on the diffusion pattern 46 and emitted at the light emitting surface 44b. Moreover, by setting the inclination angle of the deflecting slant surface 46a of the diffusion pattern 46 to a proper value, the light reflected upon the diffusion pattern 46 can be easily emitted in a direction nearly perpendicular to the light emitting surface 44b (in the z-axis direction). On the other hand, because the diffusion pattern 46 extends evenly in the x-axis direction, there is no spread of directivity in the x-axis direction even where total reflection is done upon the diffusion pattern 46. Meanwhile, as shown in FIG. 27(*c*), the light transmitted through the deflecting slant surface 46a of the diffusion pattern 46 and re-incident at the rear surface 46b changes in traveling angle on the y-z plane.

However, because the directivity in the z-direction is not narrow in its nature, there is no possibility of directivity broadening in the z-axis direction. Incidentally, the center light L2 in FIG. 27(a) represents a light to be incident at an angle slightly greater or slightly smaller than a critical angle of total reflection on the deflecting slant angle 46a of the diffusion pattern 46.

Although the explanation using FIGS. 23(a) and 27 explained on the case not having light spread in the x-axis direction at all, actually the light emitted from the light emitting part 45 has a spread more or less even in the x-axis direction. For example, when considering a space frequency as viewing the light propagating in the light conductor plate 44 in a y-axis direction, the light is considered concentrated in a hatched region in FIG. 28. Herein, the light on a center line-j parallel with the z-axis direction is a light traveling on the y-z plane, while the light on a line-i parallel therewith represents a light inclined toward the x-axis direction relative to that. In the case that the diffusion pattern 46 extends perfectly parallel with the x-axis and furthermore the deflecting slant surface 46a of the diffusion pattern 46 and the rear surface 46b extend parallel with each other in the plan view, there is no change of the light space frequency in the x-axis direction due to the reflection upon or transmission through the diffusion pattern 46. For this reason, on the x-y plane, the direction of light's traveling in the light conductor plate 44 does not change as long as no light is emitted. There is nothing more than transfer of the light on the line-i to the line-i and of the light on the line-j to the line-j.

Accordingly, in case the directivity in the x-axis direction is narrowed in the light emitting part 45 and thereafter the same light is reflected upon the diffusion pattern 46 to thereby narrow the directivity thereof in the y-axis direction, the light emitted in the z-axis direction from the surface light source device 43 is narrowed in its directivity in both the x-axis and y-axis directions. In conclusion, this makes it possible to emit a light having a directivity narrow in every direction, as shown in FIG. 29.

In the meanwhile, in order to reduce the directivity in the x-axis direction of the light to be emitted from the light conductor plate 44 down to ±20 degrees or smaller, there is a need to provide a directivity in the x-axis direction of ±13 degrees or smaller at within the light conductor plate 44. The numeral of ±13 degrees or smaller is due to a calculation by taking a refractive index of the light conductor plate 44 of 1.53. However, the transparent resin to be used for the light conductor plate 44 has a refractive index of approximately 1.4–1.65. Within this range, there is no significant change in the directivity angle in the x-axis direction required in the light conductor plate 44. Also, even where the refractive index changes furthermore, practically there is no significant change in the value of 13 degrees. Accordingly, this value may be targeted in designing a light emitting part 45.

In the case that a center of light in a traveling direction (center of a spread of ±13 degrees or smaller) is in parallel with the y-axis direction, the diffusion pattern 46 may be made parallel with the x-axis direction. However, as shown in FIG. 30, in the case that a center of light in a traveling direction is inclined relative to they-axis direction, in order to correct it the diffusion pattern 46 in its extending direction may also be placed inclined relative to the x-axis direction to make the direction of light's traveling and the extending direction of the diffusion pattern 46 perpendicular to each other in the plan view (on the x-y plane).

It is noted that, in a surface light source device of such a scheme, because the light traveling in the light conductor plate 44 has an extremely narrow directivity, in the case that the light center in the traveling direction, is inclined from the y-axis direction, there occurs darkening at a corner D in the light conductor plate 44 as shown in FIG. 30. Consequently, on the light conductor plate having such a rectangular light-emission area, it is preferred that the light center in a traveling direction is in a direction perpendicular to the light incident surface 44a or at least within ±13 degrees with respect to the direction perpendicular to the light incident surface 44a. Meanwhile, as for the diffusion pattern 46, in case the light center in a traveling direction and the diffusion pattern 46 are within a range of ±13 degrees instead of perfectly perpendicular, there is no problem because the perpendicular direction to the light emitting surface 44b of the surface light source device 41 is included within an emission-light angular range of ±20 degrees.

Incidentally, in the case of examining a directivity characteristic of the light of in the light conductor plate 44, the light conductor plate 44 is cut on the plane parallel with the z-axis and nearly perpendicular to the direction of light's traveling as shown in FIG. 31. By measuring an angular intensity distribution of the light emitted at the cut surface C—C, it is possible to calculate an angular intensity distribution of within the light conductor plate 44, from the Snell's law.

Next, explanation will be made on a shape, a designing method and the like of individual diffusion patterns. Where the diffusion pattern 46 is nearly perpendicularly arranged relative to a traveling direction of the light in the light conductor plate 44, a sectionally triangular form of pattern is suited for the diffusion pattern 46 as noted before. In the case of a diffusion pattern 51 formed with a curve surface as shown in FIG. 32, the deflecting direction of light is different depending on a point of light reflection, thus broadening the angular range of emission light. Accordingly, not preferred is the pattern thus configured with a curve surface in a section perpendicular to a lengthwise direction. Meanwhile, in the case of a diffusion pattern 52 in a saw-tooth form as shown in FIG. 33, the light transmitted through the diffusion pattern 52 is not emitted in a direction perpendicular to the light emitting surface 44b but all emitted in useless directions. Consequently, such a saw-tooth patterned diffusion pattern 52 is also not preferred.

Contrary to this, in the case of a diffusion pattern 46 sectionally in a rectangular triangular form having a rear surface 46b perpendicular to a lower surface of the light conductor plate 44, as shown in FIG. 34(a) the light totally reflected upon the deflecting slant surface 46a, even when all the light is reflected, is reflected while keeping directivity. In the case that a part transmits through the diffusion pattern 46, there is narrowing in the directivity. Meanwhile, as shown in FIG. 34(b), the light transmitted through the diffusion pattern 46, after being re-incident at the rear surface 46b without impairing the directivity, can be totally reflected upon another diffusion pattern 46. Incidentally, although the rear surface 46b is preferably perpendicular to the lower surface of the light conductor plate 44, a somewhat inclination is provided in view of difficulty in die removal during molding.

It is noted that, for such a diffusion pattern 46 sectionally in a rectangular triangular form, where the light in the light conductor plate is not aligned in direction as viewed at the upper surface (spread is greater in the x-axis direction), there is a reduced ratio of the light perpendicularly striking the diffusion pattern 46 with increase of the light obliquely striking it. The obliquely striking light as viewed at the upper surface has an increased incident angle on the diffusion pattern 46 as compared to the perpendicularly striking light, to have an increased ratio of reflection. Namely, there is decrease in the effect of re-incidence on the diffusion pattern 46 (the effect of narrowing directivity without decreasing the utilization efficiency of light). Accordingly, for the diffusion pattern 46 sectionally having a rectangular triangular form, in order to enhance the effect of the diffusion pattern 46, there is a need that the light is aligned in its traveling direction within the light conductor plate 44 and the diffusion pattern 46 is arranged rectangular to the traveling direction. Otherwise, for the case with the present embodiment, it is premised that the directivity in the x-axis direction is made narrow by the light emitting part 45.

Consideration will be made on an inclination angle γ of the deflecting slant surface 46a of the diffusion pattern 46. FIG. 35 is an angular distribution of emission light intensity when taking the inclination angles γ of 45, 55 and 65 degrees, wherein the horizontal axis represents an emission angle ε of the emission light shown in FIG. 36 while the perpendicular axis represents an emission light intensity. In FIG. 35, the reason of the increase of luminosity on a minus side of an emission angle ε is because the light having a greater emission angle has a less light striking the deflecting slant surface 46, as shown in FIG. 37(a) (b). Otherwise, when viewed on the y-z plane, the light in the light conductor plate 44 nearly parallel with the deflecting slant surface 46a has an emission light intensity of zero (such light does not exist in many cases), wherein the intensity of emission light increases with increase in the distance from such an angle, i.e. with decrease in the emission angle ε (with increase on the minus side). Seeing FIG. 35, in the case of γ=55 degrees, the emission angle ε is on the minus side wherein the angular range of emission light is somewhat less but the intensity correspondingly great so that balance is provided between the minus and plus side of emission angle ε.

FIG. 38(a) shows a diffusion characteristic of a reflective-type liquid crystal display panel having a diffusion action of approximately 25 degrees. FIG. 38(b) shows an emission light angular characteristic of a surface light source device having a diffusion pattern 46 of an inclination angle of γ=55 degrees. FIG. 38(c) represents an emission light angular characteristic of from a reflective-type liquid crystal display panel where the light of a surface light source device having such a characteristic as of FIG. 38(b) is incident on the reflective-type liquid crystal display panel having such a characteristic as of FIG. 38(a). As shown herein, in case the surface light source device having a diffusion pattern 46 with an inclination angle of γ=55 degrees emits light onto the reflective-type liquid crystal display panel having a diffusion action of approximately 25 degrees, the emission light becomes maximum in a perpendicular axis direction of the liquid crystal display panel, obtaining the optimal light emission direction. On the other hand, in case the inclination angle γ goes out of a range of 45–65 degrees, light emission becomes unavailable in a direction perpendicular to the light emission surface 44b (z-axis direction), thus requiring a prism sheet or the like. Therefore, the deflecting slant surface 46a of the diffusion pattern 46 preferably has an inclination angle γ magnitude of in the range of 45–65 degrees.

Next, consideration will be made on an angle δ of the rear surface 46b of the diffusion pattern 46. As in FIG. 39, in case the angle δ of the rear surface 46b is excessively small, the diffusion pattern 46 is in a saw-tooth form. Accordingly, the light, transmitted through the deflecting slant surface 46a of the diffusion pattern 46 and again entered at the rear surface 46b, is incident on the light emitting surface 44b before striking a diffusion pattern 46 in the rear and emitted along the light emitting surface 44b, thus resulting in a loss. For this reason, the angle δ of the rear surface 46b is preferably great, preferably at least greater than the inclination angle γ of the deflecting slant surface 46a (γ<δ).

Meanwhile, as shown in FIG. 40, in case the angle δ of the rear surface 46b is small, the light transmitted through the deflecting slant surface 46a is readily to leak out of the light conductor plate 46. However, as shown by the broken line in FIG. 40, as the angle δ of the rear surface 46b nears to 90 degrees, there is increase in the ratio of light to be re-incident on the rear surface 46b. On the other hand, at an angle α exceeding 90 degrees, it is impossible to form a light conductor plate 44. Accordingly, the angle δ of the rear surface 46b is preferably in a range of 80–90 degrees as a measure, furthermore desirably 85–90 degrees.

Incidentally, FIG. 41 (a) (b) (c) shows a structure of a conventional light emitting part. There have been three light-emitting part structures, i.e. (i) a structure as shown in FIG. 41(a) that a spot light source 53, such as a light-emitting diode, is converted into a linear light source by a light conductor 54 and then spread into a planar form, (ii) a structure as shown in FIG. 41(b) that spot light sources 53 are arranged at an equal interval to provide a linear light source in a false fashion to spread the light thereof into a planar form, (iii) a structure as shown in FIG. 41(c) that the light emitted from a spot light source 48 is directly spread into a planar form.

In order to improve the directivity at each point on a light conductor plate 55 as viewed at the upper surface of the light conductor plate 55, realization is relatively easy by the structure (iii). In this case, however, there is increase in the amount of light leaking at the points P2, P3 in FIG. 41 in a side surface of the light conductor plate 55, thus raising a problem that efficiency is difficult to increase Meanwhile, at a corner P1 of the light conductor plate 55 the required amount of light is extremely great as compared to that at the point of P2 or P3. On the contrary, it is actually difficult to increase the amount of light to be conducted toward P1 as compared to that of P2, P3. For this reason, actually the amount of leak light at the point of P2, P3 must be increased to match the brightness at P2, P3 with the brightness at the point of P1 thereby equalizing the brightness. Thus, the leak amount of light is increased at P2 and P3, thereby lowering efficiency.

Contrary to this, in the structure as in (i) (ii), notice has been paid only to equalizing the brightness in a plane without consideration for improving the directivity of the light to be emitted from the light conductor plate 55. In particular, the point of making even the brightness of the light emitted from the light conductor plate 55 in a range of ±10–30 degrees, not seen in any of (i) (ii) (iii), is unique to the present invention.

(Second Preferred Embodiment)

Next, explanation will be made on a case with a surface light source device 56 of a front light type. In this case, a light conductor plate 44 is provided on an upper surface of a reflective-type liquid crystal display panel 57, as shown in FIG. 42. A light emitting surface 44b is positioned in a lower surface of the light conductor plate 44. A light emitting part 45 converts the light emitted from a spot light source, such as a light-emitting diode, into a linear form, and causes it to be incident at a light incident surface 44a on the light conductor plate 44. Consequently, the light incident on the light conductor plate 44, upon being totally reflected upon the light conductor plate 46, is emitted at a light emitting surface 44b toward the direct below, thereby lighting a reflective-type liquid crystal display panel 57 placed below a surface light source device 53. The light reflected by the reflective-type liquid crystal display panel 57 returns again into the light conductor plate 44 and emitted upward through between the light conductor plates 46.

For the surface light source device 56 for use as a front light in this manner, in case roundness occurs at an apex of a triangular diffusion pattern 46 or at a boundary between a back surface 46b and a lower surface as shown in FIG. 43, the light directly emits toward an observer, thus lowering the contrast of the light including an image reflected by the reflective-type liquid crystal display panel 54. Consequently, these points preferably have a smaller radius of curvature R1, R2. However, in case the radius of curvature R1, R2 is made small by a mold die for forming a light conductor plate 46, there is a fear to cause roundness during forming. This is not preferred because of causing variation between the individuals or variation depending upon a position due to a delicate forming condition (e.g. resin lot variation, etc.). Consequently, in order to suppress the variation, a small amount of radius of curvature is preferably provided on the mold die from the beginning. From a forming limit, R1, R2 is 0.25 $\mu$m or greater. Also, in order to suppress the lower of contrast, this is preferably one-third or smaller, further more preferably one-fifth, of a height T of the diffusion pattern 46.

(Third Preferred Embodiment)

FIG. 44 is a plan view showing a structure of a surface light source device 58 according to a third preferred embodiment of the invention. This embodiment is characterized in that diffusion patterns 46 do not extend over the entire length of the light conductor plate 44 but the diffusion patterns 46 short in length are distributed entirely on the light conductor plate 44 unlike the first embodiment. On the closer side to the light emitting part 45, the diffusion patterns 46 have a small distribution density. As distant from the light emitting part 45, the diffusion patterns 46 are increased in distribution density. By thus distributing the shortened diffusion patterns 46, there is increase in freedom of arranging the distribution patterns 46. Accordingly, it is possible to make even the brightness distribution of the light emitted from the light conductor plate 44.

As shown in a comparative explanatory view of FIG. 45, in the case that the emission light from the light emitting surface 44b has an intense directivity in the x-axis direction but spread in the y-axis direction, in order to spread the directivity in the x-axis direction there is a need to arrange, for example, a weak diffusion plate on the light conductor plate 44 thereby causing diffusion in the emission light and spreading the directivity in the x-axis direction. Thus, there encounters size increase as a surface light source device.

For this reason, in the embodiment of FIG. 44, the diffusion pattern 59 for causing somewhat diffusion of light in the x-axis direction is provided on the light incident surface 44a of the light conductor plate 44 thereby adjusting nearly equal the directivity in the x-axis direction and the directivity in the y-axis direction. The diffusion pattern 59 can use, for example, a prism-formed pattern. As described before, emission light preferably has a directivity of at least 10 degrees or greater. Accordingly, in the case that the directivity in the x-axis direction is smaller than 10 degrees, the use of such means can provide a directivity in the x-axis direction of approximately 10 degrees or greater.

(Fourth Preferred Embodiment)

Meanwhile, the surface light source device 60 shown in FIG. 46 is made to broaden the light directivity in the x-axis direction by the diffusion patterns 46. Namely, in also this surface light source device 60, short diffusion patterns 46 are distributed entirely on the light conductor plate 44. The diffusion pattern 46 is not in a straight-line form but moderately winding along a lengthwise direction as shown in FIG. 47. Accordingly, depending on a position on the diffusion pattern 46, there is slight difference in the reflecting direction of incident light. Thus, emission light can be broadened also in a direction orthogonal to a direction of light's traveling. For example, in the case that the maximum angle defined by a tangent line drawn on the diffusion pattern 46 and an x-axis direction is ?=13 degrees, the light reflected upon the diffusion pattern 46 can be broadened in directivity by approximately ?20 degrees.

Meanwhile, even where there is no winding in the individual diffusion pattern 46 itself, in case the diffusion patterns 46 are directed in different directions as shown in FIG. 48, it is possible to obtain an effect to totally broaden the directivity of emission light.

The directivity is different, for a diffusion pattern 46 as in FIG. 47, depending upon in which position of the diffusion pattern 46 the maximum tangential angle is and, for a diffusion pattern 46 as in FIG. 48, depending upon which diffusion pattern 46 is inclined greatest. However, the emission-light angular distribution can be made even for the diffusion pattern 46 as in FIG. 47 by designing such that the inclination of each part exists at a constant ratio of from the maximum value to 0, and for the diffusion pattern 46 as in FIG. 48 by designing such that the inclination of each diffusion pattern 46 distributes nearly evenly. Meanwhile, by eliminating the region perpendicular to a direction of light's traveling in plan view or each diffusion pattern 46 or by reducing the ratio, it is possible to lower the brightness in a direction perpendicular to the light emitting surface.

Now, by totally reflecting the light having a directivity extremely narrow in the x-axis direction in the light conductor plate 44 (FIG. 23(a)) by such a diffusion pattern 46 as in FIG. 47, considered is to realize an ideal light conductor plate light emission angular distribution. The ideal light conductor plate light emission angular distribution preferably has an emission light intensity lying constant in a certain range and zero in the other as mentioned above. In the case that the light traveling inside the light conductor plate 44 is unidirectionally aligned as viewed in the z-axis direction, realization is possible by winding the diffusion pattern 46 as in FIG. 47. Considered is the light L4, L5, L6 which strikes e-part, f-part, g-part of a diffusion pattern 46 winding in an S-form to be totally reflected and emitted at a light emitting surface 44b as shown in FIG. 49. For the light L4 striking the e-part, because the diffusion pattern 46 in plan view is perpendicular, the light L4 totally reflected is emitted onto the z, y plane as shown in FIG. 50. A view viewed from the z-axis is shown in FIG. 51(a). In FIG. 51(a), the reflected light L4 is parallel with the y-axis.

Contrary to this, of the totally reflecting light L5, L6 due to striking the f-part and g-part of the diffusion pattern 46, the light reflected in a minus direction on the y-axis goes away from the light of L4 while the light reflected in a plus direction on the y-axis goes near the light of L4. Specifically, of the light L6 reflected at a g-point, the light reflected in the minus direction on the y-axis as the ray C1 shown in FIG. 51(b) has a great deflection angle upon reflection by the diffusion pattern 46 to travel greatly distant from the light of L4. However, the light reflected in the plus direction on the y-axis as the ray C2 has a small deflecting angle upon reflection by the diffusion pattern 46 not to travel greatly distant from the light of L4. Consequently, the light L5, L6 reflected at the f-point or g-point, as viewed in the z-axis direction, is spread in a direction shown in FIG. 51(a) and emitted. Accordingly, in case light is reflected between the f-point and the g-point of the diffusion pattern 46 as represented in FIG. 49, it after emission in the z-axis direction is spread in a region between the light L5 and L6 shown in FIG. 51(a).

Meanwhile, when light is incident nearly parallel with the deflecting slant surface 46a as viewed in the x-axis direction, the light L4 and L6 coincide. As the angle to the deflecting slant angle 46a increases, the light L4 and L6 go distant farer. Consequently, as the angle to the deflecting slant surface 46a increases, the amount of light per unit angle in the x-axis direction decreases. However, as noted before, considering only the ray on L4, L5 or L6, essentially the amount of light to be reflected upon the diffusion pattern 46 becomes zero in intensity when the light is nearly in parallel with the deflecting slant surface 46a of the diffusion pattern 46, wherein the amount of reflection light increases with increase of the angle to the deflecting slant surface 46a. As a result of offset of these two effects, the light is even in a region surrounded by A1, B1, B2, A2, C2 and C1, i.e. in an angle range the light is to be emitted. In this directivity characteristic, the light emission angle is −22 to +37 degrees in the y-axis direction and the light emission angle is −25 to +25 degrees in the x-axis direction. Accordingly, $\Delta\theta y=59$ degrees and $\Delta\theta x=50$ degrees is given, in which range nearly 100% of light is to be emitted.

Incidentally, even where the diffusion pattern 46 winds, direction of light's traveling is made almost not changed before and after the transmission through the diffusion pattern 46 of the light transmitted through the deflecting slant surface 46a of the diffusion pattern 46 and re-incident at the back surface 46b as viewed in a direction perpendicular to the light incident surface 44a. For this, in case the deflecting slant surface 46a and the back surface 46b are made parallel with each other as viewed in a direction perpendicular to the light incident surface 44a, direction of light's traveling is nearly the same before and after transmission through the diffusion pattern 46.

(Fifth Preferred Embodiment)

FIG. 53 shows a surface light source device 61 according to a fifth preferred embodiment of the invention to be used as a backlight. This surface light source device 61 has a regular reflection plate 62 arranged parallel with a back surface of a wedge-formed light conductor plate 44 and a prism sheet 63 opposed to a light emitting surface 44b of the light conductor plate 44. The wedge-formed light conductor plate 44 is made with a slant surface in its back surface, the inclination of which is $\eta=1.52$ degrees, for example. Meanwhile, the light conductor plate has a size, for example, having a length of 30 mm, a thickness of a light incident surface 44a of 1 mm and a thickness at a tip of 0.2 mm. The light conductor plate 44 thus made is seen as if there were no diffusion patterns 46 at a first glance. However, it can be considered that the back surface and the light incident surface 44a are not parallel, and the lower surface entirety is made as one diffusion pattern 46. In the showing in FIG. 53, a prism sheet 63 arranged with prisms having an apex angle of 40 degrees or greater is arranged with its pattern surface directed outward. The pattern surface may be opposed to the light incident surface 44a of the light conductor plate 44. In such a case, the prism apex angle is not limited to 40 degrees. Also, a light emitting part 45 is to convert the light of a spot light source, such as a light-emitting diode, into a linear light source and emit it. This can use, for example, a light emitting part 45 as was explained in the first embodiment formed by a wedge-formed light conductor 47, a spot light source 48, a regular reflection plate 49 and a prism sheet 50. Incidentally, the back surface of the light conductor plate 44 may be curved instead of a flat surface.

Then, the light emitted from the light emitting part 45 and incident at the light incident surface 44a on the light conductor plate 44, each time striking the back surface (diffusion pattern 46) to be reflected, gradually decreases in the incident angle on the light emitting surface 44b or back surface. When the incident angle on the light incident surface 44a exceeds a critical angle of total reflection, the light is emitted at the light emitting surface 44b. Meanwhile, as shown in FIG. 54, the light emitted at the back surface of the light conductor plate 44 is regularly reflected without diffusion by the regular reflection plate 62, and re-incident again on the light conductor plate 44 without change in light direction. The light emitted at the light emitting surface 44b is emitted along the light emitting surface 44b as shown in FIG. 54 and then deflected by the prism sheet 63, to be emitted in a direction perpendicular to the light emitting surface 44b.

Herein, concerning the light emitted from the light conductor plate 44, the major part of light is emitted along the y-axis as viewed in the x-direction (or viewed by projection on the y-z plane). There is a concentration of 99% of light in the angle defined with the light emitting surface 44b, $\rho=0$–40 degrees. Consequently, concerning the light angularly deflected by the prism sheet 63, the major part of light concentrates in a range of ±20 degrees with respect to the z-axis perpendicular to the light emitting surface 44b of the light conductor plate 44 as viewed in the x-axis direction.

Meanwhile, with the light emitting part 45 as explained in the first embodiment, the light emitted from the light emitting part 45 concentrates 80% or more of light in a range of ±13 degrees with respect to the y-axis as viewed in the z-axis direction. Consequently, the emission light from the light conductor plate 44 also concentrates 80% or more in a range of ±20 degrees with respect to the z-axis as viewed in the y-axis direction.

Accordingly, the emission light from the prism sheet 63 is emitted nearly parallel with the z-axis without spread in the x-axis direction and y-axis direction, thus obtaining an extremely high directivity.

Meanwhile, the reflection plate for reflecting leak light needs to use a regular reflection plate 62. It is needless to say that high directivity is not obtained by a diffusion type reflection plate. The regular reflection quality and reflective index of this regular reflection plate 62 has an effect upon the amount of light to be emitted nearly parallel with the light emitting surface. It is desired to use a regular reflection plate 62 to emit, at the light emitting surface 44b, at least two-thirds of light in an angle range of $\rho=0$–40 degrees. In case such an amount of light is emitted at the light emitting surface 44b, it is possible to emit 50% or more of light in the z-axis direction after transmission through the prism sheet 63. FIG. 55 and FIG. 56 represent intensity angle characteristics of the light emitted from the light conductor plate 44, respectively, for the case using a diffusion type reflection plate on the back surface of the light conductor plate 44 and the case using a regular reflection plate. It can be seen from the measurement data that the major part of light is contained in a range of $\rho=0$–30 degrees for the case using the regular reflection plate 62 whereas the considerable part of light is emitted into a range of $\rho \geq 30$ degrees for the case using the diffuse-reflection plate.

The light conductor plate 44 used in this embodiment is not limited to a wedge form in a section but may be provided, for example, with a prism-formed pattern 64 on the back surface as shown in FIG. 57. In the case with this light conductor plate 44, the inclination angle $\gamma$ of the prism-formed pattern 64 on the back surface, if given 10 degrees or smaller, obtains a directivity equivalent to the wedge-formed light conductor plate 44. Nevertheless, the inclination angle $\gamma$ is preferably 5 degrees or smaller, particularly desirably 2 degrees or greater and 5 degrees or smaller. Meanwhile, the inclination angle $\gamma$ of the prism pattern 64 is not necessarily even but may be given such that the inclination angle $\gamma$ is relatively small on a light incident surface side and increased as going toward the tip.

Furthermore, similarly to the light conductor plate 44 shown in FIG. 58, a prism-formed pattern 64 may be provided only at a back-surface tip of a wedge-formed plate. Herein, the inclination angle $\gamma$s of the prism-formed pattern 64 is given greater than the inclination angle $\gamma$ of the wedge-like part, e.g. $\gamma$=2 degrees and $\gamma$s=3 degrees.

Meanwhile, the light emitting part 45 is not limited to the structure as explained in the first embodiment. However, as shown in FIG. 59, a plurality of spot light sources 65, such as light-emitting diodes, merely opposed to the light emitting surface 44b of the light conductor plate 44 provides, at a glance, a high directivity but much leak light in sideway direction, which in many cases is improper. Otherwise, in case the light flying sideways is to be bent parallel with they-axis direction, there encounters size increase in the z-axis direction. For this reason, it in many cases cannot be used as it is.

For this reason, similarly to the light emitting part shown in FIG. 60 for example, a cylindrical lens 66 is placed between the spot light sources 65 and the light conductor plate 44 to restrict light in the z-axis direction by the cylindrical lens 66.

Also, as shown in FIG. 61, spot light sources 65, such as light-emitting diodes, maybe arranged in plurality to provide concave mirrors 67 covering at the back thereof. With such a light-emitting part 45, light is emitted from the spot light source 65 toward the concave mirror 67 to cause the nearly collimated light, due to reflection upon the concave mirror 67, to be incident on the light conductor plate 44.

(Sixth Preferred Embodiment)

FIG. 62 is a plan view showing a structure of a surface light source device 68 according to a sixth preferred embodiment of the invention. The light conductor plate 44 used in this surface light source device 68 has a light non-emitting region 44d provided around a light-emitting region 44c in a rectangular form for use as a light source. At an end of a shorter side of the generally rectangular light conductor plate 44 and at the outside of the light-emitting region 44c, a spot light source 48 using a diode is accommodated to integrally structure a light emitting part 45. Meanwhile, the diffusion patterns 46 sectionally in a triangular form, comprising a deflecting slant surface 46a and a rear surface (light re-incident surface) 4b, are arranged on concentric circles about the spot light source 48. The interval of the diffusion patterns 46 is relatively broad on a side close to the spot light source 48 (pattern density may be constant in a region extremely close to the spot light source). The spacing is shortened as distant from the spot light source 48. This provides even brightness over the light emitting surface 44b.

Meanwhile, in the case of using two or more light-emitting diodes, pluralities of light-emitting diodes are gathered at one point thereby making a spot light source. Note that, in FIG. 62, 69 is a film wiring board (FPC) to feed power to the spot light source 48.

The diffusion patterns 46 are arranged such that the lengthwise direction thereof is nearly orthogonal to a direction connecting to the spot light source 48. The light totally reflected by the diffusion pattern 46 is emitted in a direction nearly perpendicular to the light emitting surface 44b. The light transmitting the diffusion pattern 46 transmits through it without significant change in traveling direction. Accordingly, the direction of a ray at each point is unidirectionally aligned at each point as viewed from the direct above the light conductor plate 44. Consequently, as viewed in a direction perpendicular to the light emitting surface 44b, the light emitted from the spot light source 48 travels radially without being scattered sideways. The light totally reflected by the diffusion patterns 46 is allowed to emit at the light emitting surface 44b.

The surface light source device 68 like this can be used as a backlight placed on a back surface of a transmission-type liquid crystal display panel 70, as shown in FIG. 63. In such a case, although no reflection plate may be provided on the back surface of the light conductor plate 44, a reflection plate 69, such as a regular reflection plate or diffuse-reflection plate, may be provided on the back surface of the light conductor plate 44 as shown in FIG. 63. However, in the case of using a diffusion plate on the back surface of the light conductor plate 44 (particularly, in the case the spot light source 48 has a narrow directivity), there is a need to use one sufficiently small in diffusive action in order not to adversely impair the directivity.

Also, the surface light source device 68 like this can be placed in front of a reflective-type liquid crystal display panel 71 and used as a front light, as shown in FIG. 64. In this case, anti-reflection films 72 are provided on the both surfaces of the light conductor plate 44 thereby improving light utilization efficiency, as shown in FIG. 64.

FIG. 65(a) (b) is a plan view and magnifying sectional view showing a form of the diffusion pattern 46. The diffusion pattern 46 has a nearly uniform section in a lengthwise direction and arranged perpendicular to a ray traveling direction. Meanwhile, the diffusion pattern 46 used herein somewhat winds similarly to that of FIG. 65(a). The diffusion pattern 46 is formed nearly in a rectangular triangular form by a deflecting slant surface 46a and a rear surface 46b. The inclination angle $\gamma$ of the deflecting slant surface 46a and the inclination angle $\delta$ of the rear surface 46b are desirably given as $\gamma<\delta$, $\gamma=45°-65°$ $\delta=80°-90°$.

In the case of using, for example, a light conductor plate 44 of a transparent resin having a refractive index n=1.53, when the deflecting slant surface 46a has an inclination angle $\gamma$=55° as shown in FIG. 66, the emission light from the light conductor plate 44 is emitted in a range of −25°−+35° as viewed in the x-axis direction. This is a reflection upon the diffusion pattern 46 of the light striking the diffusion pattern 46 from the below. The light striking from the above is again incident at the rear surface (light re-incident slant surface) 46b on the light conductor plate 44, as shown in FIG. 67.

Meanwhile, FIG. 68(a) (b) (c) (d) represents a manner of arranging the entire diffusion patterns 46. FIG. 69 shows a pattern density (area ratio) change in a radial direction. FIG. 70 shows a pattern length change. FIG. 71 shows a change in the number of patterns per unit area. r represents a distance from the light emitting part 45. The diffusion patterns 46 increases the density with the increase in the distance from the light emitting part 45, as shown in FIG. 69. This is because to make even the brightness on the light emitting surface 44b. For the method for gradually increasing the diffusion pattern density, it is possible to gradually increase the number of diffusion patterns per unit area. In this embodiment, however, the light conductor plate 44 is divided into a plurality of doughnut-formed zones in accordance with a distance from the light emitting part 45. Each zone has therein a constant number of diffusion patterns per unit area, as shown in FIG. 71. Furthermore, the number of diffusion patterns per unit area is increased stepwise based on each zone. As shown in FIG. 70, in each zone, the length of the diffusion pattern is gradually changed. Meanwhile, at a zone boundary, the pattern length is once shortened.

FIG. 68(b) (c) (d) concretely represents the diffusion patterns respectively in the points of A, B and C of FIG. 68(a). In FIG. 68(b), both the radial pitch and the circumferential pitch of diffusion patterns 46 are 140 μm in a region A closest to the light emitting part 45, thereby preventing against the radial overlap between the inner diffusion pattern 46 and the outer diffusion pattern 46. FIG. 68(c) is an intermediate region B, wherein both the radial pitch and the circumferential pitch of diffusion patterns 46 are 70 μm. The inner diffusion patterns 46 and the outer diffusion patterns 46 are overlapped by each two rows. FIG. 68(d) is a distant region C from the light emitting part 45, wherein the radial pitch is 35 μm and the circumferential pitch is 140 μm. Incidentally, although FIG. 68(b) (c) (d) illustrated the diffusion patterns extending in a straight-line form, the winding diffusion patterns shown in FIG. 65 may be arranged as in FIG. 68(b) (c) (d).

Meanwhile, the longer side of the light conductor plate, on a side opposite to an end the light emitting part 45 is arranged, is formed straight whereas the longer side of the light conductor plate on a side close to the light emitting part 45 is cut obliquely by one or a plurality of stages. Similarly, close to the light emitting part 45, the shorter side is formed oblique in part thereof. In case slant surfaces 73, 74 are provided respectively on a longer side and shorter side close to the light emitting part 45, as shown in FIG. 72, part of the light emitted from the light emitting part 45 is totally reflected at the longer-side slant surface part 73 and shorter-side slant surface part 74 to send light to the corners of the light conductor plate 44 (hatched regions in FIG. 72). In the case that the light emitting part 45 is placed at a corner of the light conductor plate 44, the other corners likely to be dark. With this structure, however, the light totally reflected upon the slant surface parts 73, 74 is sent to the corners of the light-emitting region 44c of the light conductor plate 44, thereby making more even the brightness distribution on the surface light source device 68 and enhancing the efficiency of the surface light source device 68.

Incidentally, where a fixing frame 75 is attached on the light conductor plate 44 as shown in FIG. 73, if the structure is made with a close contact between the slant surface parts 73, 74 for light reflection and the fixing frame 75, the slant surface parts 73, 74 of the light conductor plate 44 are ready to be scratched causing a fear to impair reflection characteristic. In order to prevent this, a small convex-formed projection 76 is provided in one part of the light-reflecting slant surface part 73, 74 or in the vicinity thereof. It is preferred that the light conductor plate 44 is in contact with the fixing frame 75 through the convex-formed projection 76 while a gap is provided between the slant surface part 73, 74 and the fixing frame 75.

Next, explanation will be made on an anti-reflection film 72. In the case of using the surface light source device 68 as a front light, it is possible to prevent shine by providing an anti-reflection film (AR coat) 72 for prevent shine (the light of other than an image, e.g. bright shine with reflection light preventing from viewing an image) on the both surfaces of the light conductor plate 44 or on the surface formed with diffusion patterns 46. However, the anti-reflection film 72 is to prevent the shine caused by reflection of external light upon a surface (planar part 44e) of the light conductor plate 44, as shown in FIG. 74. This light is incident perpendicularly on the planar part 44e of the light conductor plate 44. Contrary to this, the light of the light emitting part 45 transmitted through the deflecting slant surface 46a is obliquely incident on a round part 44f at the boundary between the rear surface 46b and the planar part 44e of the diffusion pattern 46 as shown in FIG. 74, thereby to be reflected as shine toward an observer.

However, in case an anti-reflection film 72 is formed in an even thickness in a manner suppressing the shine due to external light, there is less effect on the light obliquely incident on the anti-reflection film 72 similarly to the light of from the light emitting part 45 obliquely incident on the round part 44f at the boundary between the rear surface 46b and the planar part 44e of the diffusion pattern 46. As shown in FIG. 75, provided that the light emitted from the light emitting part 45 has a wavelength (light-source wavelength) of approximately 450 nm, the anti-reflection film 72 for use is designed such that reflective index is the minimum at the relevant wavelength as shown in FIG. 76. When light is incident obliquely to shorten a conversion wavelength, there is increase in reflective index. Consequently, in order to prevent such shine due to the light of from the light emitting part 45, it is effective to partially increase the film thickness of the anti-reflection film 72 in a round part 44f at the boundary between the rear surface 46b and the planar part 44e of the diffusion pattern 46.

In order to partially increase the film thickness of the anti-reflection film 72 in the round part 44f at an end of the diffusion pattern 46 in this manner, the light conductor plate 44 is obliquely placed within a vacuum evaporation apparatus 77 for evaporating an anti-reflection film 72, as shown for example in FIG. 77. This can be easily carried out by placing the round part 44f directly facing to an evaporation source 78. Because the anti-reflection film 72 to be evaporated on an inclined part is reduced in thickness, it is possible to increase the film thickness at the round part 44f than the other by evaporating an anti-reflection film 72 in a state the light conductor film 44 is inclined.

Meanwhile, as shown in FIG. 78, the shine on the planar surface 44e at close to the diffusion pattern of the light conductor plate 44 is due mainly to external light. On the contrary, the shine on the light emitting surface 44b of the light conductor plate 44, as shown in FIG. 78, is due to the light L11 of from the light emitting part 45 that has been reflected upon the deflecting slant surface 46a and further reflected upon the light emitting surface 44b. These are noises against an image given by the light L12 of from the light emitting part 45 that has been reflected upon the deflecting slant surface 46a and further upon the reflective-type liquid crystal display panel 71. Accordingly, in order to prevent the shine due to the light reflected upon the both surfaces of the light conductor plate 44, a usual anti-reflection film 72 (or an anti-reflection film 72 partly increased in film thickness as in the above) may be formed on the planar part 44e in the surface on a side formed with the diffusion patterns 46 while, on the light emitting surface 44b may be used an anti-reflection film 79 specific for the light of from the light emitting part 45.

However, because a white light-emitting diode usually having two peaks (450 nm, 550 nm on its wavelength spectrum as shown in FIG. 79, there is a need to suppress reflective index at the two peaks. The light L11 reflected upon the light emitting surface 44b has a somewhat width for the anti-reflection film 79. For the oblique incident light, the reflective-index characteristic of the anti-reflection film 79, in many cases, deviates toward a lower wavelength side than that of perpendicular incident light. For this reason, the anti-reflection film 79 for use on the back side preferably has a visible range of reflective index having two minimum values, wherein the spacing between the two minimum values is broader than an interval of the peaks in the light emitted from the spot light source 48. Furthermore, it is more preferred that the two average values of the reflective-index minimum values of the anti-reflection film 79 are longer in wavelength than an average value of the two peaks of the spot light source 48.

FIG. 80 is a sectional view showing a structure of a light emitting part 45 buried at an end of a shorter side of the light conductor plate 44. The light emitting part 45 has a light-emitting diode chip 81 sealed in a transparent resin 82 and covered with a white transparent resin 83 at the surfaces other than the front surface thereof. The light emitting part 45 is mounted on a film wiring board 84 and fixed by a solder 85. Furthermore, the film wiring board 84 is fixed on a reinforcing plate 86 formed of a glass epoxy resin. The light conductor plate 44 has a light-source mounting part 87 perpendicularly penetrated with a hole 88 for accommodating the light emitting part 45. In the vicinity of the light-source mounting part 87, a positioning pin 89 projects on a lower surface of the light conductor plate 44. On the other hand, a through-hole 90, 91 is opened, for passing the positioning pin 89, in the film wiring board 84 and reinforcing plate 86.

Then, a ultraviolet cure type adhesive (thermo-set type adhesive also usable) 92 is previously applied to a lower surface of the light conductor plate 44, at around a base of the positioning pin 89. The positioning pin 89 is inserted through the through-hole 90, 91 of the film wiring board 84 and reinforcing plate 86, to make a positioning of a thickwise center of the light conductor plate 44 and a light-emitting center of the light emitting part 45 by a CCD camera or the like. Thereafter, a ultraviolet ray is radiated to cure the ultraviolet cure type adhesive 92 thereby bonding between the light conductor plate 44 and the light emitting part 45. Furthermore, the positioning pin 89 is thermally fitted with the reinforcing plate 86.

At this time, as shown in FIG. 80, the light emitting part 45 at its center may be positioned by the projection 93 provided in an inner surface of the hole 88 of the light-source mounting part 87 (rear surface side of the light emitting part 45, front surface side or both thereof may be used). Meanwhile, although not shown, in a state the light conductor plate 44 and the light emitting part 45 are perpendicularly inverted, a center of the light conductor plate 44 and a center of the light emitting part 45 are aligned by the use of a jig having a step for positioning an upper surface of the light conductor plate 44 and an upper surface of the light emitting part 45. Meanwhile, a glass epoxy wiring board or a leadframe may be used in place of the film wiring board 84.

The light conductor plate 44 thus mounted with the light emitting part 45, e.g. for a transmission type liquid crystal display device, is mounted, with the reinforcing plate 86 side positioned up (or may be positioned down), on a main board 94, as shown in FIG. 81. The film wiring board 84 at its end is connected to a heat sink 96. Furthermore, a transmission type liquid crystal display panel 70 is superposed on the light conductor plate 44. The end of the film wiring board 97 connected to the liquid crystal display panel 70 is also fixed to the heat sink 98 on the main board 94.

When forming a rectangular light conductor plate 44 as noted above, in case such a rectangular light conductor plate 44 is to be formed directly, there occurs uneven flow of the resin within a mold die 98, as shown in FIG. 82. It is difficult to achieve a pattern transfer even over the entire surface, thus readily causing warp in the light conductor plate. However, as shown in FIG. 83, a mold die 98 is made somewhat greater than a light conductor plate 44 to be made. The mold die 98 is used to make a fan-shaped or semicircular light conductor plate 99 having a somewhat greater size. By properly cutting it, a light conductor plate 44 can be formed. In this manner, in case a somewhat greater light conductor plate 99 having a favorable resin fluidity is formed and then cut thereby fabricating a desired light conductor plate 44, resin fluidity is even in every direction during forming a somewhat greater light conductor plate 99. Thus, it is possible to achieve pattern transfer even over the entire surface and reduce the occurrence of warp in the light conductor plate 44.

Incidentally, mentioning a size of the surface light source device shown in FIG. 62, the length in a shorter side direction of the light conductor plate 44 is 33 mm, the length in a longer side direction is approximately 43 mm (approximately 47 mm if including a light-source mount part) and the thickness is 0.1 mm. Meanwhile, the non-light-emitting region 44d of the light conductor plate 44 has a width of 0.2 mm. Furthermore, the light-emitting diode as a spot light source 48 has a width of approximately 25 mm and a depth of 1.3 mm.

FIG. 84 represents a cellular phone 100 built, as a display 101, with a reflection-side liquid crystal display unit using a surface light source device 68 structured as the above. The cellular phone 100 has a speaker 102 and antenna 103 above the display 101, and an operation button (dials, etc.) 104 below the display 101. Meanwhile, FIG. 85 represents a PDA 105 using, as a display 106, a surface light source device 68 structured similarly to the above. This PDA has operation buttons 107 below the display 106.

In the cellular phone 100 or PDA 105, the liquid crystal display screen of the display 101, 106 in many cases uses fully the front surface of the apparatus. Also, it is long in the longitudinal direction and narrow in width. Also, in the above and below the display 101, 106, provided in many cases are operation switches 104, 107, a speaker 102 and the like. Consequently, as in the surface light source device 68 mentioned above, the use of an arrangement of a light emitting part 45 at an end close to a shorter side facilitates parts arrangement and design, contributing to the size reduction of the cellular phone 100 or PDA 105. Particularly, in the case of the cellular phone 100, because the antenna 103 causes electromagnetic waves at high frequency, an IC, radio frequency circuit or the like cannot be placed in the vicinity thereof. However, because a spot light source, such as a light-emitting diode, is less susceptible to the effect of (Seventh Preferred Embodiment)

Figure 86:
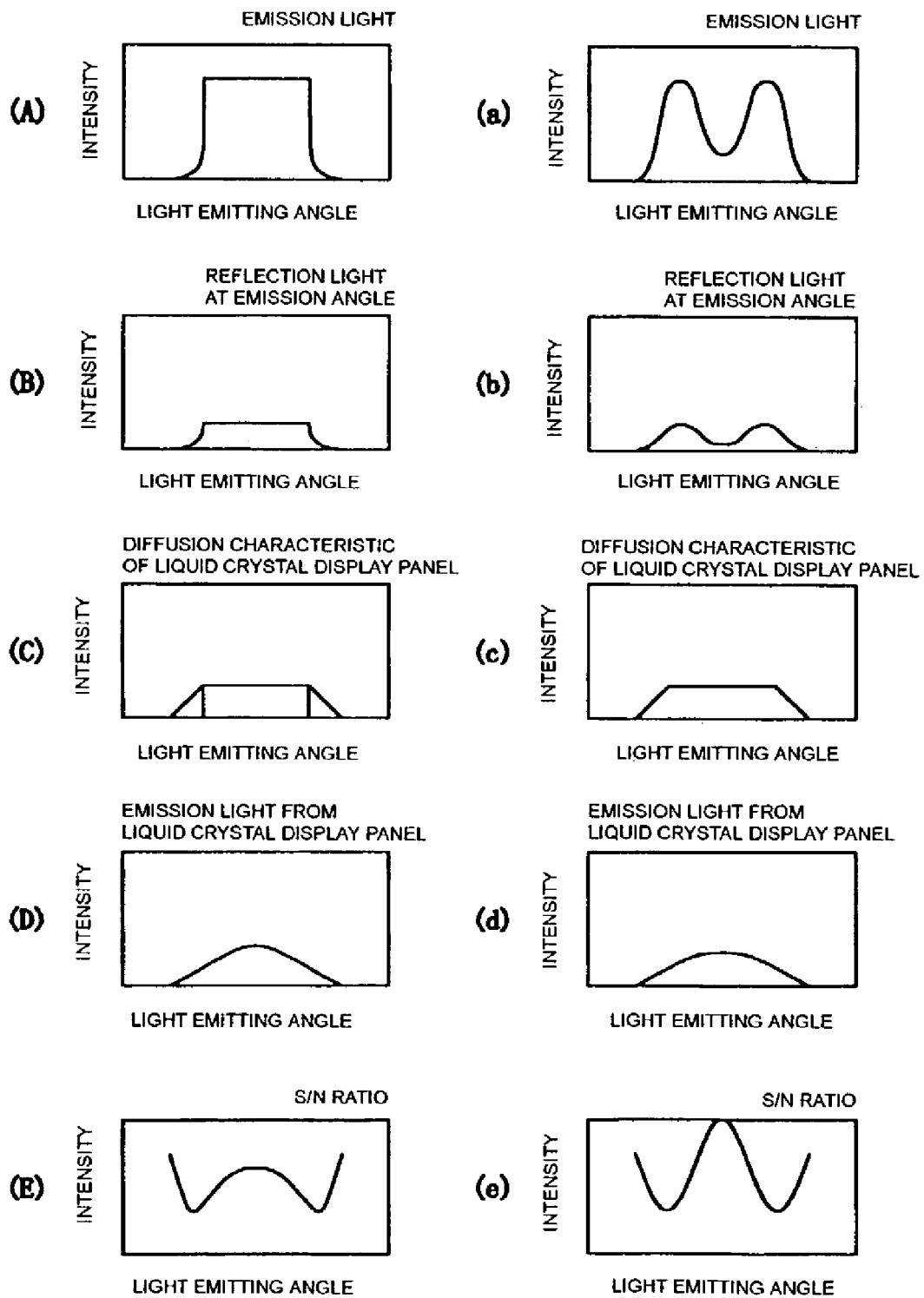

FIG. 86 is a figure showing the characteristic of a liquid crystal display unit using, as a front light, a surface light source device according to a seventh preferred embodiment of the invention. FIG. 86(A) is a figure showing an emission-light intensity angular distribution of the light emitted from the light conductor plate 44, showing a nearly flat characteristic. FIGS. 86(B)–(E), in any, are characteristics corresponding to the emission-light intensity angular distribution of the same figure (A). FIG. 86(B) shows an intensity distribution of the light reflected upon the lower surface of the light conductor plate 44 and emitted at the light emitting surface 44b. FIG. 86(C) shows a diffusion characteristic of the liquid crystal display panel. FIG. 86(D) shows an emission-light intensity characteristic of from the liquid crystal display panel. FIG. 86(E) shows an S/N ratio upon lighting of the surface light source, which is a ratio of an image emitted toward the front after reflection upon the liquid crystal display panel [same figure (D)] and a noise light emitted toward the front due to reflection upon the lower surface of the light conductor plate 44 [same figure (B)] (see FIG. 78).

Similarly, FIG. 86(a) is a figure showing an emission-light intensity angular distribution of the light emitted from the light conductor plate 44, showing a characteristic recessed at nearly the center. FIG. 86(b)-(e), in any, are characteristics corresponding to the emission-light intensity characteristics of the same figure (a). FIG. 86(b) shows an intensity distribution of the light reflected upon the light conductor plate 44. FIG. 86(c) shows a diffusion characteristic of the liquid crystal display panel. FIG. 86(d) shows an emission-light intensity characteristic of from the liquid crystal display panel. FIG. 86(e) shows an S/N ratio.

The contrast during surface light-source lighting of the liquid crystal display unit (without external light) is determined by S/N of the reflection light (image) from the reflective-type liquid crystal display panel and reflection light (shine) due to the light conductor plate 44. However, the characteristic figure [86(B), (b)] of the light emitted after reflection upon the light conductor plate 44 is susceptible to the effect of an emission-light intensity angular distribution of the light emitted from the light conductor plate 44 whereas the mage reflected upon the liquid crystal display panel [FIG. 86(D), (d)] is less susceptible to the effect of an emission-light intensity angular distribution of the light emitted from the light conductor plate 44, wherein the characteristic is less changed where the spread thereof is somewhat changed by the diffusion characteristic of the liquid crystal display panel.

Accordingly, as shown in FIG. 86(a)-(e), the S/N in a perpendicular direction can be raised by lowering the intensity of the light emitted perpendicularly to the light emitting surface 44b of the light conductor plate 44.

FIG. 87 is a plan view showing one example of a diffusion pattern 46 for realizing the characteristics as shown in FIG. 86(a)-(e). In this diffusion pattern 46, provided that the angle defined by the tangential line thereof relative to a direction perpendicular to a direction of light's traveling within the light conductor plate 44 is v, the region this angle v is nearly zero is given extremely small. Otherwise, it may be completely eliminated. With a structure like this, it is possible to reduce the light to be emitted in a direction perpendicular to the light emitting surface 44b as viewed in a direction of light's traveling (y-axis direction), and to raise the S/N in the perpendicular direction.

(Eighth Preferred Embodiment)

FIG. 88(b) shows a surface light source device using a light conductor plate having the same form of diffusion patterns throughout the entire thereof. With this surface light source device, the light emitting direction at the light emitting surface 44b is evenly aligned regardless of a position of light emission. When actually observing the liquid crystal display device, the angle of viewing it differs depending on a position on the screen of the liquid display device. Consequently, in the case the directivity of the light conductor plate 44 is the same regardless of a position, the brightness in view is different depending on a pixel position resulting in an occurrence of uneven on-screen brightness. Although this problem will be eliminated by providing a Fresnel lens or the like on the light conductor plate 44, there encounters the corresponding thickness increase of the surface light source device.

In such a case, the directivity may be varied in accordance with the position by changing the shape (inclination angle γ of the deflecting slant surface 46a) and arrangement (lengthwise inclination v of the diffusion pattern 46) of the diffusion patterns 46 in accordance with a position in the light conductor plate 44. Namely, as shown in FIG. 88(a), the diffusion patterns 46 are designed such that, in a center region of the light conductor plate 44, light is emitted toward a perpendicular direction to the light emitting surface 44b while, in a peripheral region, the direction of light emission at the light emitting surface 44b directs toward the center of the light conductor plate 44. By doing so, the diffusion patterns 46 can be provided with the function of a Fresnel lens whereby the viewing at every position is at the same brightness throughout the screen thus equalizing the brightness over the screen entirety.

INDUSTRIAL APPLICABILITY

The present invention is used as a surface light source device for use as a backlight or front light, and to be carried out in manufacturing the surface light source device. The application is for wide fields of applications including liquid crystal display devices, and cellular phones and information terminals having liquid crystal display devices in their display regions.

What is claimed is:

1. A surface light source device comprising:
a light conductor plate for spreading an introduced light on nearly an entirety of a light emitting surface and emitting the introduced light from the light emitting surface;
a light source smaller in size as compared to a light incident surface of the light conductor plate; and
luminous flux shaping means for spreading a light emitted from the light source to nearly the entirety of the light incident surface and emitting the light,
wherein at least 50% of the incident light on the light conductor plate is included in an area defined by angles of 26 degrees as viewed from a direction perpendicular to the light emitting surface of the light conductor plate, and
wherein at least two-thirds of a total light emitted from the luminous flux shaping means is emitted to an area defined by angles of up to 40 degrees from a lengthwise direction of a light emitting surface of the luminous flux shaping means as viewed from a direction perpendicular to the light emitting surface of the light conductor plate, wherein the luminous flux shaping means comprises, at a light emitting surface side, means to deflect the light emitted from the luminous flux shaping means to a direction perpendicular to a light emitting surface of the luminous flux shaping means.

2. A surface light source device according to claim 1, wherein the luminous flux shaping means is formed of a transparent material, and wherein a regular reflection plate is provided opposed to the opposite side of the light emitting surface of the luminous flux shaping means.

3. A surface light source device according to claim 2, wherein an angle defined by normal line direction of a deflecting slant surface and a direction perpendicular to the light emitting surface of the light conductor plate is 10 degrees or smaller, a regular reflection plate being provided on an opposite surface of the light emitting surface of the light conductor plate.

4. A liquid crystal display unit comprising a liquid crystal display panel for generating an image and a surface light source device according to claim 2 for lighting the liquid crystal display panel.

5. A cellular phone having a transceiver function, the cellular phone characterized by comprising a display section including a liquid crystal display unit according to claim 4.

6. An information terminal unit having an information processing function, the information terminal unit comprising a display section including a liquid crystal display unit according to claim 4.

7. A surface light source device according to claim 1, wherein at least one of the light emitting surface and an opposite surface of the light conductor plate is provided with a concave-formed pattern having a deflecting slant surface which is slanted so that a normal line directed inside of the light conductor plate inclines to a direction that the light source is arranged, a direction of the normal line and a direction in which the light is traveling within the light conductor plate being in parallel as viewed in a direction perpendicular to the light emitting surface of the light conductor plate.

8. A surface light source device according to claim 7, wherein an angle defined by normal line direction of the deflecting slant surface and a direction perpendicular to the light emitting surface of the light conductor plate is 10 degrees or smaller, a regular reflection plate being provided on an opposite surface of the light emitting surface of the light conductor plate.

9. A liquid crystal display unit comprising a liquid crystal display panel for generating an image and a surface light source device according to claim 7 for lighting the liquid crystal display panel.

10. A cellular phone having a transceiver function, the cellular phone characterized by comprising a display section including a liquid crystal display unit according to claim 9.

11. An information terminal unit having an information processing function, the information terminal unit comprising a display section including a liquid crystal display unit according to claim 9.

12. A liquid crystal display unit comprising a liquid crystal display panel for generating an image and a surface light source device according to claim 7 for lighting the liquid crystal display panel.

13. A cellular phone having a transceiver function, the cellular phone characterized by comprising a display section including a liquid crystal display unit according to claim 12.

14. An information terminal unit having an information processing function, the information terminal unit comprising a display section including a liquid crystal display unit according to claim 12.

15. A surface light source device according to claim 1, wherein, at least two-thirds of the total light emitted within a plane perpendicular to the light emitting surface of the light conductor plate including a direction in which the light is traveling within the light conductor plate being emitted to an area defined by angles of up to 40 degrees with respect to the light emitting surface of the light conductor plate, wherein the light conductor plate comprises, at a light emitting surface side, a means to deflect the light emitted from the light emitting surface to a direction perpendicular to the light emitting surface.

16. A surface light source device according to claim 15, wherein the angle defined by a normal line direction of the deflecting slant surface and a direction perpendicular to the light emitting surface of the light conductor plate is 10 degrees or smaller, and wherein a regular reflection plate is provided on an opposite surface of the light emitting surface of the light conductor plate.

17. A liquid crystal display unit comprising a liquid crystal display panel for generating an image and the surface light source device according to claim 1 for lighting the liquid crystal display panel.

18. An information terminal unit having an information processing function, the information terminal unit comprising a display section including a liquid crystal display unit according to claim 17.

19. A cellular phone comprising a transceiver function, wherein the cellular phone comprising a display section including a liquid crystal display unit according to claim 17.

20. A surface light source device according to claim 1, wherein an angle defined by normal line direction of a deflecting slant surface and a direction perpendicular to the light emitting surface of the light conductor plate is 10 degrees or smaller, a regular reflection plate being provided on an opposite surface of the light emitting surface of the light conductor plate.

21. A surface light source device, comprising:
a light source; and
a light conductor plate for spreading a light introduced from the light source to nearly an entirety of a light emitting surface and emitting the light from a light emitting surface,
wherein the light conductor plate comprises a plurality of deflecting slant surfaces for totally reflecting light which travels in the light conductor plate and emitting the light from the light emitting surface;
as viewed in a direction perpendicular to the light emitting surface of the light conductor plate, a direction in which the light is traveling within the light conductor plate being aligned nearly in one direction at each position of the light conductor plate, an angle formed by a meeting of the normal of said deflecting slant surface, and said direction in which the light is traveling is distributed within an area of 30 degrees; and
the one of the plurality of deflecting slant surfaces in a section which is including a direction of light's traveling within said light conductor plate and is perpendicular to said light emitting surface of said light conductor plate forms itself into a straight line.

22. A surface light source device, comprising:
a light source and a light conductor plate for spreading a light introduced from the light source to nearly an entirety of a light emitting surface and emitting the light from the light emitting surface, wherein at least one of the light emitting surface and a backside surface of the light emitting surface of the light conductor plate is provided with a plurality of concave-formed patterns structured with a deflecting slant surface for total reflection of the light and a light re-incident surface for re-incidence of the light transmitted through the deflecting slant surface, wherein the concave-formed pattern comprises a section in a triangular groove form comprising the deflecting slant surface and the light re-incident surface, and a section nearly uniform in a direction perpendicular to a direction in which the light is traveling within the light conductor plate, the deflecting slant surface having an inclination of 45–65 degrees relative to at least one of the light emitting surface and a backside surface of the light emitting surface of the light conductor plate comprising the concave-formed patterns; and as viewed in a direction perpendicular to a plane including a direction in which the light is traveling within the light conductor plate and perpendicular to the light emitting surface of the light conductor plate, 50% or more of the light to be emitted from the light emitting surface of the light conductor plate being included in a range of within 30 degrees as viewed from the light emitting surface.

\* \* \* \* \*